US008972169B2

(12) United States Patent
Gutman

(10) Patent No.: US 8,972,169 B2
(45) Date of Patent: Mar. 3, 2015

(54) NAVIGATION SYSTEM WITH CONSTRAINED RESOURCE ROUTE PLANNING MECHANISM AND METHOD OF OPERATION THEREOF

(71) Applicant: Telenav, Inc., Sunnyvale, CA (US)

(72) Inventor: Ronald David Gutman, San Jose, CA (US)

(73) Assignee: Telenav, Inc., Sunnyvale, CA (US)

(*) Notice: Subject to any disclaimer, the term of this patent is extended or adjusted under 35 U.S.C. 154(b) by 0 days.

(21) Appl. No.: 13/964,621

(22) Filed: Aug. 12, 2013

(65) Prior Publication Data

US 2014/0172288 A1 Jun. 19, 2014

Related U.S. Application Data

(63) Continuation of application No. 13/339,961, filed on Dec. 29, 2011, now Pat. No. 8,538,677.

(60) Provisional application No. 61/428,849, filed on Dec. 30, 2010.

(51) Int. Cl.
*G01C 21/34* (2006.01)
*G01C 21/00* (2006.01)

(52) U.S. Cl.
CPC ........ *G01C 21/3476* (2013.01); *G01C 21/3469* (2013.01); *G01C 21/00* (2013.01)
USPC ........................................ 701/410

(58) Field of Classification Search
USPC ........................................ 701/410
See application file for complete search history.

(56) References Cited

U.S. PATENT DOCUMENTS

| 5,539,399 | A | * | 7/1996 | Takahira et al. ......... 340/995.27 |
| 5,568,390 | A | | 10/1996 | Hirota et al. |
| 5,742,922 | A | | 4/1998 | Kim |
| 5,815,824 | A | * | 9/1998 | Saga et al. ...................... 701/22 |
| 5,832,400 | A | | 11/1998 | Takahashi et al. |
| 6,065,511 | A | | 5/2000 | McClintock |
| 6,418,398 | B1 | | 7/2002 | Dueck et al. |
| 6,591,185 | B1 | | 7/2003 | Polidi et al. |
| 6,633,544 | B1 | | 10/2003 | Rexford et al. |
| 6,691,025 | B2 | | 2/2004 | Reimer |
| 6,714,857 | B2 | | 3/2004 | Kapolka et al. |
| 6,812,888 | B2 | * | 11/2004 | Drury et al. .............. 342/357.31 |
| 6,859,927 | B2 | | 2/2005 | Moody et al. |
| 6,996,469 | B2 | | 2/2006 | Lau et al. |

(Continued)

FOREIGN PATENT DOCUMENTS

WO 2007059781 5/2007

OTHER PUBLICATIONS

Ron Gutman, "Reach-based Routing: A New Approach to Shortest Path Algorithms Optimized for Road Networks", Jan. 6, 2004, pp. 12, Published in: Emeryville, CA, USA, http://www.siam.org/meetings/alenex04/abstacts/rgutman1.pdf.

(Continued)

*Primary Examiner* — Thomas Tarcza
*Assistant Examiner* — Alex C Dunn
(74) *Attorney, Agent, or Firm* — IP Investment Law Group

(57) ABSTRACT

A method of operation of a navigation system includes: receiving an entry for a destination; and generating a travel route to the destination through a sufficient number of one or more replenishment locations required for reaching the destination for displaying on a device.

18 Claims, 16 Drawing Sheets

(56) References Cited

U.S. PATENT DOCUMENTS

| | | | |
|---|---|---|---|
| 7,219,159 B2 | 5/2007 | Mouri et al. | |
| 7,412,313 B2 | 8/2008 | Isaac | |
| 7,440,840 B2 | 10/2008 | Tsukamoto et al. | |
| 7,474,960 B1* | 1/2009 | Nesbitt | 701/533 |
| 7,660,651 B2 | 2/2010 | Zhong | |
| 7,756,631 B2 | 7/2010 | Chavira et al. | |
| 7,778,769 B2 | 8/2010 | Boss et al. | |
| 7,831,433 B1* | 11/2010 | Belvin et al. | 704/275 |
| 7,849,944 B2* | 12/2010 | DeVault | 180/65.29 |
| 7,945,386 B2 | 5/2011 | Lokshin et al. | |
| 8,005,610 B2 | 8/2011 | Bast et al. | |
| 8,014,908 B2 | 9/2011 | Clarke et al. | |
| 8,069,127 B2* | 11/2011 | Taylor et al. | 706/13 |
| 2003/0033582 A1 | 2/2003 | Klein et al. | |
| 2004/0062963 A1 | 4/2004 | Umayahara et al. | |
| 2006/0031007 A1 | 2/2006 | Agnew et al. | |
| 2006/0058955 A1 | 3/2006 | Mehren | |
| 2006/0278449 A1 | 12/2006 | Torre-Bueno | |
| 2007/0021909 A1 | 1/2007 | Matsuda | |
| 2007/0106465 A1 | 5/2007 | Adam et al. | |
| 2008/0133120 A1 | 6/2008 | Romanick | |
| 2008/0249667 A1 | 10/2008 | Horvitz et al. | |
| 2008/0250423 A1 | 10/2008 | Bush et al. | |
| 2008/0270016 A1 | 10/2008 | Proietty et al. | |
| 2009/0005974 A1 | 1/2009 | Lenneman et al. | |
| 2009/0063045 A1 | 3/2009 | Figueroa et al. | |
| 2009/0157289 A1* | 6/2009 | Graessley | 701/123 |
| 2009/0164114 A1 | 6/2009 | Morikawa et al. | |
| 2009/0198505 A1* | 8/2009 | Gipps et al. | 705/1 |
| 2009/0204316 A1 | 8/2009 | Klampfl et al. | |
| 2009/0276150 A1 | 11/2009 | Vorlander | |
| 2010/0036606 A1 | 2/2010 | Jones | |
| 2010/0049397 A1* | 2/2010 | Liu et al. | 701/33 |
| 2010/0082246 A1 | 4/2010 | Crane | |
| 2010/0094496 A1* | 4/2010 | Hershkovitz et al. | 701/22 |
| 2010/0198508 A1 | 8/2010 | Tang | |
| 2010/0211643 A1 | 8/2010 | Lowenthal et al. | |
| 2011/0208417 A1 | 8/2011 | Fink et al. | |
| 2011/0224900 A1* | 9/2011 | Hiruta et al. | 701/201 |
| 2011/0288765 A1* | 11/2011 | Conway | 701/201 |
| 2012/0078743 A1* | 3/2012 | Betancourt | 705/26.3 |
| 2012/0158229 A1* | 6/2012 | Schaefer | 701/22 |
| 2012/0173061 A1* | 7/2012 | Hanley et al. | 701/22 |
| 2012/0173135 A1 | 7/2012 | Gutman | |
| 2012/0179359 A1* | 7/2012 | Profitt-Brown et al. | 701/123 |
| 2012/0181985 A1 | 7/2012 | Lowenthal et al. | |
| 2012/0221234 A1* | 8/2012 | Sujan et al. | 701/123 |

OTHER PUBLICATIONS

Delling et al., "High-Performance Multi-Level Graphs", "Institut fur Theoretische Informatik, Lehrstuhl fur Algorithmik", Aug. 28, 2006, pp. 1-14, Publisher: Universitat Karlsruhe, Published in: Karlsruhe, Germany.

Goldberg et al., "Better Landmarks Within Reach", 2007, pp. 38-51, Springer-Verlag Berlin Heidelberg, Microsoft Research Silicon Valley, 1065 La Avenida, Mountain View, CA 94043, USA.

Dominik Schultes, "Route Planning in Road Networks", Feb. 7, 2008, pp. 235 pgs, Publisher: von der Fakultat fur Informatik der Universitat Fridericiana zu Karlsruhe, Published in: Karlsruhe, Germany.

* cited by examiner

NAVIGATION SYSTEM WITH CONSTRAINED RESOURCE ROUTE PLANNING MECHANISM AND METHOD OF OPERATION THEREOF

CROSS-REFERENCE TO RELATED APPLICATION(S)

This is a continuation of co-pending U.S. patent application Ser. No. 13/339,961 filed Dec. 29, 2011, which claims the benefit of U.S. Provisional Patent Application Ser. No. 61/428,849 filed Dec. 30, 2010, and the subject matter thereof is hereby incorporated herein by reference thereto.

The present application contains subject matter related to a U.S. patent application Ser. No. 13/340,008 filed Dec. 29, 2011, which claims the benefit of U.S. Provisional Patent Application Ser. No. 61/428,847 filed Dec. 30, 2010, and the subject matter thereof is hereby incorporated herein by reference thereto.

TECHNICAL FIELD

The present invention relates generally to a navigation system, and more particularly to a system route planning mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a display of the route to the destination has become a paramount concern for the consumer. Inadequate planning of the route by the navigation system decreases the benefit of using the tool.

Thus, a need still remains for a navigation system that displays a route that accommodates for vehicles. In view of the ever-increasing commercial competitive pressures, along with growing consumer expectations and the diminishing opportunities for meaningful product differentiation in the marketplace, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving an entry for a destination; and generating a travel route to the destination through a sufficient number of one of more replenishment locations required for reaching the destination for displaying on a device.

The present invention provides a navigation system, including: an entry module for receiving an entry for a destination; and a route planning module, coupled to the entry module, for generating a travel route to the destination through a sufficient number of one or more replenishment locations required for reaching the destination for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
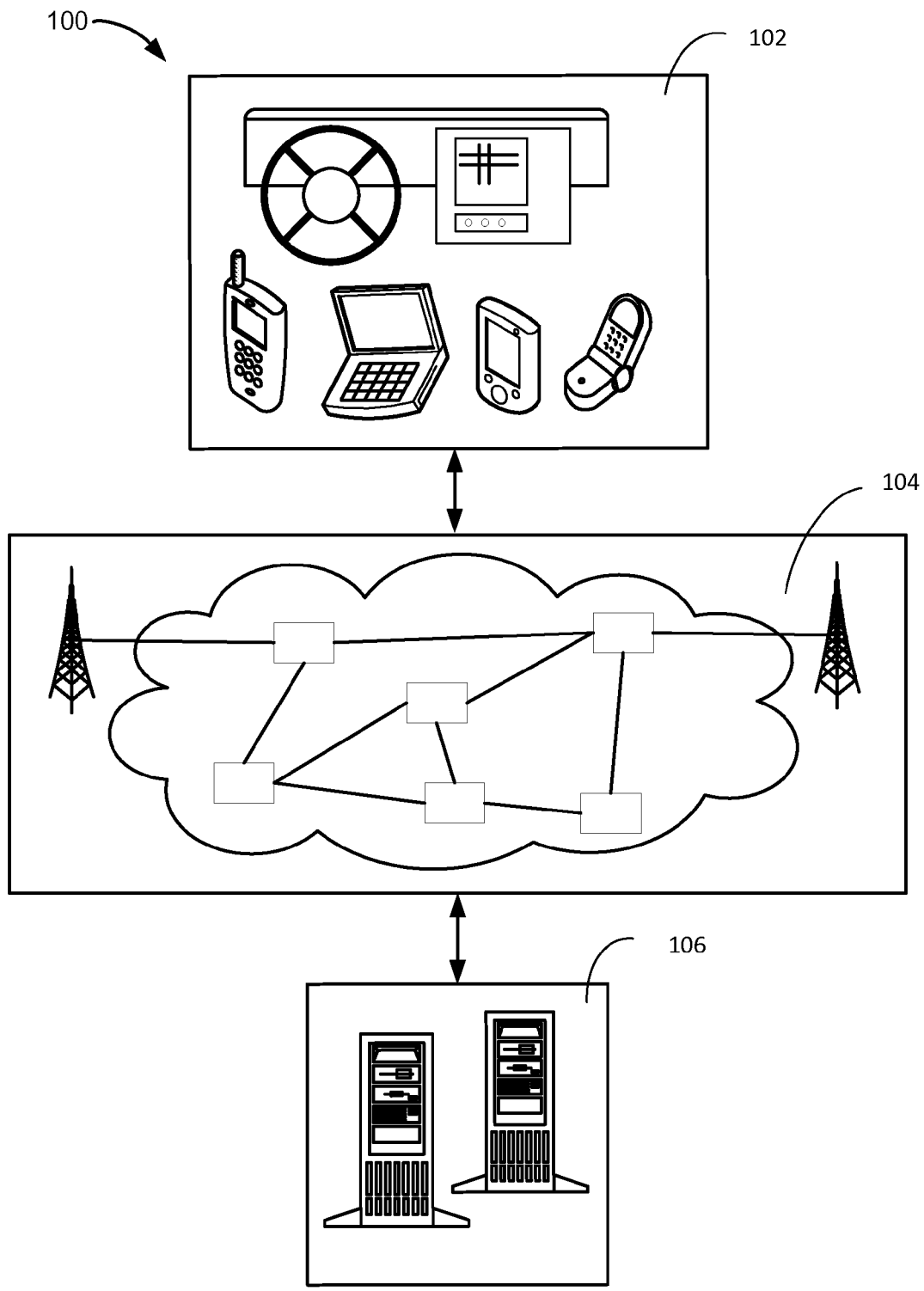
FIG. 1 is a navigation system with constrained resource route planning mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown is a navigation system 100 with constrained resource route planning mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
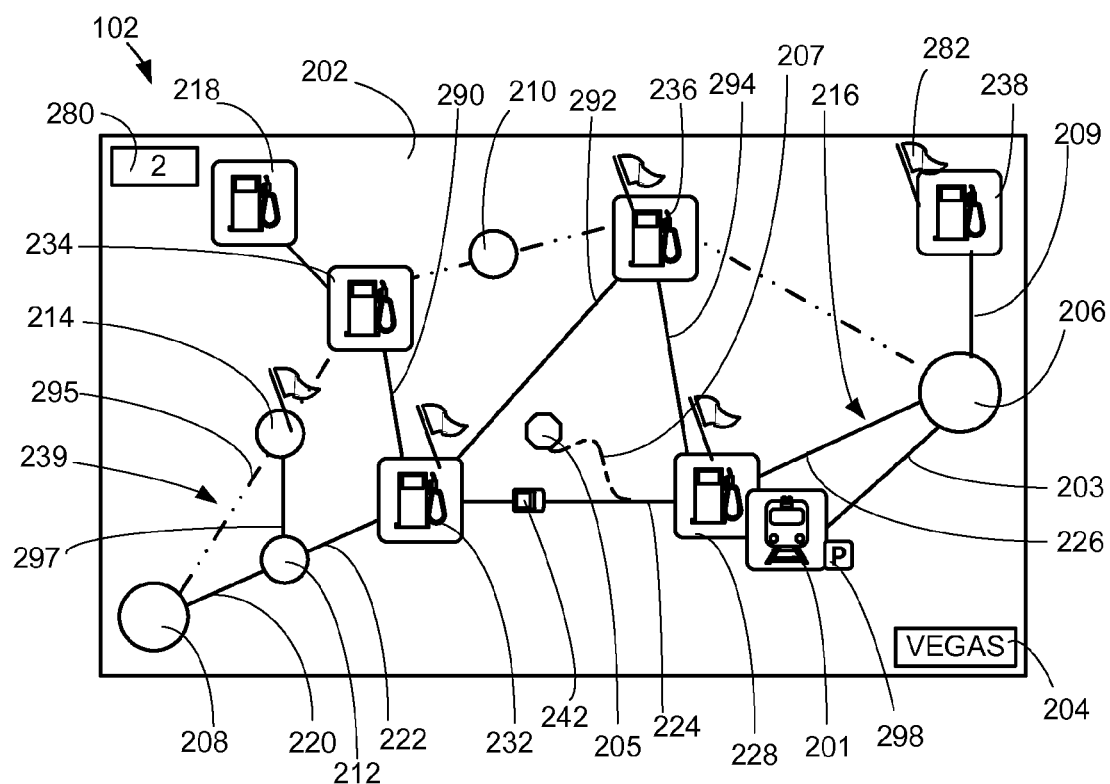
FIG. 2 is a first example of a display on a display interface of the first device.

Referring now to FIG. 2, therein is shown a first example of a display on a display interface 202 of the first device 102. The user can make an entry 204 into the first device 102. For example, the entry 204 can include a selection from the list, a voice entry, or the combination thereof. The entry 204 can include a destination 206, a start location 208, or intermediate stops 210.

The destination 206 is defined as the target destination where the user wishes to reach. For example, the user can enter "Las Vegas, Nev." for the destination 206. The start location 208 is defined as the starting point for the user's travel. The user can enter "Los Angeles, Calif." for the start location 208.

The intermediate stops 210 are defined as one or more geographic locations where the user can make a stop prior to reaching the destination 206. For example, prior to reaching the destination 206, the user can stop by the user's workplace, Aunty Betty's house, or the combination thereof as the intermediate stops 210.

The intermediate stops 210 can include a first intermediate stop 212 and a second intermediate stop 214. For example, the first intermediate stop 212 can represent the user's work place and the second intermediate stop 214 can represent Aunty Betty's house.

The user can make the entry 204 for the navigation system 100 to generate a travel route 216 for the user to reach the destination 206 from the start location 208. The travel route 216 is defined as a path where by traveling along the path, the user will be ensured to have an adequate amount of resource, fuel, or the combination thereof for the vehicle to reach the destination 206.

The travel route 216 can include the start location 208, the intermediate stops 210, replenishment locations 218, the destination 206, or the combination thereof. The travel route 216 inclusion of the intermediate stops 210 are optional. The details regarding the replenishment locations 218 will be discussed later.

The travel route 216 can include travel sections 297. The travel sections 297 are defined each as a path between each stopping points along the travel route 216. For example, the travel sections 297 can include a first travel section 220, a second travel section 222, a third travel section 224, a fourth travel section 226, a fifth travel section 290, a sixth travel section 292, a seventh travel section 294, and an eighth travel section 295. For a specific example, the first travel section 220 can represent the path between the start location 208 and the first intermediate stop 212. As a different example, the fourth travel section 226 can represent a path between a third replenishment location 228 and the destination 206.

The navigation system 100 can generate the travel route 216 prior to traversing along the travel route 216. The navigation system 100 can update the travel route 216 while traversing along the travel route 216. The details regarding the generation and updating of the travel route 216 will be discussed later.

The navigation system 100 can display the replenishment locations 218. The replenishment locations 218 are defined as specific geographic locations where the user can replenish the resource, fuel, or the combination thereof for the vehicle. For example, resource can include water, coolant, lubricant, or the combination thereof. Fuel can include gasoline, electricity, biodiesel, hydrogen fuel, pressurized air, or the combination thereof.

The destination 206 or the intermediate stops 210 can be one or some of the replenishment locations 218, because the user can replenish the fuel or resource at the destination 206 or the intermediate stops 210. In contrast, the destination 206 or the intermediate stops 210 may not be one or some of the replenishment locations 218, because the destination 206 or the intermediate stops 210 does not provide the opportunity for the user to replenish the fuel, resource, or the combination thereof. The replenishment locations 218 can include a first replenishment location 232, a second replenishment location 234, the third replenishment location 228, a fourth replenishment location 236, and a fifth replenishment location 238.

The user, the navigation system 100, or the combination thereof can select the intermediate stops 210, the destination 206, the replenishment locations 218, or the combination thereof. For example, the user can select to stop by the first intermediate stop 212 prior to reaching the destination 206. As a different example, the navigation system 100 can select Las Vegas as the destination 206 for a target destination to gamble after the user enters a category of interest representing "gambling" into the navigation system 100. As another example, the navigation system 100 can select the third replenishment location 228 and not select the fourth replenishment location 236 based on the amount of fuel remaining in the vehicle.

The navigation system 100 can select the replenishment locations 218 to suggest to the user prior to traversing the travel route 216. The navigation system 100 can also select the replenishment locations 218 while traversing along the travel route 216. The details regarding the selection of the replenishment locations 218 will be discussed later.

A current location 242 is defined as the current geographic location of the user or the navigation system 100. For example, the first replenishment location 232 can be the current location 242 along the travel route 216 after replenishing the vehicle. As a different example, the current location 242 and the start location 208 can be the same geographic location if the user has yet to traverse the travel route 216.

The navigation system 100 can verify an availability 282 of the replenishment locations 218 along the travel route 216. The availability 282 is defined as the ability of the replenishment locations 218 to replenish, service, or the combination thereof the vehicle.

For example, the flag next to each of the replenishment locations 218 can depict the availability 282 of the replenishment locations 218. The availability 282 of the first replenishment location 232, the third replenishment location 228, the fourth replenishment location 236, and the fifth replenishment location 238 being available can be shown by the flag next to that location.

For a more specific example, the availability 282 can be based on the type of resource, fuel, or the combination thereof available at the replenishment locations 218. The availability 282 can be based on the ability of the mechanics to provide service for the various kinds of vehicle, the ability of the replenishment locations 218 to replenish various kinds of vehicle, or the combination thereof. The availability 282 can also be based on whether the replenishment locations 218 allow a full or partial replenishment of the resource, fuel. The availability 282 can be based on the hours of operation of the replenishment locations 218.

The availability 282 for the intermediate stops 210, the replenishment locations 218, the destination 206, or the combination thereof can also be shown by the existence of the flag. For example, by having the availability 282 to replenish the vehicle, the second intermediate stop 214 can be illustrated with a flag shown. The second intermediate stop 214 can be Aunty Betty's house having an electrical plug for the electric vehicle to replenish the fuel. In contrast, by not having the availability 282 for replenishment, the replenishment locations 218 can be illustrated without the flag.

The navigation system 100 can verify the availability 282 of the replenishment locations 218, the intermediate stops 210, the destination 206, or the combination thereof prior to traversing along the travel route 216. The navigation system 100 can update the availability 282 of the replenishment locations 218, the intermediate stops 210, the destination 206, or the combination thereof while traversing along the travel route 216. The details regarding the verification and updating of the availability 282 will be discussed later.

The navigation system 100 can calculate a sufficient number 280 of the replenishment locations 218 required to traverse along the travel route 216 to reach the destination 206. The sufficient number 280 is defined as the adequate number of the replenishment locations 218 required to reach the destination 206. For example, the sufficient number 280 of the replenishment locations 218 to reach the destination 206 can be two. More specifically, the two of the replenishment locations 218 can be the first replenishment location 232 and the third replenishment location 228.

The navigation system 100 can calculate the sufficient number 280 of the replenishment locations 218 required prior to traversing along the travel route 216. The navigation system 100 can update the sufficient number 280 of the replenishment locations 218 required while traversing along the travel route 216. The details regarding the calculation of the sufficient number 280 will be discussed later.

A vehicle destination 298 is defined as the intermediate stops 210, the replenishment locations 218, or the combination thereof where the vehicle is left behind for replenishment while the user reaches the destination 206 using an alternate transportation 201. For example, the third replenishment location 228 can be the vehicle destination 298.

The navigation system 100 can generate a path for the user to reach the destination 206 with the alternate transportation 201. The alternate transportation 201 is defined as the travel mechanisms other than the user's vehicle that a user can choose from to reach the destination 206. For example, the third replenishment location 228 can offer a train to reach the destination 206. The user can take the alternate transportation 201, the train, to traverse along an alternate mechanism route 203 to reach the destination 206. For another example, the alternate transportation 201 can include walking. The travel route 216 can include the alternate mechanism route 203. The user can reach the destination 206 while leaving the vehicle at the third replenishment location 228 for replenishment of the fuel.

The alternate mechanism route 203 is defined as the path that the alternate transportation 201 takes to reach the destination 206. For example, the alternate mechanism route 203 can be a rail track that the train can travel to reach Las Vegas. The navigation system 100 can generate the alternate mechanism route 203 to reach the destination 206 with the alternate transportation 201 prior to traversing along the travel route 216. The navigation system 100 can update the alternate mechanism route 203 while traversing along the travel route 216. The details regarding the generating and updating of the alternate mechanism route 203 will be discussed later.

The display interface 202 can display a route deviation 205. The route deviation 205 is defined as a geographic location where the user is no longer traversing along the travel route 216. For example, the user can stray off from the travel route 216 to stop by a drug store represented as an octagon, which is not on the travel route 216. The route deviation 205 can represent the geographic location of the drug store.

The navigation system 100 can generate a recovery route 207. The recovery route 207 is defined as a path that a user can take from the route deviation 205 to return to the travel route 216. For example, the user can traverse along the recovery route 207 from the drug store to reach the third travel section 224. The details regarding the generation of the recovery route 207 will be discussed later.

The navigation system 100 can generate a replenishment route 209. The replenishment route 209 is defined as a route generated by the navigation system 100 to ensure the replenishment opportunity for the user. For example, after reaching the destination 206, Las Vegas, the destination 206 may not provide a replenishing opportunity for a vehicle with biodiesel. The navigation system 100 can generate the replenishment route 209 from Las Vegas to the fifth replenishment location 238, where replenishment for biodiesel is available to secure a replenishing opportunity for the vehicle.

The navigation system 100 can generate the replenishment route 209 while the user is traversing along the travel route 216. For example, overheating of the vehicle can cause the vehicle to lose water rapidly. The navigation system 100 can generate the replenishment route 209 to ensure that the user can reach one of the replenishment locations 218 nearest to the vehicle to replenish water for the vehicle.

The navigation system 100 can generate the replenishment route 209 prior to or while traversing along the travel route 216. The details regarding the generation of the replenishment route 209 will be discussed later.

The navigation system 100 can calculate a return route 239. The return route 239 is defined as the path the user can take from the destination 206 to return to the start location 208. For example, the return route 239 can represent the path from Las Vegas to Los Angeles. The algorithm to calculate the return route 239 can be the same as the algorithm to calculate the travel route 216. The return route 239 and the travel route 216 can be different.

Figure 3:
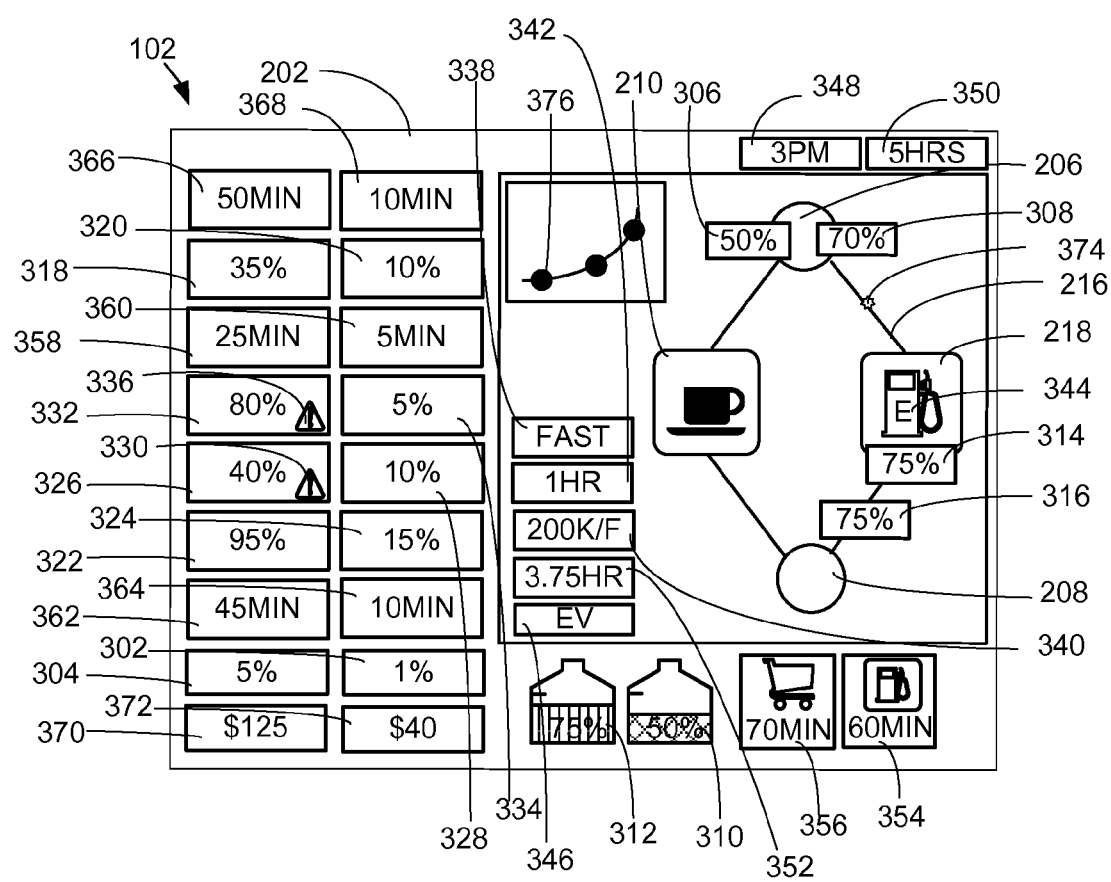
FIG. 3 is a second example of a display on the display interface of the first device.

Referring now to FIG. 3, therein is shown a second example of a display on the display interface 202 of the first device 102. The user, the navigation system 100, or the combination thereof can enter the entry 204 of FIG. 2 to the first device 102 as part of the entry 204 for the navigation system 100 to generate the travel route 216. For example, the entry 204 can include a consumption profile 340, a replenishment profile 342, or the combination thereof.

As a different example, the entry 204 can include a cost model 338, the replenishment locations 218, a replenishment reservation time 348, a predefined travel time 350, or the combination thereof. Based on the entry 204, the navigation system 100 can generate the travel route 216 to reach the destination 206. The details regarding the generation of the travel route 216 based on the entry 204 will be discussed later. The details regarding the cost model 338 will be discussed later.

The consumption profile 340 is defined as the consumption rate of resource, fuel, or the combination thereof by a transportation type 346. For example, the consumption profile 340 for the electric vehicle can be 200 kilometers per full battery capacity for traveling on the travel route 216 representing a flat road.

A replenishment type 344 is defined as the type of resource, fuel, or the combination thereof that the vehicle can replenish at one of the replenishment locations 218. For example, an electric charge to replenish the electric vehicle can be the replenishment type 344. For another example, a gasoline refueling can be the replenishment type 344.

The replenishment profile 342 is defined as the amount of time required by the vehicle to fully replenish the resource, fuel, or the combination thereof. For example, the replenishment profile 342 for the electric vehicle can be requiring 1 hour to recharge the battery fully.

A minimum resource level 302 is defined as the threshold level of the remaining resource that the navigation system 100 can allow remaining in the vehicle when the user arrives at a next location of the stopping points. For example, the minimum resource level 302 can be 1%. When selecting the next location of the replenishment locations 218, the navigation system 100 can select one of the replenishment locations 218 that allow the user's vehicle to have at least 1% of the resource remaining when the user arrives.

For a more specific example, after leaving the start location 208, the resource for the user's vehicle can remain above 1% by the time the user arrives at the first replenishment location 232 of FIG. 2. In contrast, the resource for the user's vehicle can dip below 1% by the time the user arrives at the second replenishment location 234 of FIG. 2. The navigation system 100 can select the first replenishment location 232 as the next location of the replenishment locations 218, and not the second replenishment location 234.

A minimum fuel level 304 is defined as the threshold level of the fuel for the navigation system 100 for selecting the next location of the replenishment locations 218. Similar to the minimum resource level 302, the navigation system 100 can select the next location of the replenishment locations 218 based on whether the remaining fuel in the vehicle dips below the minimum fuel level 304 upon arriving at the next location of the replenishment locations 218.

For example, the minimum fuel level 304 can be 5%. The navigation system 100 can select the next location of the replenishment locations 218 where the remaining fuel remains above the minimum fuel level 304 of 5%. Based on the minimum resource level 302 and the minimum fuel level 304, the navigation system 100 can ensure that the user will reach the next location of the replenishment locations 218 without running out of resource, fuel, or the combination thereof.

A destination resource level 306 is defined as the resource level that the user, the navigation system 100, or the combination thereof desires to have for the user's vehicle upon arriving at the destination 206. For example, the destination resource level 306 can range from 0% to 100%. For a more specific example, the destination resource level 306 can be at least 50% of full capacity of water when the user's vehicle arrives at the destination 206.

A destination fuel level 308 is defined as the fuel level that the user, the navigation system 100, or the combination thereof desires to have for the user's vehicle upon arriving at the destination 206. For example, the destination fuel level 308 can range from 0% to 100%. For a more specific example, the destination fuel level 308 can be at least 70% of full capacity for fuel when the user's vehicle arrives at the destination 206.

The transportation type 346 is defined as the type of vehicle the user can be operating for reaching the destination 206. For example, the transportation type 346 can include an electric vehicle, a hydrogen fuel cell vehicle, a biodiesel vehicle, a gasoline powered vehicle, a hybrid vehicle, a plug-in hybrid vehicle, a pressurized air vehicle, or the combination thereof.

The replenishment reservation time 348 is defined as a specific time in the day, date, or the combination thereof when the user wishes to reserve a time at one of the replenishment locations 218 to replenish the vehicle. For example, the navigation system 100 can reserve the replenishment reservation time 348 for 3 PM at the first replenishment location 232.

The predefined travel time 350 is defined as the maximum time the user wishes to spend on a travel time to reach the destination 206. For example, the user wants to allot the maximum travel time to reach Las Vegas from Los Angeles as "5 hours." The navigation system 100 can generate or set the travel route 216 for the user to reach Las Vegas within 5 hours from Los Angeles.

An estimated travel time 352 is defined as the estimation of the travel time for activities relating to the operation of the vehicle for reaching the destination 206. For a more specific definition, activities relating to the operation of the vehicle include maneuvering the vehicle, actually traversing the travel route 216, providing maintenance to the vehicle, or the combination thereof. For example, the estimated travel time 352 can include the estimation of travel time between stopping points. More specifically, the estimated travel time 352 between the start location 208 and the first intermediate stop 212 of FIG. 2 can be 40 minutes. The estimated travel time 352 can exclude an estimated replenishment time 354.

The navigation system 100 can calculate the estimated travel time 352 prior to traversing along the travel route 216. The navigation system 100 can update the estimated travel time 352 while traversing along the travel route 216. The details regarding the calculation and updating of the estimated travel time 352 will be discussed later.

The estimated replenishment time 354 is defined as the estimation of the time that will be spent for replenishing the vehicle at the replenishment locations 218. For example, the estimated replenishment time 354 for replenishing at the first replenishment location 232 and the third replenishment location 228 of FIG. 2 can be 60 minutes. As a different example, the estimated replenishment time 354 for replenishing at the first replenishment location 232 of FIG. 2 alone can be 30 minutes.

The navigation system 100 can calculate the estimated replenishment time 354 prior to traversing along the travel route 216. The navigation system 100 can update the estimated replenishment time 354 while traversing along the travel route 216. The details regarding the calculation and updating of the estimated replenishment time 354 will be discussed later.

The navigation system 100 can calculate an estimated concurrent user activity time 356. The estimated concurrent user activity time 356 is defined as the estimation of the time that will be spent on user activity other than activities relating to the operation of the vehicle. For example, the third replenishment location 228 can represent Barstow, Calif. Barstow can offer shopping opportunities at outlets for the visitors. The estimated concurrent user activity time 356 can represent the time the user spends for shopping at the outlets while the user replenishes the vehicle.

The estimated concurrent user activity time 356 can also represent the estimation of the time that the user can spend traversing along the alternate mechanism route 203 of FIG. 2 to reach the destination 206. As a different example, the estimated concurrent user activity time 356 can represent the estimation of the time that the user can spend at the destination 206 prior to returning back to the vehicle destination 298 of FIG. 2 to pick up the vehicle.

The navigation system 100 can calculate the estimated concurrent user activity time 356 prior to traversing along the travel route 216. The navigation system 100 can update the estimated concurrent user activity time 356 while traversing along the travel route 216. The details regarding the calculation and updating of the estimated concurrent user activity time 356 will be discussed later.

An estimated financial cost 370 is defined as the estimation of the amount of money that will be required for reaching the destination 206. For example, the financial cost can include cost spent on food, an estimated replenishment cost 372, or the combination thereof.

The navigation system 100 can calculate the estimated financial cost 370 prior to traversing along the travel route 216. The navigation system 100 can update the estimated financial cost 370 while traversing along the travel route 216. The details regarding the calculation and updating of the estimated financial cost 370 will be discussed later.

The estimated replenishment cost 372 is defined as the estimation of the amount of money that will be spent for replenishing the vehicle at the replenishment locations 218. For example, the estimated replenishment cost 372 for replenishing the vehicle at the first replenishment location 232 can be USD $40. As a different example, the estimated replenishment cost 372 for replenishing the vehicle at the first replenishment location 232 and the third replenishment location 228 can be $80.

The navigation system 100 can calculate the estimated replenishment cost 372 prior to traversing along the travel route 216. The navigation system 100 can update the estimated replenishment cost 372 while traversing along the travel route 216. The details regarding the calculation and updating of the estimated replenishment cost 372 will be discussed later.

The navigation system 100 can calculate an estimated resource level 310. The estimated resource level 310 is defined as the estimation of the amount of resource remaining when the vehicle reaches one of the intermediate stops 210, the replenishment locations 218, the destination 206, or the combination thereof. For example, the estimated resource level 310 after reaching Las Vegas can be 50% of the full capacity of the resource. As a different example, the estimated resource level 310 after reaching the third replenishment location 228 can be 40% of full capacity of the resource.

The navigation system 100 can calculate the estimated resource level 310 prior to traversing along the travel route 216. The navigation system 100 can update the estimated resource level 310 while traversing along the travel route 216. The details regarding the calculation and updating of the estimated resource level 310 will be discussed later.

The navigation system 100 can calculate an estimated fuel level 312. The estimated fuel level 312 is defined as the estimation for the amount of fuel remaining when the vehicle reaches one of the intermediate stops 210, the replenishment locations 218, the destination 206, or the combination thereof. For example, the estimated fuel level 312 after traversing from Los Angeles to Las Vegas can be 25% of the full capacity of the fuel. As a different example, the estimated fuel level 312 remaining after reaching the first intermediate stop 212 can be 25% of full capacity of the fuel.

The navigation system 100 can calculate the estimated fuel level 312 prior to traversing along the travel route 216. The navigation system 100 can update the estimated fuel level 312 while traversing along the travel route 216. The details regarding the calculation and updating of the estimated fuel level 312 will be discussed later.

The navigation system 100 can calculate an estimated replenishment level 314. The estimated replenishment level 314 is defined as the estimation of the amount of replenishment of the resource, fuel, or the combination thereof that the user will replenish at each of the replenishment locations 218. The estimated replenishment level 314 can represent a full replenishment or a partial replenishment. For example, to reach Las Vegas from Los Angeles, the estimated replenishment level 314 for the fuel at the first replenishment location 232 can be 100% and the third replenishment location 228 can be 75% of full capacity.

The navigation system 100 can calculate the estimated replenishment level 314 prior to traversing along the travel route 216. The navigation system 100 can update the estimated replenishment level 314 while traversing along the travel route 216. The details regarding the calculation and updating of the estimated replenishment level 314 will be discussed later.

The navigation system 100 can calculate an estimated consumption level 316. The estimated consumption level 316 is defined as the estimation of the amount of resource, fuel, or combination thereof the vehicle can require for traversing each of the travel sections 297 of FIG. 2. For example, the vehicle can require the estimated consumption level 316 of 25% of full fuel capacity for traveling the third travel section 224.

The navigation system 100 can calculate the estimated consumption level 316 prior to traversing along the travel route 216. The navigation system 100 can update the estimated consumption level 316 while traversing along the travel route 216. The details regarding the calculation and updating of the estimated consumption level 316 will be discussed later.

The navigation system 100 can verify a feasibility 374 of the entirety of the travel route 216 to reach the destination 206. The feasibility 374 is defined as the ability for the user's vehicle to reach the next of the intermediate stops 210, the replenishment locations 218, and the destination 206.

For example, the feasibility 374 can be determined by various factors. More specifically, the feasibility 374 can be based on the amount of resource, fuel, or the combination thereof in the vehicle. If the vehicle has sufficient amount of fuel to reach the first intermediate stop 212, the feasibility 374 of the first travel section 220 of FIG. 2 allows the user to reach the first intermediate stop 212. For a further example, the feasibility 374 can based on if the vehicle can have the minimum fuel level 304 for reaching the first intermediate stop 212 after traveling the first travel section 220. The travel route 216 having the feasibility 374 to traverse the travel route 216 to reach the next of the intermediate stops 210, the replenishment locations 218, or the destination 206 can be illustrated by the stars on the travel route 216. In contrast, the travel route 216 not having the feasibility 374 to traverse the travel route 216 can be illustrated by no stars on the travel route 216.

As a different example, the user or the navigation system 100, based on extracting the information, can enter the predefined travel time 350 of 2.5 hours as a time allowance for a particular travel from the start location 208 to the destination 206. For example, the start location 208 can represent Los Angeles, Calif. and the destination 206 can represent Las Vegas, Nev. The feasibility 374 of not being able to reach Las Vegas from Los Angeles under 5 hours may not allow the user to proceed with an itinerary that plans for the predefined travel time 350 of 2.5 hours. The details regarding the navigation system 100 extracting the information for the predefined travel time 350 will be discussed later.

As another example, the destination resource level 306 can be 50%. The feasibility 374 of not being able meet the destination resource level 306 of 50% after reaching the destination 206 without replenishing the vehicle at the third replenishment location 228 may not permit the itinerary that excludes the replenishment of the vehicle at the third replenishment location 228.

The navigation system 100 can also verify the feasibility 374 of the travel route 216 between each of the intermediate stops 210, the replenishment locations 218, or the combination thereof. For example, the feasibility 374 of the first travel section 220 can allow the user to reach the first intermediate stop 212 from the start location 208. As another example, the feasibility 374 of the fourth travel section 226 can allow the user to reach the destination 206 from the third replenishment location 228. Some of the other factors that determine the feasibility 374 can be based on the road condition, the availability 282 of FIG. 2 of the replenishment locations 218, or the combination thereof.

The navigation system 100 can verify the feasibility 374 of the travel route 216 prior to traversing along the travel route 216. The navigation system 100 can update the feasibility 374 of the travel route 216 while traversing along the travel route 216. The details regarding the verification and updating of the feasibility 374 will be discussed later.

The cost model 338 is defined as the pattern of consumption by the vehicle for resource, fuel, or the combination thereof selected by the navigation system 100 for reaching the destination 206. For example, the cost model 338 can include "unrestricted consumption" or "moderate consumption."

The navigation system 100 can select the cost model 338 based on the feasibility 374 of the travel route 216 for ensuring a vehicle for reaching at least one of the replenishment locations 218. For example, the user can request the shortest travel time to reach the destination 206. The feasibility 374 of the travel route 216 allows the navigation system 100 to generate the travel route 216 that includes freeways to reach the destination 206. More specifically, the navigation system 100 can select the cost model 338 that represents "unrestricted consumption" for traveling along the freeway, because the vehicle can have sufficient amount of resource, fuel, or the combination thereof to sustain a high level of consumption until reaching the destination 206. For example, the consumption profile 340 for an electric vehicle can be 200 kilometers per full battery. A high level of consumption can be a vehicle consuming 75% of a fully charged battery after traveling 100 kilometers. In contrast, a moderate level of consumption can be consuming 50% of a fully charged battery after traveling 100 kilometers.

For a further example, even if the user requests the shortest travel time to reach the destination 206, the feasibility 374 of the travel route 216 may not permit the navigation system 100 to generate the travel route 216 that only includes a freeway. More specifically, the user's hydrogen fuel cell vehicle can travel in a geographic region where the availability 282 for replenishing the hydrogen fuel cell is limited. If the user's vehicle traveled only on freeways to reach the destination 206, the vehicle can run out of fuel. To avoid running out of fuel, the navigation system 100 can generate the travel route 216 that includes local roads where the replenishment locations 218 can replenish the hydrogen fuel cell vehicle. Hence, the navigation system 100 can select the cost model 338 that represents "moderate consumption" to avoid over consumption by the vehicle of the resource, fuel, or the combination thereof for reaching the destination 206.

The navigation system 100 can calculate an actual consumption level 318. The actual consumption level 318 is defined as the actual amount of resource, fuel, or the combination thereof consumed by the vehicle for traversing the travel sections 297.

For example, prior to traveling along the travel route 216, the navigation system 100 can calculate the estimated consumption level 316 for traversing the third travel section 224 of FIG. 2 to be 25% of full fuel capacity. However, once the user traversed the third travel section 224, the actual consumption level 318 was 35%.

The navigation system 100 can calculate an actual consumption level deviation 320. The actual consumption level deviation 320 is defined as the difference between the estimated consumption level 316 and the actual consumption level 318. For example, the actual consumption level deviation 320 based from the previous example can be 10%.

The navigation system 100 can calculate an actual replenishment level 322. The actual replenishment level 322 is defined as the actual amount of resource, fuel, or the combination thereof replenished at the start location 208, the replenishment locations 218, the intermediate stops 210, the destination 206, or the combination thereof.

For example, prior to traveling along the travel route 216, the navigation system 100 can calculate the estimated replenishment level 314 for refueling at the third replenishment location 228 to be 80%. However, once the user replenished the fuel at the third replenishment location 228, the actual replenishment level 322 was 95%.

The navigation system 100 can calculate an actual replenishment level deviation 324. The actual replenishment level deviation 324 is defined as the difference between the estimated replenishment level 314 and the actual replenishment level 322. For example, the actual replenishment level deviation 324 based from the previous example can be 15%.

The navigation system 100 can calculate an actual concurrent user activity time 362. The actual concurrent user activity time 362 is defined as the actual time spent on activities other than activities related to the operation of the vehicle. For example, prior to traveling along the travel route 216, the navigation system 100 can calculate the estimated concurrent user activity time 356 for shopping at the third replenishment location 228, Barstow, to be 70 minutes. However, the actual concurrent user activity time 362 was 60 minutes, because the user arrived to the third replenishment location 228 later than originally planned.

The navigation system 100 can calculate an actual concurrent user activity time deviation 364. The actual concurrent user activity time deviation 364 is defined as the difference between the estimated concurrent user activity time 356 and the actual concurrent user activity time 362. For example, the actual concurrent user activity time deviation 364 based from the previous example can be 10 minutes.

The navigation system 100 can calculate an actual replenishment time 358 for each of the replenishment locations 218. The actual replenishment time 358 is defined as the actual amount of time the user took for replenishing the vehicle. For example, prior to traveling along the travel route 216, the navigation system 100 can calculate the estimated replenishment time 354 to replenish the fuel at the third replenishment location 228 to be 30 minutes. However, once the user replenished the fuel at the third replenishment location 228, the actual replenishment time 358 was 25 minutes.

The navigation system 100 can calculate an actual replenishment time deviation 360. The actual replenishment time deviation 360 is defined as the difference between the estimated replenishment time 354 and the actual replenishment time 358. For example, the actual replenishment time deviation 360 based from the previous example can be 5 minutes.

The navigation system 100 can calculate an actual resource level 326. The actual resource level 326 is defined as the actual amount of resource remaining after the vehicle reached one of the intermediate stops 210, the replenishment locations 218, or the destination 206. For example, the actual resource level 326 after travelling from Los Angeles to Las Vegas can be 30% of the full resource for the vehicle.

As a different example, prior to traveling along the travel route 216, the navigation system 100 can calculate the estimated resource level 310 remaining from traversing the third travel section 224 to be 40%. However, the user's vehicle can have the actual resource level 326 of 50% remaining after traversing the third travel section 224.

The navigation system 100 can calculate an actual resource level deviation 328. The actual resource level deviation 328 is defined as the difference between the estimated resource level 310 and the actual resource level 326. For example, the actual resource level deviation 328 based from the previous example can be 10%.

The navigation system 100 can detect a low resource level 330. The low resource level 330 is defined as the status of vehicle's resource level where the resource level dips below a threshold. The threshold can be the minimum resource level 302. For example, if the actual resource level 326 dips under 3% of the full capacity, the navigation system 100 can detect the low resource level 330.

The navigation system 100 can calculate an actual fuel level 332. The actual fuel level 332 is defined as the actual amount of fuel remaining after the vehicle reached one of the intermediate stops 210, the replenishment locations 218, or the destination 206. For example, the actual fuel level 332 after traveling from Los Angeles to Las Vegas can be 25% of the full capacity of the fuel for the vehicle.

As a different example, prior to traveling along the travel route 216, the navigation system 100 can calculate the estimated fuel level 312 remaining after traversing the third travel section 224 to be 25%. However, the user's vehicle can have the actual fuel level 332 of 20% remaining after traversing the third travel section 224.

The navigation system 100 can calculate an actual fuel level deviation 334. The actual fuel level deviation 334 is defined as the difference between the estimated fuel level 312 and the actual fuel level 332. For example, the actual fuel level deviation 334 based from the previous example can be 5%. The details regarding the calculation of the actual fuel level deviation 334 will be discussed later.

The navigation system 100 can detect a low fuel level 336. The low fuel level 336 is defined as the status of vehicle's fuel level where the fuel level dips below a threshold. The threshold can be the minimum fuel level 304. For example, if the actual fuel level 332 dips under 5% of the full capacity, the navigation system 100 can detect the low fuel level 336.

The navigation system 100 can calculate an actual travel time 366. The actual travel time 366 is defined as the actual time spent on activities relating to the operation of the vehicle for reaching the destination 206. For a more specific definition, activities relating to the operation of the vehicle include maneuvering the vehicle, replenishing the vehicle, providing maintenance to the vehicle, or the combination thereof. For example, the actual travel time 366 can represent the travel time spent by the user's vehicle traveling between stopping points. As a more specific example, the actual travel time 366 between the start location 208 and the first intermediate stop 212 can be 50 minutes. The actual travel time 366 can exclude the actual replenishment time 358.

The navigation system 100 can calculate an actual travel time deviation 368. The actual travel time deviation 368 is defined as the difference between the estimated travel time 352 and the actual travel time 366. For example, the navigation system 100 can calculate the estimated travel time 352 between the start location 208 and the first intermediate stop 212 to be 40 minutes. Continuing from the previous example for the actual travel time 366, the actual travel time deviation 368 can be 10 minutes.

The navigation system 100 can apply the same algorithm to calculate the estimated resource level 310, the estimated replenishment level 314, the estimated concurrent user activity time 356, or the combination thereof for the travel route 216 to calculate for the return route 239 of FIG. 2. The navigation system 100 can also apply the same algorithm to calculate the estimated replenishment time 354, the estimated fuel level 312, or the combination thereof for the travel route 216 to calculate for the return route 239. The navigation system 100 can also apply the same algorithm to calculate the estimated overall time, the estimated travel time 352, or the combination thereof for the travel route 216 to calculate for the return route 239.

The navigation system 100 can apply the same algorithm to calculate the actual travel time 366, the actual replenishment time 358, the actual fuel level 332, the actual resource level 326, or the combination thereof for the travel route 216 to calculate for the return route 239. The navigation system 100 can also apply the same algorithm to calculate the actual replenishment level 322, the actual concurrent user activity time 362, or the combination thereof for the travel route 216 to calculate for the return route 239.

The navigation system 100 can apply the same algorithm to calculate the actual travel time deviation 368, the actual replenishment time deviation 360, the actual fuel level deviation 334, or the combination thereof for the travel route 216 to calculate for the return route 239. The navigation system 100 can apply the same algorithm to calculate the actual resource level deviation 328, the actual replenishment level deviation 324, and the actual concurrent user activity time deviation 364 for the travel route 216 for calculating the return route 239.

Figure 4:
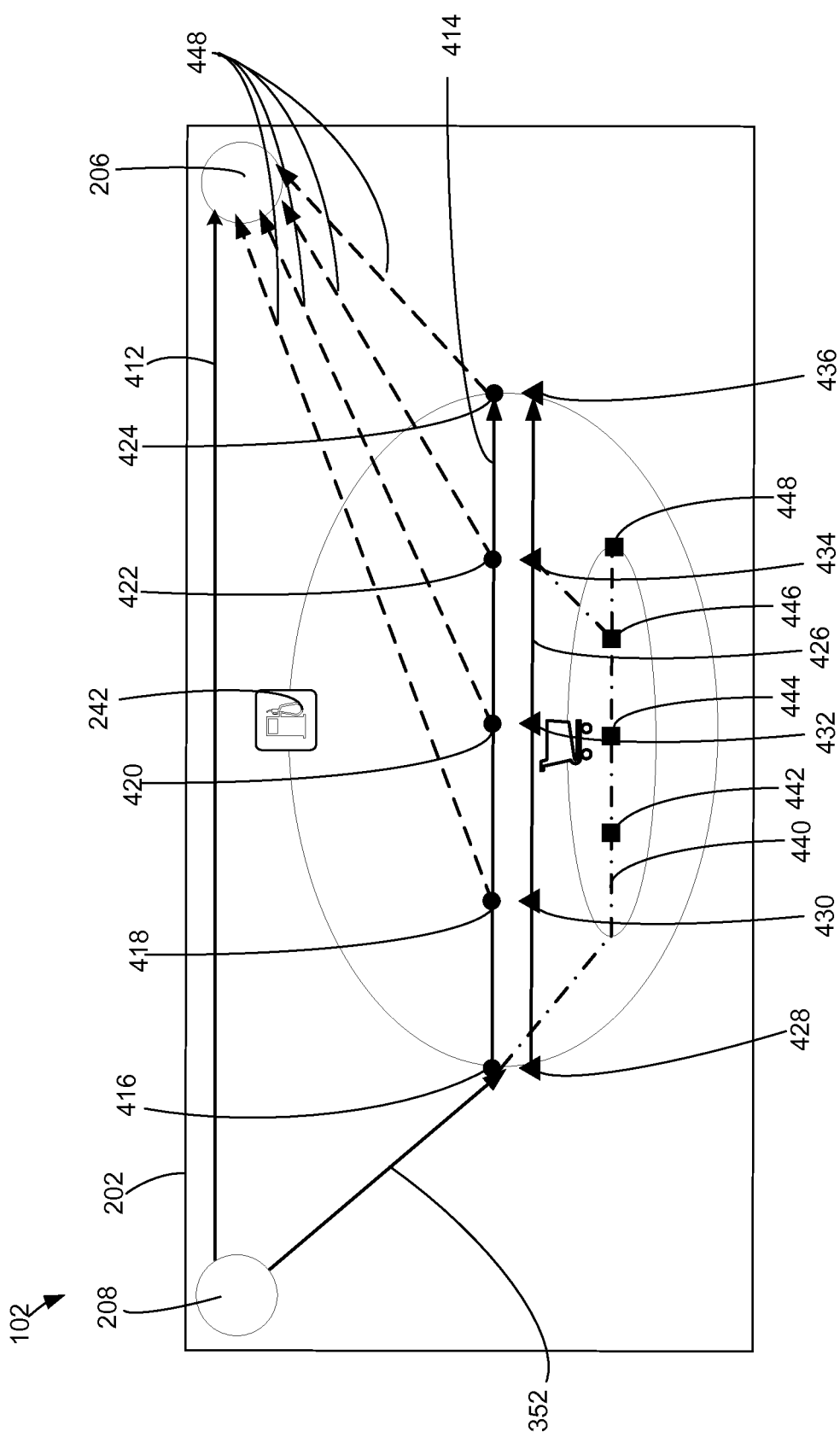
FIG. 4 is an example of the replenishment activity at one of stopping points along the route before reaching the target destination.

Referring now to FIG. 4, therein is shown an example of the replenishment activity at one of stopping points along the route before reaching the target destination. The geographic view can include the start location 208, one of the replenishment locations 218 of FIG. 2, and the destination 206. The navigation system 100 can calculate the estimated travel time 352, the estimated financial cost 370 of FIG. 3, or the combination thereof from one stopping point to another stopping point along the travel route 216 of FIG. 2. For example, the navigation system 100 can calculate the estimated travel time 352 from the start location 208 to the first replenishment location 232.

The display interface 202 can display a vehicle performance combination 376. The vehicle performance combination 376 is defined as a combination of resource or fuel with a travel cost to maximize a balance performance to reach the next stopping point. For example, the vehicle performance combination 376 can include a combination between the estimated resource level 310 and the estimated travel time 352. For another example, the vehicle performance combination 376 can include the combination between the estimated fuel level 312 and the estimated financial cost 370.

The navigation system 100 can track a replenishment level tracker 414. The replenishment level tracker 414 is defined as the monitoring of the estimated amount or actual amount for the replenishment of the vehicle at one of the replenishment locations 218. The replenishment level tracker 414 can include an arrival level 416, a first partial replenishment level 418, a second partial replenishment level 420, a third partial replenishment level 422, and a maximum replenishment level 424. For example, the replenishment level tracker 414 can track the amount of resource, fuel, or the combination thereof replenished by the user at each replenishment opportunity.

The arrival level 416 is defined as the estimated amount or the actual amount of resource, fuel, or the combination thereof of the vehicle when the user arrives at one of the stopping points along the travel route 216. For example, the arrival level 416 can represent the estimated resource level 310 of FIG. 3, the estimated fuel level 312 of FIG. 3, or the combination thereof. For a specific example, the user can arrive at the first replenishment location 232 with 6% remaining fuel.

The first partial replenishment level 418, the second partial replenishment level 420, and the third partial replenishment level 422 is each defined as the estimated level or the actual level of partial replenishment for the resource, fuel, or the combination thereof of the vehicle at each replenishment opportunity. For example, the first partial replenishment level 418 can represent the estimated fuel level 312 of 25% replenishment of fuel. As a different example, the second partial replenishment level 420 can represent the estimated resource level 310 of 50% replenishment of resource. The navigation system 100 can track the first partial replenishment level 418, the second partial replenishment level 420, and the third partial replenishment level 422 from the arrival level 416.

The maximum replenishment level 424 is defined as estimated level or the actual level representing the full replenishment of the resource, fuel, or the combination thereof of the vehicle at each replenishment opportunity. For example, the maximum replenishment level 424 can be 100% replenishment of the fuel. More specifically, the navigation system 100 can track the maximum replenishment level 424 from the arrival level 416.

The navigation system 100 can track a replenishment timeline 426. The replenishment timeline 426 is defined as the monitoring of the estimated time or actual time to replenish the resource, fuel, or the combination thereof at one of the replenishment locations 218. The replenishment timeline 426 can include an arrival time 428, a first replenishment time 430, a second replenishment time 432, a third replenishment time 434, and a fourth replenishment time 436. For example, the replenishment timeline 426 can track the amount of time the vehicle took to replenish the resource, fuel, of the combination thereof at the first replenishment location 232.

The arrival time 428 is defined as the time when the user arrives at one of the stopping points. For example, the arrival time 428 for reaching the first replenishment location 232 can be 12:00 PM.

The first replenishment time 430, the second replenishment time 432, the third replenishment time 434, and the fourth replenishment time 436 is each defined as the estimated time the vehicle can take or the actual time the vehicle took to replenish the resource, fuel, or the combination thereof. For example, the second replenishment time 432 can represent that the user took 30 minutes to replenish up to the second partial replenishment level 420. As a different example, the navigation system 100 can track the first replenishment time 430, the second replenishment time 432, the third replenishment time 434, and the fourth replenishment time 436 from the arrival time 428 at the first replenishment location 232.

The navigation system 100 can calculate a remainder 438 of the travel route 216. The remainder 438 is defined as the remaining portion of the travel route 216 after the user stopped by a stopping point along the travel route 216. For example, after the user stopped by the third replenishment location 228, the remainder 438 of the travel route 216 can include the fourth travel section 226 of FIG. 2 to reach the destination 206.

The navigation system 100 can generate the travel route 216 based on a full or a partial replenishment of the resource, fuel, or the combination thereof at each replenishing opportunity. For example, the navigation system 100 can generate the travel route 216 based on a full or a partial replenishment of fuel at the first replenishment location 232.

For the first example, prior to reaching the first replenishment location 232, the navigation system 100 can calculate that the estimated fuel level 312 of arriving at the first replenishment location 232 from the start location 208 to be near empty. The arrival level 416 can represent the estimated fuel level 312 as near empty. Based on the estimated fuel level 312, the navigation system 100 can calculate that the estimated replenishment level 314 at the first replenishment location 232 to be the maximum replenishment level 424. The navigation system 100 can calculate the estimated fuel level 312 to be 100% after replenishing at the first replenishment location 232.

The navigation system 100 can calculate the estimated replenishment time 354 for replenishing the vehicle up to the maximum replenishment level 424. For example, the fourth replenishment time 436 can represent the estimated replenishment time 354. The fourth replenishment time 436 can be one hour. The estimated replenishment time 354 to replenish to the maximum replenishment level 424 can be one hour.

The navigation system 100 can generate the remainder 438 of the travel route 216 based on the estimated fuel level 312. For example, based on the estimated fuel level 312 of 100% after replenishing at the first replenishment location 232, the navigation system 100 can generate the remainder 438 to be the third travel section 224 of FIG. 2 and the fourth travel section 226 to reach the destination 206.

For the second example, after reaching the first replenishment location 232, the navigation system 100 can calculate the actual fuel level 332 of FIG. 3 to be near empty. The arrival level 416 can represent the actual fuel level 332 to be near empty. Rather than replenishing the vehicle at the maximum replenishment level 424 to fully replenish the vehicle, the user can replenish the vehicle up to the first partial replenishment level 418. The first partial replenishment level 418 can represent the actual replenishment level 322 of FIG. 3.

The first replenishment time 430 can represent the actual replenishment time 358 of FIG. 3. For example, while the user is at the first replenishment location 232, the navigation system 100 can calculate the actual replenishment time 358 to replenish the vehicle up to the first partial replenishment level 418. The actual replenishment time 358 to replenish to the first partial replenishment level 418 can be 15 minutes.

The navigation system 100 can update the remainder 438 of the travel route 216 based on the actual fuel level 332 after user replenished the vehicle up to the first partial replenishment level 418. For example, after the partial replenishment at the first replenishment location 232, the actual fuel level 332 can be 25% full. If the estimated fuel level 312 was 100% after replenishing at the first replenishment location 232, the remainder 438 of the travel route 216 was the third travel section 224 and the fourth travel section 226 to the destination 206. For this example, in contrast, based on the actual fuel level 332 of 25%, the navigation system 100 can update the remainder 438 from the first replenishment location 232 to include the sixth travel section 292, the seventh travel section 294 of FIG. 2, and the fourth travel section 226 to reach the destination 206. Because the user only partially refueled the vehicle at the first replenishment location 232, the navigation system 100 can update the remainder 438 to require the user to stop by the fourth replenishment location 236 for replenishment prior to reaching the destination 206.

The navigation system 100 can track a concurrent user activity time tracker 440. The concurrent user activity time tracker 440 is defined as the monitoring of the estimated time or actual time spent for activities unrelated to the operation of the vehicle. The concurrent user activity time tracker 440 can include a first concurrent user activity time 442, a second concurrent user activity time 444, a third concurrent user activity time 446, and a fourth concurrent user activity time

448. For example, the concurrent user activity time tracker 440 can track the time user spent shopping at the first replenishment location 232.

The first concurrent user activity time 442, the second concurrent user activity time 444, the third concurrent user activity time 446, and the fourth concurrent user activity time 448 are each defined as the estimated time the user can take or the actual time the user took for activities unrelated to the operation of the vehicle. For example, the third concurrent user activity time can represent that the user took 45 minutes shopping at the first replenishment location 232. More specifically, the navigation system 100 can track the first concurrent user activity time 442, the second concurrent user activity time 444, the third concurrent user activity time 446, and the fourth concurrent user activity time 448 from the arrival time 428 at the first replenishment location 232.

Figure 5:
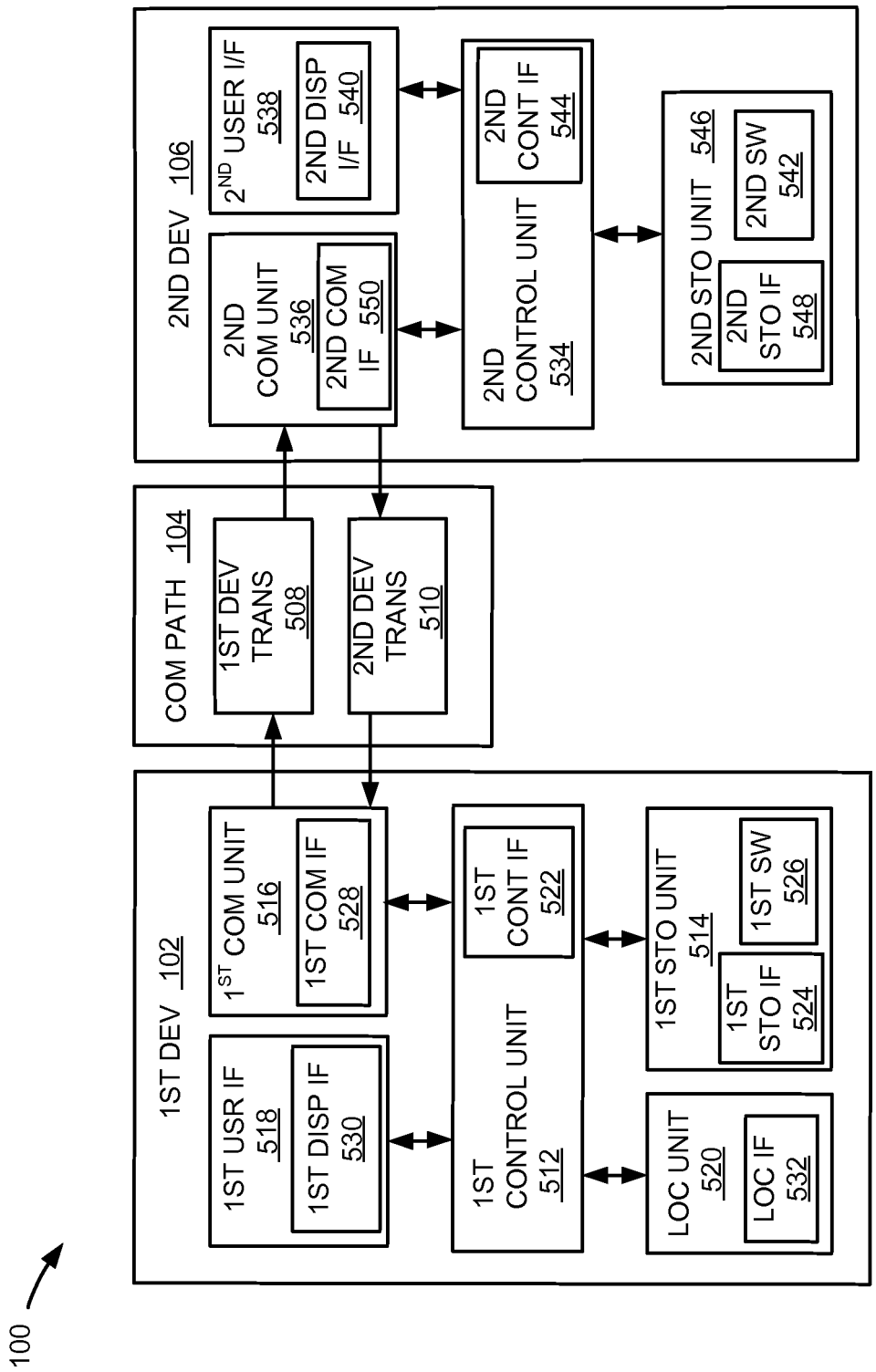
FIG. 5 is an exemplary block diagram of the navigation system.

Referring now to FIG. 5, therein is shown an exemplary block diagram of the navigation system 100. The navigation system 100 can include the first device 102, the communication path 104, and the second device 106. The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, a first user interface 518, and a location unit 520. The first device 102 can be similarly described by the first device 102.

The first control unit 512 can include a first control interface 522. The first control unit 512 can execute a first software 526 to provide the intelligence of the navigation system 100. The first control unit 512 can be implemented in a number of different manners. For example, the first control unit 512 can be a processor, an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The location unit 520 can generate location information, current heading, and current speed of the first device 102, as examples. The location unit 520 can be implemented in many ways. For example, the location unit 520 can function as at least a part of a global positioning system (GPS), an inertial navigation system, a cellular-tower location system, a pressure location system, or any combination thereof.

The location unit 520 can include a location interface 532. The location interface 532 can be used for communication between the location unit 520 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations external to the first device 102.

The location interface 532 can include different implementations depending on which functional units or external units are being interfaced with the location unit 520. The location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof.

The first storage unit 514 can be a volatile memory, a nonvolatile memory, an internal memory, an external memory, or a combination thereof. For example, the first storage unit 514 can be a nonvolatile storage such as nonvolatile random access memory (NVRAM), Flash memory, disk storage, or a volatile storage such as static random access memory (SRAM).

The first storage unit 514 can include a first storage interface 524. The first storage interface 524 can be used for communication between the location unit 520 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, or any combination thereof to provide data and communication inputs.

The first user interface 518 can include a first display interface 530. Examples of the first display interface 530 can include the display interface 202 of FIG. 2. The first display interface 530 can include a display, a projector, a video screen, a speaker, or any combination thereof. The screen shot shown on the display interface 202 described in FIG. 2 can represent the screen shot for the navigation system 100.

The first control unit 512 can operate the first user interface 518 to display information generated by the navigation system 100. The first control unit 512 can also execute the first software 526 for the other functions of the navigation system 100, including receiving location information from the location unit 520. The first control unit 512 can further execute the first software 526 for interaction with the communication path 104 via the first communication unit 516.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between the location unit 520 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 520, although it is understood that the second device 106 can also operate the location unit 520.

Figure 6:
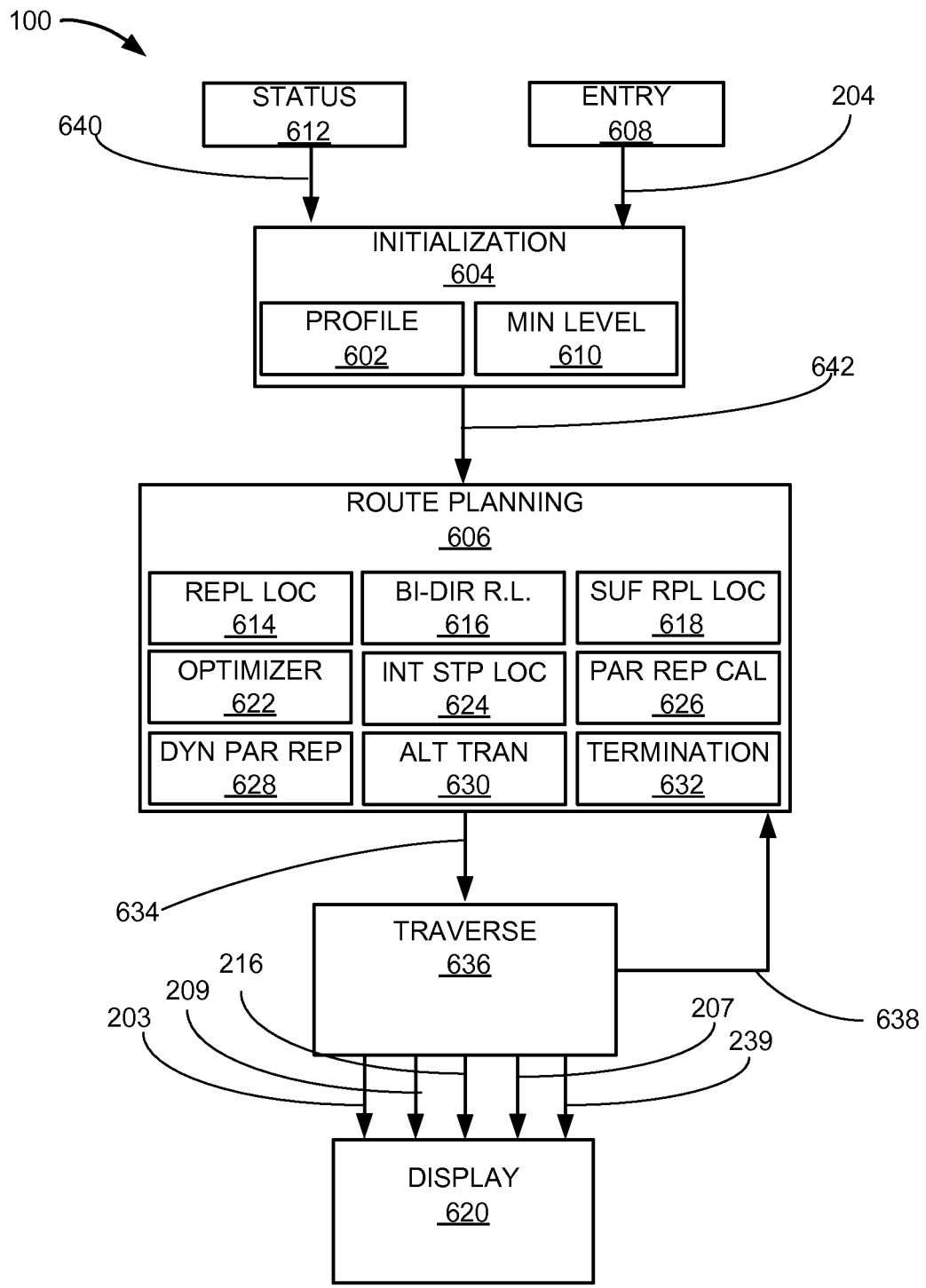
FIG. 6 is a flow of the navigation system.

Referring now to FIG. 6, therein is shown a flow of the navigation system 100. The navigation system 100 can include an entry module 608. The entry module 608 receives the user's entry for the navigation system 100 to generate a route to the target destination. For example, the entry module 608 can receive the entry 204 of FIG. 2 for a route planning module 606 to generate the travel route 216 to the intermediate stops 210 of FIG. 2, the destination 206 of FIG. 2, or the combination thereof. The entry module 608 can also receive the entry 204 of FIG. 2 for the alternate transportation 201 of FIG. 2. The details regarding the route planning module 606 will be discussed later.

The entry module 608 can receive the entry 204 in a number of ways. For example, the entry module 608 can receive the entry 204 as an audio input, a selection from the list, or the combination thereof. More specifically, the user can enter in Los Angeles, Calif. as the entry 204 for the start location 208 of FIG. 2. The user can select Las Vegas, Nev. as the entry 204 for the destination 206 from a list provided by the entry module 608.

The navigation system 100 can include a status module 612. The status module 612 supplies the status information of the vehicle. For example, the status module 612 can provide a vehicle information 640 to the route planning module 606 for generating the travel route 216. The vehicle information 640 is defined as the current status of resource, fuel, or the combination thereof of the vehicle. For example, the vehicle information 640 for the resource, fuel, or the combination thereof at the current location 242 of FIG. 2 can be full or partially full. For a further example, the status module 612 can provide the vehicle information 640 having the actual resource level 326 of FIG. 3, the actual fuel level 332 of FIG. 3, or the combination thereof for the vehicle at the current location 242.

The status module 612 can detect the low resource level 330 of FIG. 3, the low fuel level 336 of FIG. 3, or the combination thereof for tracking a vehicle along the travel route 216. For example, the detection can be based on the navigation system 100 checking the resource tank and fuel tank of the vehicle. The status module 612 can provide the low resource level 330 and the low fuel level 336 as part of the vehicle information 640.

The status module 612 can include the information for the transportation type 346 of FIG. 3. The information can include the manufacture specification for the transportation type 346. The status module 612 can send the vehicle information 640 to an initialization module 604.

The navigation system 100 can include the initialization module 604. The initialization module 604 defines the condition required for the generation of the travel route 216 by the route planning module 606. The initialization module 604 can generate a route planning condition 642. The route planning condition 642 is defined as a factor or factors pertaining to the operation of the vehicle required by the route planning module 606 to generate the travel route 216. The factors can include the consumption profile 340 of FIG. 3, the replenishment profile 342 of FIG. 3, the predefined travel time 350 of FIG. 3, the replenishment reservation time 348 of FIG. 3, or the combination thereof. The initialization module 604 can send the minimum resource level 302 of FIG. 3, the minimum fuel level 304 of FIG. 3, the destination resource level 306 of FIG. 3, the destination fuel level 308 of FIG. 3, or the combination thereof.

The initialization module 604 can generate the route planning condition 642 in a number of ways. For example, the initialization module 604 can include a profile module 602. The profile module 602 generates the profile of the user's vehicle for the navigation system 100 to base the generation of a route to reach the destination 206 of FIG. 2. For example, the profile module 602 can generate the consumption profile 340, the replenishment profile 342, or the combination thereof for the transportation type 346.

The profile module 602 can generate the consumption profile 340, the replenishment profile 342, or the combination thereof in a number of ways. For example, the profile module 602 can initially be populated by preloading the data provided by the manufacturer of the vehicle, by user entering the data, or the combination thereof. More specifically, the manufacture can upload the consumption profile 340 and the replenishment profile 342 from a manufacture specification for the vehicle from a data file, such as a compact disc (CD) or a digital versatile disc (DVD), into the profile module 602.

As a more specific example, the transportation type 346 of the vehicle can be electric vehicle. The consumption profile 340 according to the manufacture specification for the electric vehicle can travel 200 kilometers per full fuel. The replenishment profile 342 according to the manufacture specification for the electric vehicle can require 1 hour for the vehicle to replenish the battery fully. The manufacture specification for the consumption profile 340 and the replenishment profile 342 can be the default profile for the user's vehicle.

As a different example, the profile module 602 can update the consumption profile 340 while the vehicle is traveling along the travel route 216. For a specific example, the profile module 602 can update the consumption profile 340 based on the road condition of the travel route 216. More specifically, if the road condition is a flat road, the consumption profile 340 for the vehicle can be 200 kilometers per full fuel as specified by the manufacturer specification.

In contrast, if the road condition is slippery, the consumption profile 340 can degrade. More specifically, the profile module 602 can update the consumption profile 340 for traveling on the steep hill by calculating the ratio between how much the user is pressing down on the accelerator of vehicle to how fast the vehicle is traveling in relation to the amount of force which the accelerator is being pressed down. For example, the consumption profile 340 for traveling on the steep hill can degrade to 50 kilometer per full fuel.

The profile module 602 can update the replenishment profile 342 based on factoring various conditions. For example, the profile module 602 can generate the replenishment profile 342 based on the voltage and the current of the electricity at the replenishment locations 218 for replenishing an electric vehicle. More specifically, the standard voltage for recharging an electric vehicle in the United States can be 120 volts. If the voltage is 120 volts, the profile module 602 can generate the replenishment profile 342 to be at 1 hour for fully replenishing an empty battery as specified by the manufacturer. In contrast, some of the replenishment locations 218 can provide a recharge at 220 volts of higher current for faster recharge. If the voltage is 220 volts, the profile module 602 can update the replenishment profile 342 to be at 30 minutes for fully replenishing an empty battery.

The voltage and current of the electricity can differ from one of the replenishment locations 218 to another. By detecting the change in the voltage at particular location of the replenishment locations 218, the profile module 602 can update the replenishment profile 342 according to the change in the voltage.

As another example, the user can enter the consumption profile 340 as part of the entry 204. For example, the entry module 608 can receive the consumption profile 340 for the transportation type 346 by the user entering "200 kilometers per full fuel" as the entry 204.

The user can enter the replenishment profile 342 as part of the entry 204. For example, the entry module 608 can receive the replenishment profile 342 by the user entering "1 hour" as the entry 204. The initialization module 604 can send the consumption profile 340 and the replenishment profile 342 as part of the route planning condition 642.

The initialization module 604 can include a minimum level module 610. The minimum level module 610 calculates the minimum level of resource, fuel, or the combination thereof required by the vehicle for reaching the target destination. For example, the minimum level module 610 can calculate the minimum resource level 302, the minimum fuel level 304, the destination resource level 306, the destination fuel level 308, or the combination thereof.

The minimum level module 610 can calculate the minimum resource level 302 in a number of ways. For example, the minimum level module 610 can raise the minimum resource level 302 for the resource representing water by factoring the increase of the consumption profile for water due to a hot weather condition.

More specifically, the navigation system 100 can receive a weather report for a temperature around the geographic region where the vehicle with the navigation system 100 can travel to be 100 degrees Fahrenheit. The consumption profile 340 of water for the electric vehicle according to the manufacture specification can be 0.5 gallon per mile under a 58 degrees Fahrenheit. Additionally, the manufacture specification can indicate that the minimum amount of water required for safe operation of the electric vehicle to be 5% of full capacity. The safe operation of the vehicle can include operating the vehicle without overheating. According to the manufacture specification, the minimum level module 610 can calculate the minimum resource level 302 to be 5%.

In contrast, the consumption profile 340 of water for user's electric vehicle under a 100 degrees Fahrenheit can degrade to 1 gallon per mile. To avoid the vehicle from overheating, the minimum level module 610 can raise the minimum resource level 302 for water to be 20% to ensure the vehicle can reach one of the replenishment locations 218 without overheating and to accommodate for potential rapid evaporation of water.

The minimum level module 610 can also calculate the minimum fuel level 304 in a number of ways. For example, the minimum level module 610 can decrease the minimum fuel level 304 for the fuel representing electricity by factoring the improvement of the consumption profile due to a road condition that is primarily downhill.

More specifically, the manufacture specification can indicate that the minimum amount of electricity required in the battery to safely operate the electric vehicle to be 10% of full capacity if the vehicle was to travel on the flat road condition. The safe operation of the electric vehicle can include starting the vehicle for operation. According to the manufacture specification, the minimum level module 610 can calculate the minimum fuel level 304 to be 10%.

In contrast, the consumption profile 340 of electricity for the electric vehicle can improve from 200 kilometers per full fuel to 350 kilometers per full fuel if the vehicle is traveling downhill. Furthermore, the electric vehicle can regenerate more electricity and consume less electricity while the vehicle is traveling downhill compared to if the vehicle was to travel on a flat road condition. The minimum level module 610 can decrease the minimum fuel level 304 by factoring the vehicle's ability to regenerate the electricity more frequently.

The minimum level module 610 can calculate the destination resource level 306 in a number of ways. For example, the minimum level module 610 can calculate the destination resource level 306 by calculating the minimum amount of resource required to reach the nearest location of the replenishment locations 218 from the destination 206. More specifically, if the destination 206 included a place for replenishment for water, the destination resource level 306 can be equivalent to the minimum resource level 302.

In contrast, if the user's vehicle cannot replenish water at the destination 206, the minimum level module 610 can calculate the amount of water required to reach the nearest of the replenishment locations 218 as the destination resource level 306. The locations of the replenishment locations 218 can be obtained from a map. The amount of water required to reach the nearest of the replenishment locations 218 can be calculated by dividing the consumption profile 340 from the distance to the nearest of the replenishment locations 218 from the destination 206.

The minimum level module 610 can calculate the destination fuel level 308 in a number of ways. The process for calculating the destination fuel level 308 can be similar to the destination resource level 306. For example, the minimum level module 610 can calculate the destination fuel level 308 equivalent to the minimum fuel level 304. As a different example, the minimum level module 610 can calculate the amount of fuel required to reach the nearest of the replenishment locations 218 as the destination fuel level 308.

The entry module 608 can receive the entry 204 representing the minimum resource level 302, the minimum fuel level 304, the destination resource level 306, the destination fuel level 308, or the combination thereof. For example, the entry module 608 can receive the minimum resource level 302 by the user entering "1%" as the entry 204. As a different example, the entry module 608 can receive the minimum fuel level 304 by the user entering "5%" as the entry 204. As another example, the entry module 608 can receive the destination fuel level 308 by the user entering "50%" as the entry 204. The minimum resource level 302 can generate the minimum resource level 302, the minimum fuel level 304, the destination resource level 306, the destination fuel level 308, or the combination thereof based on the content of the entry 204.

The initialization module 604 can send the consumption profile 340, the replenishment profile 342, the predefined travel time 350, the replenishment reservation time 348, or the combination thereof as the route planning condition 642 to the route planning module 606. The initialization module 604 can send the minimum resource level 302, the minimum fuel level 304, the destination resource level 306, the destination fuel level 308, or the combination thereof as the route planning condition 642 to the route planning module 606.

The navigation system 100 can include the route planning module 606. The route planning module 606 generates various routes for the user to traverse along to reach the target destination.

The route planning module 606 can include a replenishment locator module 614. The replenishment locator module 614 generates the replenishment route 209 with locations for replenishment given some constraints. The route planning module 606 can also include a bi-directional replenishment locator module 616. The bi-directional replenishment locator module 616 operates with the replenishment locator module 614 to search for replenishment in the reverse direction from the destination to provide a bi-directional search. More details regarding the replenishment locator module 614 and the bi-directional replenishment locator module 616 will be discussed later.

The route planning module 606 can also include a sufficient replenishment locator module 618. The sufficient replenishment locator module 618 generate the travel route 216 to the destination through the sufficient number 280 of one or more of the replenishment locations 218 required to reach the destination 206 for displaying on the first device 102 of FIG. 1. The route planning module 606 can further include an optimizer module 622. The optimizer module 622 performs the function of the sufficient replenishment locator module 618 and removes nodes not needed if there is another node with the same graph node identification and with greater charge but less cost. The sufficient replenishment locator module 618 and the optimizer module 622 will be described in detail later.

The route planning module 606 can further include an intermediate stop locator module 624. The intermediate stop locator module 624 generates the travel route 216 that traverses through the intermediate stops 210 to reach the destination 206. The intermediate stop locator module 624 will be described in detail later.

The route planning module 606 can also include a partial replenishment calculator module 626. The partial replenishment calculator module 626 generates the travel route 216 taking into account partial replenishment at the replenishment locations. The route planning module 606 further includes a dynamic partial replenishment calculator module 628. The dynamic partial replenishment calculator module 628 is a variation of the partial replenishment calculator module 626 taking to fixed cost and linear cost with partial replenishment. The partial replenishment calculator module 626 and the dynamic partial replenishment calculator module 628 will be described later.

The route planning module 606 can include an alternate transportation module 630. The alternate transportation module 630 generates the alternate mechanism route 203 to reach the destination 206 with the alternate transportation 201. The route planning module 606 can include a termination module 632. The termination module 632 verifies the destination 206 includes a replenishment location or has vehicle using the navigation system 100 has sufficient charge to reach a replenishment location from the destination 206. The termination module 632 generates the return route 239. More details regarding the alternate transportation module 630 and the termination module 632 will be discussed later.

The route planning module 606 calculates a generated route 634. The generated route 634 is the route generated depending upon the submodules executed in the route planning module 606 and is the route including the start location 208, the intermediate stops 210, the replenishment locations 218, the destination 206, or the combination thereof. The generated route 634 includes the travel route 216, the alternate mechanism route 203, the replenishment route 209, the recovery route 207, the return route 239, or the combination thereof.

The navigation system 100 can include a traverse module 636. The traverse module 636 monitors the traversal of the travel route 216 or the replenishment route 209 generated from the route planning module 606. The traverse module 636 detects a deviation from the travel route 216 or the replenishment route 209 and loops back to the route planning module 606 for corrections or for generating the recovery route 207. For example, the traverse module 636 can detect the route deviation 205 of FIG. 2.

The traverse module 636 calculates the actual consumption level deviation 320, the actual replenishment level deviation 324 of FIG. 3, the actual concurrent user activity time deviation 364 of FIG. 3, or the actual replenishment time deviation 360 of FIG. 3 and compares to its respective estimated values and determines if a route correction 638 is required by executing the route planning module 606. The route correction 638 is defined as a decision by the traverse module 636 that the generated route 634 being traversed needs a correction resulting in an execution of the route planning module 606. The traverse module 636 calculates the actual resource level deviation 328 of FIG. 3, the actual fuel level deviation 334 of FIG. 3, or the actual travel time deviation 368 of FIG. 3 and compares to its respective estimated values and determines if the route correction 638 is required by executing the route planning module 606.

The navigation system 100 can include a display module 620. The display module 620 displays the route generated by the route planning module 606. For example, the display module 620 can display the travel route 216, the alternate mechanism route 203, the replenishment route 209, the recovery route 207, the return route 239, or the combination thereof.

The physical transformation from generating the generated route 634 to the target destination by factoring the entry 204, the vehicle information 640, and the route planning condition 642 results in movements in the physical world, such as people using the first device 102 of FIG. 1, vehicles, or the combination thereof, based on the operation of the navigation system 100. As the movement in the physical world occurs, the movement itself creates additional information that is converted back to the generated route 634 for the continued operation of the navigation system 100 and continues the movement in the physical world.

It has been discovered that the present invention provides the navigation system 100 for providing safe operation of the navigation system 100 and other user interface system within a vehicle. The safe operation is provided by generating the travel route 216 to the destination 206 through the sufficient number 280 of one or more of the replenishment locations 218 required to reach the destination 206 to aid the user for operating the vehicle to travel along the travel path safely.

The first software 526 of FIG. 5 of the first device 102 of FIG. 5 can include the navigation system 100. For example, the first software 526 can include the status module 612, the initialization module 604, the route planning module 606, and the traverse module 636.

The entry module 608 can represent the first user interface 518 of FIG. 5. The entry 204 can be entered or selected into the first user interface 518.

The first control unit 512 of FIG. 5 can execute the first software 526 for the status module 612 to generate and send the vehicle information 640 to the initialization module 604. The first control unit 512 can execute the first software 526 for the initialization module 604 to receive the vehicle information 640. The first control unit 512 can execute the first software 526 for the entry module 608 to send the entry 204 to the initialization module 604. The first control unit 512 can execute the first software 526 for the initialization module 604 to receive the entry 204.

The first control unit 512 can execute the first software 526 for the initialization module 604 to generate and send the route planning condition 642 to the route planning module 606. The first control unit 512 can execute the first software 526 for the route planning module 606 to receive the route planning condition 642.

The first control unit 512 can execute the first software 526 for the route planning module 606 to generate and send the generated route 634 to the traverse module 636. The first control unit 512 can execute the first software 526 for the traverse module 636 to receive the generated route 634.

The first control unit 512 can execute the first software 526 for the traverse module 636 to generate and send the route correction 638. The first control unit 512 can execute the first software 526 for the route planning module 606 to receive the route correction 638.

The first control unit 512 can execute the first software 526 for the traverse module 636 to send the travel route 216, the alternate mechanism route 203, the replenishment route 209, the recovery route 207, the return route 239, or the combination thereof to the display module 620. The first control unit 512 can execute the first software 526 for the display module 620 to receive the travel route 216, the alternate mechanism route 203, the replenishment route 209, the recovery route 207, the return route 239, or the combination thereof.

The display module 620 can represent the first display interface 530 of FIG. 5. The first control unit 512 can execute the first software 526 for the first display interface 530 to display the travel route 216, the alternate mechanism route 203, the replenishment route 209, the recovery route 207, the return route 239, or the combination thereof.

The second software 542 of FIG. 5 of the second device 106 of FIG. 5 can include the navigation system 100. For example, the second software 542 can include the status module 612, the initialization module 604, the route planning module 606, and the traverse module 636.

The entry module 608 can represent the second user interface 538 of FIG. 5. The entry 204 can be entered or selected into the second user interface 538.

The second control unit 534 of FIG. 5 can execute the second software 542 for the status module 612 to generate and send the vehicle information 640 to the initialization module 604. The second control unit 534 can execute the second software 542 for the initialization module 604 to receive the vehicle information 640. The second control unit 534 can execute the second software 542 for the entry module 608 to send the entry 204 to the initialization module 604. The second control unit 534 can execute the second software 542 for the initialization module 604 to receive the entry 204.

The second control unit 534 can execute the second software 542 for the initialization module 604 to generate and send the route planning condition 642 to the route planning module 606. The second control unit 534 can execute the second software 542 for the route planning module 606 to receive the route planning condition 642.

The second control unit 534 can execute the second software 542 for the route planning module 606 to generate and send the generated route 634 to the traverse module 636. The second control unit 534 can execute the second software 542 for the traverse module 636 to receive the generated route 634.

The second control unit 534 can execute the second software 542 for the traverse module 636 to generate and send the route correction 638. The second control unit 534 can execute the second software 542 for the route planning module 606 to receive the route correction 638.

The second control unit 534 can execute the second software 542 for the traverse module 636 to send the travel route 216, the alternate mechanism route 203, the replenishment route 209, the recovery route 207, the return route 239, or the combination thereof to the display module 620. The second control unit 534 can execute the second software 542 for the display module 620 to receive the travel route 216, the alternate mechanism route 203, the replenishment route 209, the recovery route 207, the return route 239, or the combination thereof.

The display module 620 can represent the second display interface 540 of FIG. 5. The second control unit 534 can execute the second software 542 for the second display interface 540 to display the travel route 216, the alternate mechanism route 203, the replenishment route 209, the recovery route 207, the return route 239, or the combination thereof.

The navigation system 100 can be partitioned between the first device 102 and the second device 106. For example, the navigation system 100 can be partitioned into the functional units of the first device 102, the second device 106, or a combination thereof. The navigation system 100 can also be implemented as additional functional units in the first device 102, the second device 106, or a combination thereof.

As another example, the navigation system 100 can be partitioned between the first software 526 and the second software 542. For example, first software 526 can include the status module 612 and the entry module 608. For further example, the second software 542 can include the initialization module 604 and the route planning module 606.

The first control unit 512 can operate the first communication unit 516 of FIG. 5 to send the entry 204, the vehicle information 640, or the combination thereof to the second device 106 through the communication path 104 of FIG. 5. The first control unit 512 can operate the first software 526 to operate the location unit 520 of FIG. 5.

The second communication unit 536 of FIG. 5 can send the travel route 216, the alternate mechanism route 203, the replenishment route 209, the recovery route 207, the return route 239, or the combination thereof to the first device 102 through the communication path 104. The travel route 216, the alternate mechanism route 203, the replenishment route 209, the recovery route 207, the return route 239, or the combination thereof can be displayed on the first display interface 530.

The navigation system 100 describes the module functions or order as an example. The modules can be partitioned differently. For example, the replenishment locator module 614 and the bi-directional replenishment locator module 616 can be combined. Each of the modules can operate individually and independently of the other modules or can be combined to operate as one.

Figure 7:
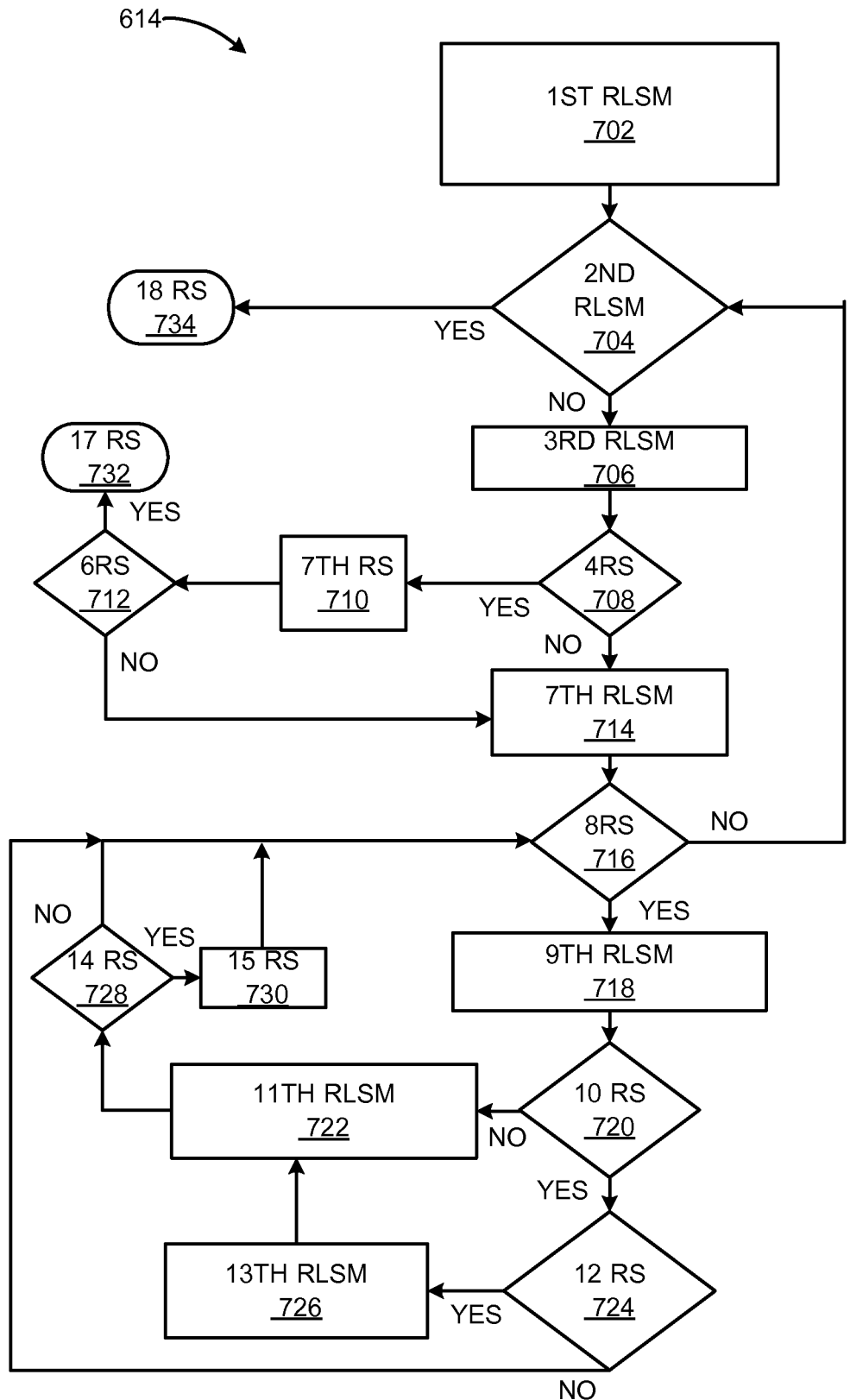
FIG. 7 is a flow of the replenishment locator module.

Referring now to FIG. 7, therein is shown a flow of the replenishment locator module 614. The replenishment locator module 614 identifies candidates for the next location of the replenishment locations 218 of FIG. 2 for the user to replenish the vehicle's resource, fuel, or the combination thereof for reaching the target destination.

For example, the replenishment locator module 614 can identify one or more of the replenishment locations 218 based on the estimated resource level 310 of FIG. 3 meeting or exceeding the minimum resource level 302 of FIG. 3 for arriving at each of the replenishment locations 218. For another example, the replenishment locator module 614 can identify one or more of the replenishment locations 218 based on the estimated fuel level 312 of FIG. 3 meeting or exceeding the minimum fuel level 304 of FIG. 3 for arriving at each of the replenishment locations 218. For a different example, the replenishment locator module 614 can identify one or more of the replenishment locations 218 based on the estimated travel time 352 of FIG. 3, the estimated financial cost 370 of FIG. 3, or the combination thereof for each of the travel sections 297 of FIG. 2 for minimizing a travel cost.

For a specific example, the replenishment locator module 614 can identify the first replenishment location 232 of FIG. 2 or the third replenishment location 228 of FIG. 2 as one of the candidate for the replenishment locations 218 from the start location 208 of FIG. 2 to the destination 206 of FIG. 2.

The replenishment locator module can be shown in pseudo code format as in the following pseudo code 1:

```
Function Route1Replenishment(Graph, OriginId, replenishmentCount,
   initialCharge, minimumSafeCharge)
   // initialize data structures
   ReplenishmentList.clear( )
PriorityQueue.clear( )
NodeSet.clear( )
Origin = NodeSet.getNode(Graph,OriginId)
Origin.cost = 0
Origin.charge = initialCharge
Origin.previous = NULL  // signifies beginning of route, i.e., there is no
previous node on the route
PriorityQueue.insert(Origin) // sets Origin.inQueue = true
// search nodes in order of cost
While (PriorityQueue.isEmpty( ) is false)
    Node = PriorityQueue.top( );
    Node.settled = true // getNode sets settled to false when node is
first
    encountered
    If ( Node.replenishment is true)
       ReplenishmentList.add(Node)
       If (ReplenishmentList.size( ) equals replenishmentCount)
           Return ReplenishmentList
    Links = Graph.getLinks(Node.id)
    For ( i = 0; i < Links.count( ); i = i+1 )
       id = Links[i].nextId
       NextNode = NodeSet.getNode(Graph,id)
       If (NextNode.inQueue is true )
           If (NextNode.cost > Links[i].cost + Node.cost )
              PriorityQueue.remove(NextNode)
              NextNode.previous = pointer to Node // links nodes on
              route back to origin
              NextNode.cost = Links[i].cost + Node.cost
              NextNode.charge = Node.charge − Links[i].consumed
              If (NextNode.charge > minimumSafeCharge)
                 PriorityQueue.insert(NextNode) // sets
                 NextNode.inQueue = true
       Else if (NextNode.settled is false )
              NextNode.previous = pointer to Node // links nodes on
              route back to origin
              NextNode.cost = Links[i].cost + Node.cost
              NextNode.charge = Node.charge − Links[i].consumed
              If (NextNode.charge > minimumSafeCharge)
                 PriorityQueue.insert(NextNode)
// cannot find all replenishment locations
Return ReplenishmentList
```

The pseudo code 1 and the pseudo codes that follow can be used to implement in software, firmware, hardware, or a combination thereof. The pseudo codes describes the logic of the invention in exemplary form can be implemented in hardware description language, such as Verilog™ or VHDL™ and then synthesized to form hardware and logic circuits.

The following table defines the mapping between the pseudo code and the specification elements. The table will be denoted as Table 1:

| Pseudo Code Parameters | Specification Elements |
| --- | --- |
| Graph | Geographic information for the start location 208, the replenishment locations 218, the intermediate stops 210 of FIG. 2, and the destination 206 |

-continued

| Pseudo Code Parameters | Specification Elements |
|---|---|
| Origin | The start location 208 |
| Origin.charge = initialCharge | The actual resource level 326 of FIG. 3, the actual fuel level 332 of FIG. 3, or the combination thereof at the start location 208 |
| Links | e.g., the first travel section 220 of FIG. 2 the second travel section 222 of FIG. 2, and the third travel section 224 of FIG. 2 |
| Node | e.g., one of the replenishment locations 218 |
| NextNode | next stopping point: e.g., the first replenishment location 232 of FIG. 2. |
| cost | e.g., the estimated travel time 352; the estimated financial cost 370, or the combination thereof |
| charge | The estimated resource level 310; the estimated fuel level 312; or the combination thereof |
| Links[i].consumed | The estimated consumption level 316 of FIG. 3 for the resource, fuel, or the combination thereof for traversing one of the travel sections 297 of FIG. 2. |
| minimumSafeCharge | The minimum resource level 302; the minimum fuel level 304; or the combination thereof |
| ReplenishmentList | e.g., the first replenishment location 232 of FIG. 2; the first replenishment location 232 of FIG. 2; the third replenishment location 228 of FIG. 2; the fourth replenishment location 236 of FIG. 2; the fifth replenishment location 238 of FIG. 2; or the combination thereof |
| Node.replenishment is true | the replenishment locations 218 illustrated with the flag |

The replenishment locator module 614 can include a first replenishment locator submodule 702. The first replenishment locator submodule 702 can include the following functions to initialize the data structures used in the pseudo code 1:

```
ReplenishmentList.clear( )
PriorityQueue.clear( )
NodeSet.clear( )
Origin = NodeSet.getNode(Graph,OriginId)
Origin.cost = 0
Origin.charge = initialCharge
Origin.previous = NULL
PriorityQueue.insert(Origin)
```

For example, the "Graph" is defined as a data structure that represents the geographic information for the geographic region where the user's vehicle can travel. A map can provide the geographic information on the "Graph." A "Node" is defined as the data structure representing the stopping points, such as the start location 208, the replenishment locations 218, or the destination 206, on the "Graph." The "Node" is further defined as a decision point where the navigation system 100 can make decisions on how to proceed with a travel. The "Node" can include the "Origin," and the "NextNode." The details regarding the "Origin" and the "NextNode" will be discussed later.

The "PriorityQueue" is defined as a data structure representing a list of "Node" discoverable by the replenishment locator module on the "Graph." The "PriorityQueue.clear( )" removes the "Node" or other stopping points from the list so that the list is empty.

"NodeSet" is defined as a data structure that records "Node" that have been encountered by a search performed by the replenishment locator module based on the identification (ID) in the "Graph." Each "Node" can have a unique ID to allow the replenishment locator module to identify the "Node." For example, the ID for the first replenishment location 232 can be "first" of the first replenishment location 232. "NodeSet.clear( )" removes the "Node" from the "NodeSet."

The "ReplenishmentList" is defined as a data structure representing a list of nodes for the replenishment locations 218 found by the replenishment locator module on the "Graph." The "ReplenishmentList.clear( )" removes the "Node" in the "ReplenishmentList."

The "Origin" is defined as a data structure representing the start location 208. "NodeSet.getNode( )" is defined as a function to identify the stopping point and return a "Node" or the stopping point from the "Graph." For a more specific example, the "Graph" and "OriginId" are inputs for the function "NodeSet.getNode( )."

The "OriginId" is defined as the ID for the start location 208. For example, "NodeSet.getNode(Graph,OriginId)" can return the "Node" representing the start location 208 from the "Graph" based on the "OriginId."

The field is defined as a set of elements for the "Node," "Origin," and "NextNode." An element is defined as the characteristic of the stopping points. "NextNode" is defined as a data structure representing the next stopping point. If a field is introduced without specifying either the "Node," "Origin," or "NextNode," the field is shared by the "Node," "Origin," and "NextNode." However, if the field is specific to the data structure, the field will be introduced with a specific data structure. For example, "charge" is defined as a field for the "Node." The details regarding the "NextNode" will be discussed later.

A "cost" is defined as a field representing the estimated travel time 352, the estimated financial cost 370, or the combination thereof "Origin.cost" is defined as the data structure for the estimated travel time 352, the estimated financial cost 370, or the combination thereof at the start location 208. Here, "Origin.cost=0" can set the "Origin.cost" to "0," because no "cost" is incurred when the vehicle is still at the "Origin." A travel cost can represent the estimated travel time 352, the estimated financial cost 370, or the combination thereof A "charge" is defined as a field for the "Node" for the amount of resource, fuel, or the combination thereof that would remain after traveling the travel route 216 from the start location 208 to the next stopping point. "initialCharge" is defined as a field for the "Origin" for the actual resource level 326, the actual fuel level 332, or the combination thereof provided in the vehicle information 640 of FIG. 6 by the status module 612 of FIG. 6.

"Origin.charge=initialCharge" is defined as the data structure for the actual resource level 326, the actual fuel level 332, or the combination thereof at the start location 208. More specifically, the status module 612 of FIG. 6 can provide the vehicle information 640 of FIG. 6 having the actual resource level 326 of FIG. 3, the actual fuel level 332 of FIG. 3, or the combination thereof for the vehicle at the start location 208.

The variable "previous" is defined as a field or a pointer to the previous node. "Origin.previous=NULL" can signify that the vehicle is at the start location 208. "PriorityQueue.insert (Origin)" can add the "Origin" in the "PriorityQueue" as the first node.

The replenishment locator module 614 can include a second replenishment locator submodule 704 and is coupled to the first replenishment locator submodule 702. The second replenishment locator submodule 704 establishes a condition for the replenishment locator module 614 to search for the stopping points, such as the replenishment locations 218. For example, the second replenishment locator submodule 704 can include the following function from pseudo code 1:

While (PriorityQueue.is Empty( ) is false)

The second replenishment locator submodule 704 is shown as a decision box having a logical path that is either "YES" or "NO" for invoking the next submodule. The invoking of the submodule is defined as moving along the logical path to the next submodule and executing the next submodule.

For example, if the condition for the second replenishment locator submodule 704 is met, a logical path for "YES" will be chosen and an eighteenth replenishment locator submodule 734 can be invoked. If the condition for the second replenishment locator submodule 704 is not met, a logical path for "NO" will be chosen and a third replenishment locator submodule 706 can be invoked. Throughout this specification going forward, a submodule that a decision box is illustrated with a diamond shape. A submodule that is not a decision box can be illustrated not as a diamond shape.

For a further example, "While (PriorityQueue.is Empty( ) is false)" can establish the condition whether the "PriorityQueue" is empty or not. If the "PriorityQueue" is empty, the eighteenth replenishment locator submodule 734 can be invoked. The details regarding the eighteenth replenishment locator submodule 734 will be discussed later.

At the first invocation of the second replenishment locator submodule 704, the "PriorityQueue" is defined as not empty if the "PriorityQueue.insert(Origin)" successfully adds the "Origin" in the "PriorityQueue" as the first node. While the "PriorityQueue" is not empty, the third replenishment locator submodule 706 can be invoked.

The replenishment locator module 614 can include the third replenishment locator submodule 706 and is coupled to the second replenishment locator submodule 704. The third replenishment locator submodule 706 identifies the "Node" or the stopping point with the lowest value for the estimated travel time 352, the estimated financial cost 370, or the combination thereof. For example, the third replenishment locator submodule 706 can include the following functions from pseudo code 1:

Node = PriorityQueue.top( )"
Node.settled = true

"PriorityQueue.top( )" extracts the "Node" with the lowest value for the estimated travel time 352, the estimated financial cost 370, or the combination thereof in the "PriorityQueue." At the very first invocation of the third replenishment locator submodule 706, the "PriorityQueue" can only include the "Origin." The "PriorityQueue.top( )" will extract the "Origin," from the "PriorityQueue" and sets the "inQueue" for the "Origin" to "false."

"inQueue" is a field representing the condition whether the "Origin," "Node," or "NextNode" is in the "PriorityQueue." If the "in Queue" is set to "false," the "Node" for example, is no longer in the "PriorityQueue." If the "in Queue" is set to "true," the "Node" for example, is in the "PriorityQueue."

"Node=PriorityQueue.top( )" represents assigning of the return value for "PriorityQueue.top( )" to the "Node." For the very first invocation, the "Origin" will be assigned as the "Node." The details regarding "PriorityQueue.top( )" extracting and assigning of the "Node" other than the "Origin" will be discussed later.

"settled" is defined as a field to determine whether the lowest value for the estimated travel time 352, the estimated financial cost 370, or the combination thereof had been found by the replenishment locator module 614. "Node.settled=true" represents a data structure for the "Node" having the lowest value for the estimated travel time 352, the estimated financial cost 370, or the combination thereof had been found by the replenishment locator module 614.

As discussed previously, at the first invocation of the third replenishment locator submodule 706, "PriorityQueue.top( )" can extract the "Origin." Since there is no value for the estimated travel time 352, the estimated financial cost 370, or the combination thereof at the "Origin," "Node.settled" will be set as "true" if "PriorityQueue.top( )" returns the "Origin." However, once the replenishment locator module 614 executes "NextSet.getNode( )," "Node.settled" will be set as "false." The details regarding "Node.settled=true" determining the "Node" having the lowest value for the estimated travel time 352, the estimated financial cost 370, or the combination thereof other than the "Origin" will be discussed later. The details regarding the execution of "NextSet.getNode( )" will be discussed later.

The replenishment locator module 614 can include a fourth replenishment locator submodule 708 and is coupled to the third replenishment locator submodule 706. The fourth replenishment locator submodule 708 identifies whether the condition that a "Node" is one of the replenishment locations 218 has been met or not. For example, the fourth replenishment locator submodule 708 can include the following function to identify the condition in pseudo code 1:

If (Node.replenishment is true)

For a further example, "If (Node.replenishment is true)" can identify whether the condition that the "Node" is one of the replenishment locations 218 has been met or not. More specifically, "replenishment" is defined as a field for the "Node" to determine whether the "Node" is one of the replenishment locations 218. As discussed earlier, "NodeSet.getNode( )" can return the "Node" with the "replenishment" field to identify whether the "Node" is one of the replenishment locations 218. The details regarding the "NodeSet.getNode( )" will be discussed later.

If the "Node" is one of the replenishment locations 218, "Node.replenishment" is defined as set to "true." The details regarding the logical path when "Node.replenishment is true" will be discussed later.

If the "Node" is not of the replenishment locations 218, thus, "Node.replenishment" is not set as "true," a seventh replenishment locator submodule 714 can be invoked. The details regarding the seventh replenishment locator submodule 714 will be discussed later.

The replenishment locator module 614 can include the seventh replenishment locator submodule 714 and is coupled to the fourth replenishment locator submodule 708. The seventh replenishment locator submodule 714 identifies the path from one stopping point to another. For example, the path can include the first travel section 220, the second travel section 222, or the third travel section 224. For a further example, the seventh replenishment locator submodule 714 can include the following function to identify the path as described in pseudo code 1:

Links="Graph.getLinks(Node.id)

"Links" is defined as an array representing a number of paths originating from that one stopping point. For example, the first travel section 220 can originate from the start location 208. The "Node" can have multiple numbers of "Links." For example, the "Node" can represent the start location 208. "Links" for the start location 208 can include the first travel section 220 and the eighth travel section 295 of FIG. 2.

"Links" can have the following fields: "cost" and "nextId." "Links.cost" is defined as a data structure representing the estimated travel time 352, the estimated financial cost 370, or the combination thereof for traveling the "Links." The "nextId" is defined as a field that represents the ID for the next stopping point following the current "Node."

"id" is defined as a field for the identification (ID). "Graph.getLinks(Node.id)" can identify the "Links" associated with the "Node" from the "Graph." If the "Node" is not in the "NodeSet," thus, the replenishment locator module 614 has yet to encounter the "Node," "getLinks( )" can also create a "Node," set all the fields for the "Node," and include the "Node" in the "NodeSet."

"Links=Graph.getLinks(Node.id)" can represent the seventh replenishment locator submodule 714 assigning the paths associated with that "Node.id" to the "Links." For example, "Graph.getLinks(Node.id)" can identify the path originating from the start location 208. For a more specific example, the "Links" for the start location 208 can represent the first travel section 220 and the eighth travel section 295.

The replenishment locator module 614 can include an eighth replenishment locator submodule 716 and is coupled to the seventh replenishment locator submodule 714. The eighth replenishment locator submodule 716 establishes a condition for the replenishment locator module 614 to search for the stopping points, such as the replenishment locations 218, with the lowest value for the estimated travel time 352, the estimated financial cost 370, or the combination thereof. For example, the eighth replenishment locator submodule 716 can include the following function to establish the condition:

For (i=0; i<Links.count( ); i=i+1)

"Links.count( )" computes the number of paths that "Links" can have. From the previous example, the start location 208 can have the first travel section 220 and the eighth travel section 295 as its "Links." "Links.count( )" can return "two" as the number of paths found for the start location 208.

"i" represents the position within the array representing the "Links." For example, the first position of the array is signified as "0." "i=0" signifies that "i" is positioned at the first position of the array. For this example, "i=0" signifies that "i" is positioned at the first position of the "Links." "i++" represents a function to move the position of "i" to the next position along the array. For example, the "Links" for the start location 208 can have the first travel section 220 and the eighth travel section 295 in order. For a more specific example, "i=0" can represent the first travel section 220 for the first position of the "Links." "i++" can move "i" to "i=1." "i=1" can represent the eighth travel section 295 for the second portion of the "Links."

For a further example, "For (i=0; i<Links.count( ); i=i+1)" can establish the condition to search for the lowest value for the estimated travel time 352, the estimated financial cost 370, or the combination thereof while "Links.count( )" can compute for the "Links." More specifically, until "For (i=0; i<Links.count( ); i=i+1)" can no longer increment the "i," the replenishment locator module 614 can continue to invoke the eighth replenishment locator submodule 716.

If "Links.count( )" can compute for "Links," the replenishment locator module 614 can invoke a ninth replenishment locator submodule 718. If "Links.count( )" cannot compute for "Links," the replenishment locator module 614 can invoke the second replenishment locator submodule 704. The details regarding the ninth replenishment locator submodule 718 will be discussed later.

The replenishment locator module 614 can include the ninth replenishment locator submodule 718 and is coupled to the eighth replenishment locator submodule 716. The ninth replenishment locator submodule 718 identifies the candidate for the next stopping point based on the path available in the "Links." For example, the ninth replenishment locator submodule 718 can include the following functions to identify the candidate for the next stopping point as described in pseudo code 1:

```
id = Links[i].nextId
NextNode = NodeSet.getNode(Graph,id)
```

"id=Links[i].nextId" sets the "id" based on the next stopping point after traversing the path available in the "Links[i]." For example, "i" can be "0." For a further example, "Links [0]" can represent the third travel section 224. The next stopping point after traversing the third travel section 224 can be the third replenishment location 228. "Link[i].nextId" can represent a data structure for indicating the direction that a "Link[i]" or the path is heading towards. For example, "Links [0].nextId" can head towards the third replenishment location 228. The ninth replenishment locator submodule 718 can execute "id=Links[i].nextId" to set the "id" for the third replenishment location 228.

"NodeSet.getNode(Graph,id)" returns the "Node" having the "id" to be assigned for the "NextNode." For example, "id" can represent the ID for the third replenishment location 228. NodeSet.getNode(Graph,id)" can return the "Node" for the third replenishment location 228. "NextNode=NodeSet.getNode(Graph,id)" can set the third replenishment location 228 as the "NextNode." The replenishment locator module 614 can continue to invoke the ninth replenishment locator submodule 718 until the eighth replenishment locator submodule 716 can no longer increment the "i" for "Links."

The replenishment locator module 614 can include a tenth replenishment locator submodule 720 and is coupled to the ninth replenishment locator submodule 718. The tenth replenishment locator submodule 720 identifies whether the condition that the "NextNode" is in the "PriorityQueue" has been met or not. For example, the tenth replenishment locator submodule 720 can include the following functions to identify the condition as described in pseudo code 1:

```
If ( NextNode.inQueue is true )
Else if ( NextNode.settled is false )
```

At the very first invocation of the tenth replenishment locator submodule 720, the "NextNode" will not be in the "PriorityQueue." Subsequently, the condition for "If (NextNode.inQueue is true)" will not be met and the tenth replenishment locator submodule 720 can check whether the condition for "Else if (NextNode.settled is false)" is met or not.

As discussed earlier, the execution of "NodeSet.getNode( )" sets the "settled" to false. Previously, the ninth replenishment locator submodule 718 executed "NodeSet.getNode(Graph,id)" for the "NextNode." Subsequently, "NextNode.settled" can be set to "false."

For example, by invoking "NodeSet.getNode(Graph,id)," the replenishment locator module 614 can assume that a "Node" has at least one of the "Links" originating from that "Node. Furthermore, the replenishment locator module 614 can assume that the lowest value for the estimated travel time 352, the estimated financial cost 370, or the combination thereof had not been found. Subsequently, "NodeSet.getNode(Graph,id)" sets the "settled" for the "NextNode" as "false." Therefore, the very first invocation of the tenth replenishment locator submodule 720 can meet the condition for "Else if (NextNode.settled is false)."

By meeting the condition for "Else if (NextNode.settled is false)," the replenishment locator module 614 can invoke an eleventh replenishment locator submodule 722. The details regarding the eleventh replenishment locator submodule 722 will be discussed later.

As a contrast to the very first invocation, if the "NextNode.inQueue" is "true," thus the condition for "If (NextNode.inQueue is true)" is met, the replenishment locator module 614 can invoke a twelfth replenishment locator submodule 724. The details regarding the twelfth replenishment locator submodule 724 will be discussed later.

The replenishment locator module 614 can include the eleventh replenishment locator submodule 722 and is coupled to the tenth replenishment locator submodule 720. The eleventh replenishment locator submodule 722 calculates the "cost" for traveling to the next stopping point. For example, the eleventh replenishment locator submodule 722 can calculate the estimated travel time 352, the estimated financial cost 370, or the combination thereof for traversing one or more of the travel sections 297 of FIG. 2.

The eleventh replenishment locator submodule 722 also calculates the estimation of the amount of resource, fuel, or the combination thereof remaining when reaching the next stopping point. For example, the eleventh replenishment locator submodule 722 can calculate the estimated resource level 310, the estimated fuel level 312 for arriving at one or more of the replenishment locations 218 after traversing one or more of the travel sections 297.

The eleventh replenishment locator submodule 722 can include the following functions to calculate the estimated travel time 352, the estimated financial cost 370, the estimated resource level 310, and the estimated fuel level 312, as described from pseudo code 1.

---
NextNode.previous = pointer to Node
NextNode.cost = Links[i].cost + Node.cost
NextNode.charge = Node.charge − Links[i].consumed

---

"NextNode.previous=pointer to Node" sets the pointer to the previous stopping point. For example, the "NextNode" can be the third replenishment location 228. "NextNode.previous" can represent the first replenishment location 232.

"NextNode.cost" is defined as the aggregation of the "cost" for traveling along the path to reach the next stopping point. For example, "NextNode.cost" can represent the aggregation of the estimated travel time 352, the estimated financial cost 370, or the combination thereof for reaching the next stopping point from the start location 208 or the "Origin."

The eleventh replenishment locator submodule 722 can calculate the "NextNode.cost" by aggregating the "Links[i].cost" and "Node.cost." For a further example, "Links[i].cost" can represent the estimated travel time 352, the estimated financial cost 370, or the combination thereof for traveling the path to reach the next stopping point from the current stopping point. For a more specific example, "Links[0].cost" can represent the estimated travel time 352, the estimated financial cost 370, or the combination thereof for traveling the third travel section 224 from the first replenishment location 232, the current stopping point, to the third replenishment location 228, the next stopping point.

"Node.cost" can represent the aggregation of the estimated travel time 352, the estimated financial cost 370, or the combination thereof for traveling the path to reach the current stopping point from the "Origin." For example, the current stopping point or the "Node" can be the first replenishment location 232. "Node.cost" can represent the aggregation of the estimated travel time 352, the estimated financial cost 370, or the combination thereof for traveling the first travel section 220 and the second travel section 222 to reach the first replenishment location 232. Subsequently, "NextNode.cost" can represent the aggregation of the estimated travel time 352, the estimated financial cost 370, or the combination thereof for the first travel section 220, the second travel section 222, and the third travel section 224.

"NextNode.charge" can represent the estimated resource level 310, the estimated fuel level 312, or the combination thereof for reaching the next stopping point or the "NeFxtNode." For example, the "NextNode.charge" can represent the estimated fuel level 312 after arriving at the third replenishment location 228 from the first replenishment location 232. The eleventh replenishment locator submodule 722 can calculate the "NextNode.charge" by subtracting the "Links[i].consumed" from the "Node.charge."

For example, "Node.charge" is defined as the amount of resource, fuel, or the combination thereof remaining after arriving at the prior point. Continuing from the previous example, "Node.charge" can represent the estimated resource level 310, the estimated fuel level 312, or the combination thereof of the vehicle when the vehicle was at the first replenishment location 232.

The estimated consumption level 316 or "Links[i].consumed" is defined as the estimation of the resource, fuel, or the combination thereof required by the vehicle for traveling the path. The eleventh replenishment locator submodule 722 can calculate the estimated consumption level 316 for traversing one or more of the travel sections 297 of FIG. 2. For example, "Links[0].consumed" can represent the estimated consumption level 316 for traveling the third travel section 224.

For a more specific example, the "Graph" can have information for the distance for the third travel section 224. The third travel section 224 can be 125 kilometers in distance. The "Graph" can also have information for the road condition for the third travel section 224. The road condition can be a flat road. The transportation type 346 of the vehicle can be electric vehicle. The consumption profile 340 of FIG. 3 according to the manufacture specification for the electric vehicle permits the vehicle to travel 200 kilometers per full fuel on a flat road. The eleventh replenishment locator submodule 722 can calculate the "Links[i].consumed" for traveling the third travel section 224 to be 62.5% of the full capacity of the fuel.

Continuing with the example, "Node.charge" if the vehicle was at the first replenishment location 232 can be 100% capacity of fuel. The eleventh replenishment locator submodule 722 can calculate the "NextNode.charge" by subtracting the Links[i].consumed from the "Node.charge." For this example, "NextNode.charge" or the estimated fuel level 312 after arriving at the third replenishment location 228 can be 37.5% of full fuel.

The replenishment locator module 614 can include a fourteenth replenishment locator submodule 728 and is coupled to the eleventh replenishment locator submodule 722. The fourteenth replenishment locator submodule 728 identifies whether the condition that the estimation of resource, fuel, or the combination thereof for arriving at the next stopping point will be greater than the minimum threshold allowed by the navigation system 100 will be met or not. For example, the fourteenth replenishment locator submodule 728 can identify whether the estimated resource level 310, the estimated fuel level 312, or the combination thereof for reaching the third replenishment location 228 will be greater than the minimum resource level 302, the minimum fuel level 304, or the combination thereof generated by the minimum level module 610 of FIG. 6. For a further example, the fourteenth replenishment locator submodule 728 can include the following function to identify the condition, as described from pseudo code 1:

If (NextNode.charge>minimumSafeCharge)

"minimumSafeCharge" is defined as the minimum threshold allowed by the navigation system 100 for planning the travel route 216 to reach the next stopping point. For example, the "minimumSafeCharge" can represent the minimum resource level 302, the minimum fuel level 304, or the combination thereof.

Continuing from the example, the "NextNode.Charge" or the estimated fuel level 312 after arriving at the third replenishment location 228 can be 37.5% of full fuel. The minimum level can generate the minimum fuel level 304 to be 5%. Since the estimated fuel level 312 after arriving at the third replenishment location 228 can exceed the minimum fuel level 304, the fourteenth replenishment locator submodule 728 can identify that the vehicle can travel along the third travel section 224 and meet the condition for If (NextNode.charge>minimumSafeCharge).

By meeting the condition for If (NextNode.charge>minimumSafeCharge), the replenishment locator module 614 can invoke a fifteenth replenishment locator submodule 730. If the estimated fuel level 312 is less than the minimum fuel level, thus, failing to meet the condition for If (NextNode.charge>minimumSafeCharge), the replenishment locator module 614 cannot invoke the fifteenth replenishment locator submodule 730. The details regarding the fifteenth replenishment locator submodule 730 will be discussed later.

The replenishment locator module 614 can include the fifteenth replenishment locator submodule 730 and is coupled to the fourteenth replenishment locator submodule 728. The fifteenth replenishment locator submodule 730 adds the next stopping point into the "PriorityQueue" by the following function, from pseudo code 1:

PriorityQueue.insert(NextNode)

For example, the fifteenth replenishment locator submodule 730 can add the third replenishment location 228 to the "PriorityQueue" by executing "PriorityQueue.insert(NextNode)" and setting the "in Queue" field for the "NextNode" as "true." The fifteenth replenishment locator submodule 730 can invoke the eighth replenishment locator submodule 716 after executing the "PriorityQueue.insert(NextNode)." Continuing with the previous example, the replenishment locator module 614 can re-invoke the tenth replenishment locator submodule 720, because the fifteenth replenishment locator submodule 730 added the "NextNode" in the "PriorityQueue." The tenth replenishment locator submodule 720 can invoke the twelfth replenishment locator submodule 724 if the condition for "If (NextNode.inQueue is true)" is met.

The replenishment locator module 614 can include the twelfth replenishment locator submodule 724 and is coupled to the tenth replenishment locator submodule 720. The twelfth replenishment locator submodule 724 compares the "NextNode.cost" between the "Links" to establish the condition to maintain the search for the lowest "NextNode.cost" or the lowest value for the estimated travel time 352, the estimated financial cost 370, or the combination thereof. For example, the twelfth replenishment locator submodule 724 can compare the "NextNode.cost" between traveling from the start location 208 through the first replenishment location 232 to the fourth replenishment location 236 versus traveling from the start location 208 through the first replenishment location 232 to the third replenishment location 228. For a further example, the twelfth replenishment locator submodule 724 can include the following function to compare and establish the condition, as found in pseudo code 1.

If (NextNode.cost>Links[i].cost+Node.cost)

For a specific example, "Links.count( )" can be two. "NextNode.cost" here can represent the "NextNode.cost" for the "NextNode" already in the "PriorityQueue." For a further example, the "NextNode.cost" can represent the aggregation of the estimated travel time 352, the estimated financial cost 370, or the combination thereof for "Links[0]" or reaching the third replenishment location 228.

"Links[i].cost+Node.cost" here invoked in the twelfth replenishment locator submodule 724 can represent the aggregation of the estimated travel time 352, the estimated financial cost 370, or the combination thereof for, as an example, "Links[1]" or the "NextNode" not in the "PriorityQueue." More specifically, "Links[1].cost+Node.cost" can represent the aggregation of the estimated travel time 352, the estimated financial cost 370, or the combination thereof for traveling the first travel section 220, the second travel section 222, and the sixth travel section 292 of FIG. 2 to reach the fourth replenishment location 236.

Continuing with the example, if the aggregation for the estimated travel time 352, the estimated financial cost 370, or the combination thereof for "Links[0]" is greater than "Links[1]," the replenishment locator module 614 can invoke a thirteenth replenishment locator submodule 726. The invocation of the thirteenth replenishment locator submodule 726 can signify that the aggregation for the estimated travel time 352, the estimated financial cost 370, or the combination thereof is greater to reach the third replenishment location 228 than the fourth replenishment location 236. In contrast, if the aggregation for the estimated travel time 352, the estimated financial cost 370, or the combination thereof for "Links[0]" is less than "Links[1]," the replenishment locator module 614 can invoke the eighth replenishment locator submodule 716.

The replenishment locator module 614 can include the thirteenth replenishment locator submodule 726 and is coupled to the twelfth replenishment locator submodule 724. The thirteenth replenishment locator submodule 726 removes the "NextNode" already in the queue that failed to meet the condition specified in the twelfth replenishment locator submodule 724. For example, the thirteenth replenishment locator submodule 726 can include the following function to remove the "NextNode" as found in pseudo code 1.

PriorityQueue.remove(NextNode)

Continuing from the previous example, if the aggregation for the estimated travel time 352, the estimated financial cost 370, or the combination thereof for "Links[0]" is greater than "Links[1]," the thirteenth replenishment locator submodule 726 can execute "PriorityQueue.remove(NextNode)" to remove the "NextNode" representing the third replenishment location 228. After the removal, the replenishment locator module 614 can invoke the eleventh replenishment locator submodule 722 to set the "NextNode.cost" based on, for example, "Links[1].cost+Node.cost," because the aggregation for the estimated travel time 352, the estimated financial cost 370, or the combination thereof reaching the fourth replenishment location 236 can be less than the third replenishment location 228.

The replenishment locator module 614 can include a fifth replenishment locator submodule 710 and is coupled to the fourth replenishment locator submodule 708. The fifth replenishment locator submodule 710 adds the "Node" having the "replenishment" as "true" to the "ReplenishmentList." "ReplenishmentList" is defined as a data structure representing a list of the replenishment locations 218 discovered by the replenishment locator module 614 that are accessible. For example, the fifth replenishment locator submodule 710 can include the following function to add the "Node" as shown from pseudo code 1:

ReplenishmentList.add(Node)

The fifth replenishment locator submodule 710 can execute ReplenishmentList.add(Node) to add a "Node" representing one of the replenishment locations 218 to the "ReplenishmentList." The replenishment locator module 614 can invoke a sixth replenishment locator submodule 712 once the "Node" is added to the "ReplenishmentList."

The replenishment locator module 614 can include the sixth replenishment locator submodule 712 and is coupled to the fifth replenishment locator submodule 710. The sixth replenishment locator submodule 712 identifies whether the condition that the replenishment locations 218. For example, the fifth replenishment locator submodule 710 can include the following function to identify the condition, also found in pseudo code 1:

If (ReplenishmentList.size( ) equals replenishmentCount)

The replenishment locator module 614 can include a seventeenth replenishment locator submodule 732 and is coupled to the sixth replenishment locator submodule 712. The seventeenth replenishment locator submodule 732 returns the list of the replenishment locations 218 identified as the candidates to replenish the resource, fuel, or the combination thereof for the vehicle. For example, the seventeenth replenishment locator submodule 732 can include the following function, as shown in pseudo code 1:

Return ReplenishmentList

For a specific example, "ReplenishmentList" can include the first replenishment location 232 and the third replenishment location 228. The first replenishment location 232 and the third replenishment location 228 can represent the replenishment locations 218 to replenish the resource, fuel, or the combination thereof for the vehicle prior to reaching the destination 206.

The replenishment locator module 614 can include the eighteenth replenishment locator submodule 734 and is coupled to the second replenishment locator submodule 704. The eighteenth replenishment locator submodule 734 returns the incomplete list of the replenishment locations 218 identified as the candidates to replenish the resource, fuel, or the combination thereof for the vehicle if the condition for the second replenishment locator submodule 704 is not met. For example, the eighteenth replenishment locator submodule 734 can include the following function:

Return ReplenishmentList

It has been discovered that the present invention provides the navigation system 100 to identify the candidates of the replenishment locations 218 that the vehicle can arrive by meeting or exceeding the minimum resource level 302, the minimum fuel level 304, or the combination thereof. Limiting the candidates of the replenishment locations 218 to the replenishment locations 218 that the vehicle can meet or exceed the minimum resource level 302, the minimum fuel level 304, or the combination thereof can aid the vehicle to safely reach one or more of the replenishment locations 218, the intermediate stops 210, the destination 206, or the combination thereof without running out of resource, fuel, or the combination thereof.

Figure 8:
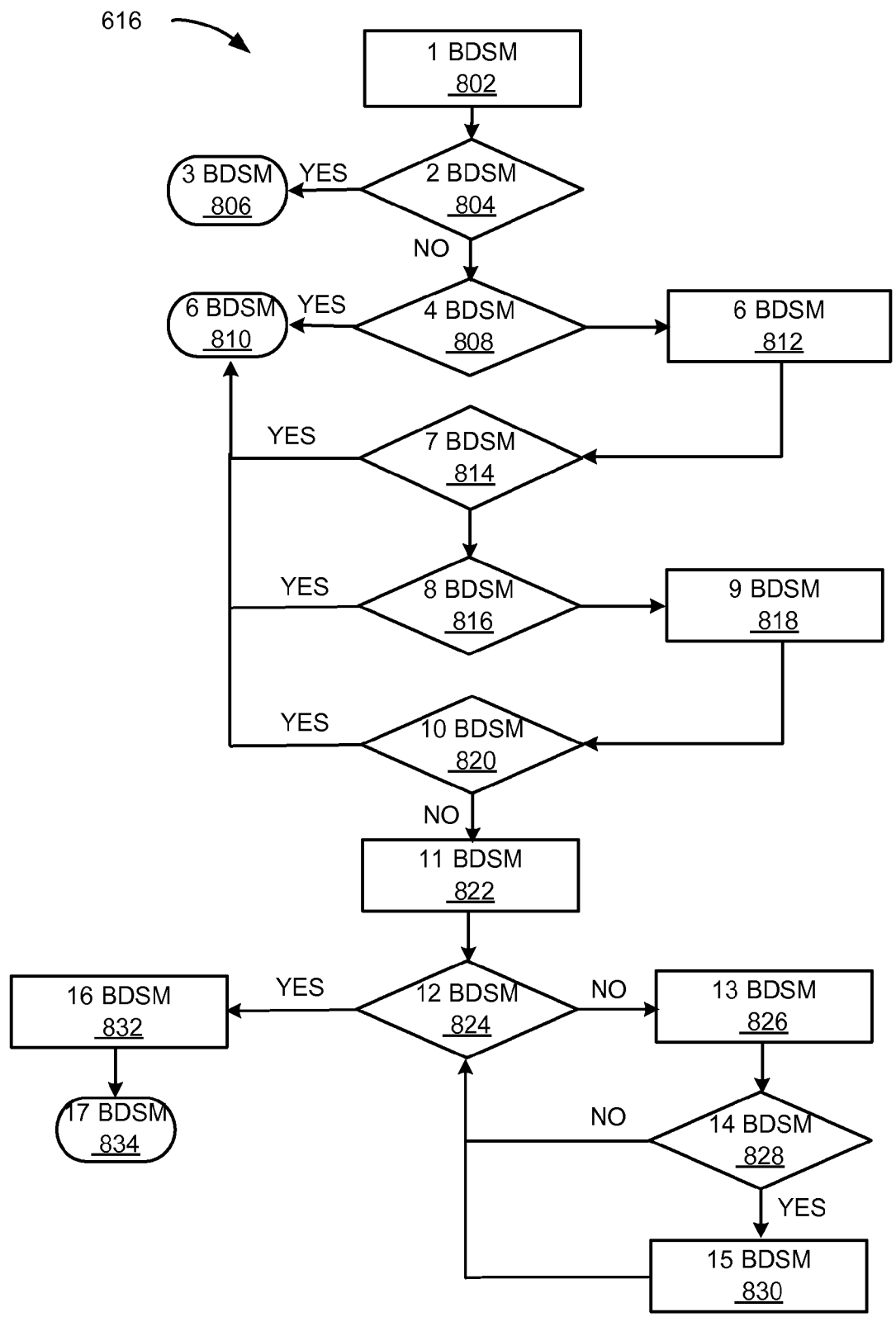
FIG. 8 is a flow of the bi-directional replenishment locator module.

Referring now to FIG. 8, therein is shown a flow of the bi-directional replenishment locator module 616. The bi-directional replenishment locator module 616 searches for the travel route 216 of FIG. 2 when at most one replenishment location is needed. For example, the bi-directional replenishment locator module 616 can generate the travel route 216 from the destination 206 through the sufficient number 280 of FIG. 2 of one or more of the replenishment locations 218 of FIG. 2 for reaching the start location 208 of FIG. 2. The bi-directional replenishment locator module 616 can be described by a pseudo code 2:

```
ResultForward = Route1Replenishment(Graph, OriginId, DestinationId,
    initialCharge, ReplenishmentIds)
If (ResultForward contains a route)
    // No replenishment is needed using the route returned.
    Return the route
If ResultForward contains no list of nodes
    // there is no route to reach destination with only one replenishment
    Return error
// Otherwise search backward from destination
ResultBackward = Route1Replenishment(ReverseGraph, DestinationId,
    OriginId, fullCharge, ReplenishmentIds)
If (ResultBackward contains a route)
    // something went wrong; should not happen
    Return error
If ResultBackward contains no nodes
    // there is no route that to reach destination with only one replenishment
    Return error
// Find all replenishment nodes in ResultForward that match replenishment
    nodes in
// ResultBackward
Matches = all pairs NodeForward from ResultForward and NodeBackward
    from ResultBackward for which
        NodeForward.id = NodeBackward.id
If Matches is empty
    // there is no route to reach destination with only one replenishment
    Return error
MinCost = ∞
    For each pair, NodeForward and NodeBackward, in Matches
        replenishmentTime = value computed from initialCharge,
        NodeForward.charge, and (maybe) NodeBackward.charge
        If (NodeForward.cost + NodeBackward.cost + replenishmentTime <
        MinCost)
            MinCost = NodeForward.cost + NodeBackward.cost +
                replenishmentTime
            MinNodeForward = NodeForward
            MinNodeBackward = NodeBackward
        Construct route by following linked lists starting at
    MinNodeForward.previous and MinNodeBackward.previous
        Return route
```

Here, "Graph" is a data structure representing the graph. "ReverseGraph" is the data structure that is a graph like "Graph" but in which every link from a node A to a node B has been replaced by a link from node B to node A. Such a link still represents travel from node A to node B, but "ReverseGraph.getLinks( )" returns the link when given node B instead when given node A.

"OriginId" and "DestinationId" are inputs and are the identifications of nodes in the graph which represent the origin and destination. "ReplenishmentIds" is an input which is an array containing the identifications of nodes representing replenishment location. A "fullCharge" is the amount of a full charge for the vehicle operating with or in conjunction with the navigation system 100.

The pseudo code 2 is depicted in the flow chart in FIG. 8. The bi-directional replenishment locator module 616 includes a first bi-directional submodule 802 and performs a forward search by executing the replenishment locator module 614 of FIG. 6 by invoking "Route1Replenishment" and shown in the pseudo code 2:

```
ResultForward = Route1Replenishment(Graph, OriginId,
    DestinationId, initialCharge, ReplenishmentIds)
```

The bi-directional replenishment locator module 616 includes a second bi-directional submodule 804 and tests of the forward route from the start location 208 of FIG. 2 to the destination 206 of FIG. 2 includes one of the replenishment locations 218 of FIG. 2 and shown in the pseudo code 2:

If (ResultForward contains a route)

The bi-directional replenishment locator module 616 includes a third bi-directional submodule 806 and executes if the test from the second bi-directional submodule 804 results in a true condition, then no replenishment is needed and the route generated from the replenishment locator module 614 is returned, as described in the pseudo code 2:

---
// No replenishment is needed using the route returned.
Return the route

---

The bi-directional replenishment locator module 616 includes a fourth bi-directional submodule 808 and executes if the test from the second bi-directional submodule 804 results in a false condition. The fourth bi-directional submodule 808 tests if a route exists with only one of the replenishment locations 218 to the destination 206 and shown in the pseudo code 2:

If ResultForward contains no list of nodes

The bi-directional replenishment locator module 616 includes a fifth bi-directional submodule 810. The fifth bi-directional submodule 810 generates an error if the fourth bi-directional submodule 808 results in a condition where no route exists or in a true condition that the route does not exist, as shown in the pseudo code 2:

---
// there is no route to reach destination with only one replenishment
Return error

---

The bi-directional replenishment locator module 616 includes a sixth bi-directional submodule 812. The sixth bi-directional submodule 812 searches for a route backwards from the destination 206 to the start location 208. The sixth bi-directional submodule 812 operates continues from the fourth bi-directional submodule 808, as shown in the pseudo code 2:

---
// Otherwise search backward from destination
ResultBackward = Route1Replenishment(ReverseGraph, DestinationId, OriginId, fullCharge, ReplenishmentIds)

---

The bi-directional replenishment locator module 616 includes a seventh bi-directional submodule 814. The seventh bi-directional submodule 814 tests if a route from the sixth bi-directional submodule 812 with one of the replenishment locations 218, as shown in the pseudo code 2:

If (ResultBackward contains a route)

If the seventh bi-directional submodule 814 results in a true condition, this condition should not occur and the bi-directional replenishment locator module 616 returns an error with the fifth bi-directional submodule 810, as shown in the pseudo code 2:

---
// something went wrong; should not happen
Return error

---

The bi-directional replenishment locator module 616 includes an eighth bi-directional submodule 816. The seventh bi-directional submodule 814 tests if a route exists from the sixth bi-directional submodule 812 with one of the replenishment locations 218. The seventh bi-directional submodule 814 operates for the non-true condition from the seventh bi-directional submodule 814 and shown in the pseudo code 2:

If ResultBackward contains no nodes

The bi-directional replenishment locator module 616 includes a ninth bi-directional submodule 818. The ninth bi-directional submodule 818 executes if the tests leading to the fifth bi-directional submodule 810 do not occur. The ninth bi-directional submodule 818 finds all of the replenishment locations 218 that matches between the route generated from the forward search in "ResultForward" and the route generated from the backwards search in "ResultBackward", as shown in the pseudo code 2:

---
// Find all replenishment nodes in ResultForward that match replenishment nodes in
// ResultBackward
Matches = all pairs NodeForward from ResultForward and NodeBackward from ResultBackward for which
NodeForward.id = NodeBackward.id

---

The bi-directional replenishment locator module 616 includes a tenth bi-directional submodule 820. The tenth bi-directional submodule 820 tests if the "Matches" generated from the ninth bi-directional submodule 818 is empty or not, as shown in the pseudo code 2:

If Matches is empty

If the tenth bi-directional submodule 820 results in a true condition such that "Matches" is empty, then the bi-directional replenishment locator module 616 returns an error with the fifth bi-directional submodule 810.

The bi-directional replenishment locator module 616 includes an eleventh bi-directional submodule 822. The eleventh bi-directional submodule 822 initializes a minimum cost, "MinCost" to a high water mark as infinity, as shown in the pseudo code 2:

MinCost=∞

The bi-directional replenishment locator module 616 includes a twelfth bi-directional submodule 824, a thirteenth bi-directional submodule 826, a fourteenth bi-directional submodule 828, and a fifteen bi-directional submodule 830. The twelfth bi-directional submodule 824 runs through all the nodes in "Matches", as shown in the pseudo code 2:

For each pair, NodeForward and NodeBackward, in Matches

The thirteenth bi-directional submodule 826, the fourteenth bi-directional submodule 828, and the fifteen bi-directional submodule 830 operates until the all the matches in "Matches" have been examined. The thirteenth bi-directional submodule 826 calculates the time to replenish at a node found in "Matches" based on the initial charge, "initialCharge", the remaining charge from traversing on the forward route, "NodeForward.charge", and optionally with the remaining charge from traversing along the backwards route, "NodeBackward.charge", as shown in the pseudo code 2:

---
replenishmentTime = value computed from initialCharge, NodeForward.charge, and (maybe) NodeBackward.charge

---

The fourteenth bi-directional submodule 828 tests to see if the current node in "Matches" along with the replenishment time is lower than a previously calculated or set minimum cost, "MinCost", as shown in the pseudo code 2:

If (NodeForward.cost+NodeBackward.cost+ replenishmentTime<MinCost)

If the fourteenth bi-directional submodule 828 results in the current node not being less than the previously calculated or set minimum cost, "MinCost", than the search continues through the "Matches" list and returns to the twelfth bi-directional submodule 824.

The fifteen bi-directional submodule 830 operates if the fourteenth bi-directional submodule 828 results in the current node being less than the previously calculated or set minimum cost, "MinCost". The fifteen bi-directional submodule 830 sets the minimum cost, "MinCost" with the current cost calculated in the fourteenth bi-directional submodule 828, the minimum forward node "MinNodeForward", and a minimum backward node "MinNodeBackward", as shown in the pseudo code 2:

```
MinCost = NodeForward.cost + NodeBackward.cost + replenishmentTime
MinNodeForward = NodeForward
MinNodeBackward = NodeBackward
```

The bi-directional replenishment locator module 616 includes a sixteenth bi-directional submodule 832. From the fifteen bi-directional submodule 830, the search continues through the "Matches" list and returns to the twelfth bi-directional submodule 824. When the search through the matches completes, the twelfth bi-directional submodule 824 continues to the sixteenth bi-directional submodule 832.

The sixteenth bi-directional submodule 832 constructs the route with the minimum forward node "MinNodeForward", and a minimum backward node "MinNodeBackward" calculated in the fifteen bi-directional submodule 830, as shown in the pseudo code 2:

```
Construct route by following linked lists starting at
MinNodeForward.previous and MinNodeBackward.previous
```

The bi-directional replenishment locator module 616 includes a seventh bi-directional submodule 834. The seventh bi-directional submodule 834 returns the route constructed from the sixteenth bi-directional submodule 832 for the output for the bi-directional replenishment locator module 616.

It has been discovered that the present invention provides the navigation system 100 to identify the replenishment locations 218 accurately and generate the travel route 216 efficiently for safer operation of the vehicle, the navigation system 100, and other user interface system within the vehicle. The accuracy is provided by identifying the replenishment locations 218 by searching not only from the start location 208 to the destination 206, but also from the destination 206 to the start location 208. The bi-directional approach can reduce error for identifying the replenishment locations 218 that the vehicle can safely reach. Subsequently, the navigation system 100 can generate the travel route 216 that can aid the vehicle to safely reach the destination 206 via the replenishment locations 218 most suitable for the vehicle for replenishment.

Figure 9:
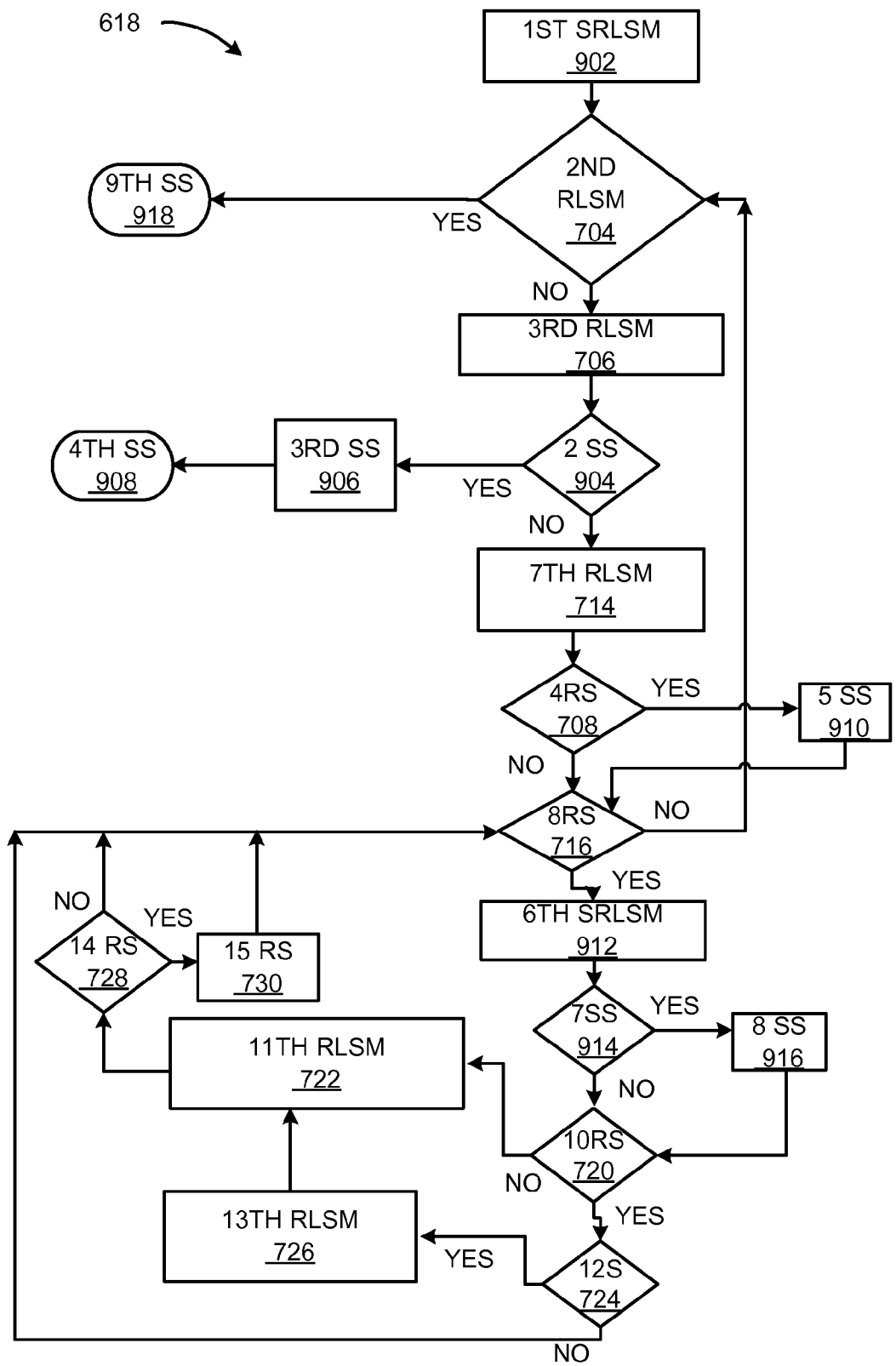
FIG. 9 is a flow of the sufficient replenishment locator module.

Referring now to FIG. 9, therein is shown a flow of a sufficient replenishment locator module 618. The sufficient replenishment locator module 618 generates a path with enough number of replenishment opportunities prior to reaching the target destination. For example, the sufficient replenishment location module 618 can generate the travel route 216 of FIG. 2 to the destination 206 of FIG. 2 through the sufficient number 280 of FIG. 2 of one or more of the replenishment locations 218 of FIG. 2 required for reaching the destination 206 for displaying on the first device 102 of FIG. 1.

For further example, the sufficient replenishment locator module 618 can calculate the sufficient number 280 of the replenishment locations 218 for ensuring a vehicle for reaching the destination 206. Also for example, the sufficient replenishment locator module 618 can identify the first replenishment location 232 of FIG. 2 and the third replenishment location 228 of FIG. 2 as the sufficient number 280 of the replenishment locations 218 to reach from the start location 208 of FIG. 2 to the destination 206.

The sufficient replenishment locator module 618 can be shown in pseudo code format as in the following pseudo code 3:

```
Function Route1Replenishment(Graph, OriginId, initialCharge, minimumSafeCharge)
    PriorityQueue.clear( )
    NodeSet.clear( )
    Origin = NodeSet.getNode(Graph, OriginId, initialCharge)
    Origin.cost = 0
    Origin.previous = NULL   // signifies beginning of route, i.e., there is no previous
    node on the route
    PriorityQueue.insert(Origin) // sets Origin.inQueue = true
    // search nodes in order of cost
    While ( PriorityQueue.isEmpty( ) is false)
        Node = PriorityQueue.top( )
        Node.settled = true // getNode sets settled to false when node is first
        encountered
        If ( Node.id equals DestinationId )
            Reconstruct Route by following linked list starting at Node.previous
            Return route
        Links = Graph.getLinks(Node.id)
        If ( Node.replenishment is true)
            // add a waiting link for recharging
            Link.nextId = Node.id
            Link.cost = Graph.rechargeCost(Node.id, fullCharge, Node.charge) //
            waiting time or monetary cost
            Link.consumed = Node.charge − fullCharge // a negative value means
            charge is increased
            Links.add(Link) // adds a link to the array of links
        For ( i = 0; i < Links.count( ); i = i+1 )
```

-continued

```
        id = Links[i].nextId
        NextNode = NodeSet.getNode(Graph, id, Node.charge –
        Links[i].consumed)
        If ( Node.replenishment is true and Node.id equals id )
            NextNode. replenishment = false   // second node at replenishment
            location
        If ( NextNode.inQueue is true )
            If ( NextNode.cost > Links[i].cost + Node.cost )
                PriorityQueue.remove(NextNode)
                NextNode.previous = pointer to Node // links nodes on
                route back to origin
                NextNode.cost = Links[i].cost + Node.cost
                If (NextNode.charge > minimumSafeCharge)
                    PriorityQueue.insert(NextNode) // sets
                    NextNode.inQueue = true
        Else if ( NextNode.settled is false )
            NextNode.previous = pointer to Node // links nodes on route
            back to origin
            NextNode.cost = Links[i].cost + Node.cost
            If (NextNode.charge > minimumSafeCharge)
                PriorityQueue.insert(NextNode)
// no feasible route exists to destination with the given amount of charge and charge
capacity
Return error
```

Table 2 maps between the pseudo code and the specification elements:

| Pseudo Code Parameters | Specification Elements |
|---|---|
| Link | e.g., the first travel section 220; of FIG. 2 the second travel section 222 of FIG. 2, or the third travel section 224 of FIG. 2 |
| Link.cost | The estimated replenishment time 354 of FIG. 3; the estimated replenishment cost 372 of FIG. 3; or the combination thereof |
| Link.consumed | The estimated replenishment level 314 of FIG. 3 |
| fullCharge | The actual resource level 326 of FIG. 3; the actual fuel level 332 of FIG. 3 or the combination thereof at full capacity. |

The sufficient replenishment locator module 618 can include the second replenishment locator submodule 704, the third replenishment locator submodule 706, the fourth replenishment locator submodule 708, and the seventh replenishment locator submodule 714 with each having the same function, establishing the same condition, or the combination thereof as described in FIG. 7. The sufficient replenishment locator module 618 can include the eighth replenishment locator submodule 716, the tenth replenishment locator submodule 720, the eleventh replenishment locator submodule 722, and the twelfth replenishment locator submodule 724 with each having the same function, establishing the same condition, or the combination thereof as described in FIG. 7. The sufficient replenishment locator module 618 can include the thirteenth replenishment locator submodule 726, the fourteenth replenishment locator submodule 728, and the fifteenth replenishment locator submodule 730 with each having the same function, establishing the same condition, or the combination thereof as described in FIG. 7.

The sufficient replenishment locator module 618 can include a first sufficient replenishment locator submodule 902 and is coupled to the second replenishment locator submodule 704. The first sufficient replenishment locator submodule 902 can include the same functions as the first replenishment locator submodule 702 of FIG. 7 with the following modifications to initialize the data structures used in the pseudo code 3:

Origin=NodeSet.getNode(Graph,OriginId, initialCharge)

For example, "NodeSet.getNode( )" as described in FIG. 7 for returning the "Node" representing the "Origin" can also return the "Node" having the "initialCharge" of the vehicle when the vehicle is at the start location 208. More specifically, the status module 612 of FIG. 6 can provide the vehicle information 640 of FIG. 6 having the actual resource level 326 of FIG. 3, the actual fuel level 332 of FIG. 3, or the combination thereof for the vehicle at the start location 208. The first sufficient replenishment locator submodule 902 does not invoke "Origin.charge=initialCharge" and "ReplenishmentList.clear( )."

The sufficient replenishment locator module 618 can include a second sufficient replenishment locator submodule 904 and is coupled to the third replenishment locator submodule 706. The second sufficient replenishment locator submodule 904 identifies whether the condition that a "Node" is the destination 206 has been met or not. For example, the second sufficient replenishment locator submodule 904 can include the following function to identify the condition, as in pseudo code 3:

If (Node.id equals DestinationId)

For a further example, "If (Node.id equals DestinationId)" can identify whether the condition that a "Node" as described in FIG. 7 is the destination 206 has been met or not. More specifically, "If (Node.id equals DestinationId)" identifies whether the "id" as described in FIG. 7 for the "Node" matches the "id" for the destination 206 or the "DestinationId."

The "DestinationId" is defined as the ID for the destination 206. If the condition for "If (Node.id equals DestinationId)" is met, the sufficient replenishment locator module 618 can invoke a third sufficient replenishment locator submodule 906. In contrast, if the condition for "If (Node.id equals DestinationId)" is not met, the sufficient replenishment locator module 618 can invoke the seventh replenishment locator submodule 714.

The sufficient replenishment locator module 618 can include the third sufficient replenishment locator submodule 906 and is coupled to the second sufficient replenishment locator submodule 904. The third sufficient replenishment locator submodule 906 generates the route from the "Origin" to the target destination. For example, the third sufficient replenishment locator submodule 906 can generate the travel route 216 to the destination 206 through the sufficient number 280 of one or more of the replenishment locations 218 required to reach the destination 206 for displaying on the first device 102. For a further example, the third sufficient replenishment locator submodule 906 can include the following function generate the travel route 216, as described in pseudo code 3.

Reconstruct Route by following linked list starting at Node.previous

The third sufficient replenishment locator submodule 906 can execute "Reconstruct Route by following linked list starting at Node.previous" to generate the travel route 216 by connecting the "Nodes." For a specific example, one of the "Node" can be the destination 206. "Node.previous" can point to the "Node" that can come before reaching the destination 206.

For example, "Node.previous" to the destination 206 can be the third replenishment location 228 of FIG. 2. For another example, "Node.previous" to the third replenishment location 228 can be the first replenishment location 232 of FIG. 2. For a further example, "Node.previous" to the first replenishment location 232 can be the first intermediate stop 212 of FIG. 2. And finally, "Node.previous" to the first intermediate stop 212 can be the start location 208.

The third sufficient replenishment locator submodule 906 can generate the travel route 216 by linking the path between each stopping points along the travel route 216. For a specific example, the third sufficient replenishment locator submodule 906 can generate the travel route 216 by linking the fourth travel section 226 of FIG. 2, the third travel section 224 of FIG. 2, the second travel section 222 of FIG. 2, and the first travel section 220 of FIG. 2.

The sufficient replenishment locator module 618 can include a fourth sufficient replenishment locator submodule 908 and is coupled to the third sufficient replenishment locator submodule 906. The fourth sufficient replenishment locator submodule 908 returns the travel route 216 generated by the third sufficient replenishment locator submodule 906. The fourth sufficient replenishment locator submodule 908 can return the travel route 216 with the following function:

Return route

The sufficient replenishment locator module 618 can generate the travel route 216 to the user by executing the "Return route." The travel route 216 can include the sufficient number 280 of the replenishment locations 218 to reach the destination 206.

The sufficient replenishment locator module 618 can include a fifth sufficient replenishment locator submodule 910 and is coupled to the fourth replenishment locator submodule 708. The fifth sufficient replenishment locator submodule 910 calculates the time cost, the monetary cost, or the combination thereof associated with replenishing the vehicle at one of the replenishment locations 218. For example, the fifth sufficient replenishment locator submodule 910 can calculate the estimated replenishment time 354, the estimated replenishment cost 372, or the combination thereof for replenishing a vehicle at each of the replenishment locations 218.

For further example, the fifth sufficient replenishment locator submodule 910 can calculate the estimated replenishment time 354 for replenishing the resource, fuel, or the combination thereof for the vehicle. For another example, the fifth sufficient replenishment locator submodule 910 can calculate the estimated replenishment cost 372 for replenishing the resource, fuel, or the combination thereof for the vehicle. The fifth submodule can include the following functions to calculate the estimated replenishment time 354, the estimated replenishment cost 372, or the combination thereof, as from pseudo code 3:

```
Link.nextId = Node.id
Link.cost = Graph.rechargeCost(Node.id, fullCharge, Node.charge)
Link.consumed = Node.charge – fullCharge
Links.add(Link)
```

"Link" is defined as a data structure representing the waiting link for replenishing the vehicle for each replenishment opportunity. For example, that stopping point or "Node.id" can represent the third replenishment location 228. The replenishment timeline 426 of FIG. 4 can represent a "Link."

"Link.nextId" can represent a data structure for indicating the location of where the "Link" is defined. For example, "Link.nextId=Node.id" can associate a "Link" with a particular "Node.id." If the "Node.id" can represent the third replenishment location 228, the "Link.nextId" can represent the replenishment timeline 426 for the third replenishment location 228.

"Link.cost" is defined as the time cost, the monetary cost, or the combination thereof associated with replenishing the vehicle at one of the replenishment locations 218. For example, "Link.cost" can represent the estimated replenishment time 354, the estimated replenishment cost 372, or the combination thereof at the third replenishment location 228.

The fifth sufficient replenishment locator submodule 910 can calculate the "Link.cost" by executing "Graph.rechargeCost(Node.id, fullCharge, Node.charge)." For example, "Graph" can include information about the replenishment of resource, fuel, or the combination thereof for each of the replenishment locations 218. The information can include replenishment of battery, an exchange of a battery, or the combination thereof.

The fifth sufficient replenishment locator submodule 910 can execute "Graph.rechargeCost" to calculate the estimated replenishment time 354, the estimated replenishment cost 372, or the combination thereof based on the "Node.id," "fullCharge," "Node.charge," the transportation type 346 of FIG. 3, the replenishment profile 342 of FIG. 3, or the combination thereof "Node.id" can represent one of the replenishment locations 218 that user can replenish the vehicle. "fullCharge" can represent the actual resource level 326, the actual fuel level 332, or the combination thereof at full capacity. "Node.charge" can represent the estimated resource level 310 of FIG. 3, the estimated fuel level 312 of FIG. 3, or the combination thereof as described in FIG. 7.

For a specific example, "Node.id" can represent the third replenishment location 228. "Node.charge" can represent the estimated fuel level 312 of 50%. The transportation type 346 can represent an electric vehicle. The replenishment profile 342 for the electric vehicle can be one hour from completely empty to full capacity. The fifth sufficient replenishment locator submodule 910 can calculate the estimated replenishment time 354 to be 30 minutes by executing "Graph.rechargeCost(Node.id, fullCharge, Node.charge)."

"Link.consumed" is defined as the amount of "charge" the vehicle can consume for replenishment. For this example, "Link.consumed" can be set for full replenishment for resource, fuel, or the combination thereof. For example, "Node.charge" or the estimated fuel level 312 arriving at the third replenishment location 228 can be 25% of full capacity. "Link.consumed=Node.charge–fullCharge" can be 75%. Therefore, the vehicle can require the estimated replenishment level 314 of 75% to fully replenish the vehicle.

The fifth sufficient replenishment locator submodule 910 can execute "Links.add(Link)" to add the "Link" to "Links." By adding "Link" to "Links," the fifth sufficient replenishment locator submodule 910 can calculate the "cost" associate for traveling that particular "Links."

The sufficient replenishment locator module 618 can include a sixth sufficient replenishment locator submodule 912 and is coupled to the eighth replenishment locator submodule 716. The sixth sufficient replenishment locator submodule 912 identifies the candidate for the next stopping point based on the estimated resource level 310, the estimated fuel level 312, or the combination thereof for the vehicle arriving at the next stopping point. For example, the sixth sufficient replenishment locator submodule 912 can include the same functions as described in the ninth replenishment locator submodule 718 of FIG. 7 with one additional input for "NodeSet.getNode( )", as from pseudo code 3:

NextNode=NodeSet.getNode(Graph, id, Node.charge−Links[i].consumed)

The function "NodeSet.getNode(Graph, id, Node.charge−Links[i].consumed)" can represent the same function as "NodeSet.getNode( )" described in FIG. 7 with one additional input "Node.charge−Links[i].consumed." "Node.charge" is as described in FIG. 7. "Links[i].consumed" is as described in FIG. 7. The sixth sufficient replenishment locator submodule 912 can execute "NodeSet.getNode(Graph, id, Node.charge−Links[i].consumed)" to return the next stopping point having the "NextNode.charge" as described in FIG. 7.

For a more specific example, the "NextNode" will have the "NextNode.charge" or the estimated resource level 310, the estimated fuel level 312, or the combination thereof as described in FIG. 7. As illustrated in FIG. 7, "NodeSet.getNode(Graph, id, Node.charge−Links[i].consumed)" can return the third replenishment location 228 with the vehicle having the "NextNode.charge" or the estimated fuel level 312 of 37.5%.

The sufficient replenishment locator module 618 can include a seventh sufficient replenishment locator submodule 914 and is coupled to the sixth sufficient replenishment locator submodule 912. The seventh sufficient replenishment locator submodule 914 identifies whether the condition that "NextNode" is not the same as the "Node." For example, the seventh sufficient replenishment locator submodule 914 can include the following function to identify the condition, as described from pseudo code 3:

If (Node.replenishment is true and Node.id equals id)

For a further example, "If (Node.replenishment is true and Node.id equals id)" can be the same function as "If (Node.replenishment is true)" of the fourth replenishment locator submodule 708 of FIG. 7 with one additional input. "Node.id equals id" verifies whether the "NextNode.id" is the same as the "Node.id." For example, the "Node.id" can represent the third replenishment location 228. If the "NextNode.id" also represents the third replenishment location 228, the seventh sufficient replenishment locator submodule 914 can invoke an eighth sufficient replenishment locator submodule 916.

The sufficient replenishment locator module 618 can include the eighth sufficient replenishment locator submodule 916. The eighth sufficient replenishment locator submodule 916 sets the "replenishment" to "false" for the "NextNode." For example the eighth sufficient replenishment locator submodule 916 can set the "replenishment" with the following function:

NextNode.replenishment=false

By setting the "replenishment" as "false," the sufficient replenishment locator module 618 cannot include that the "NextNode.id" is the same as the "Node.id." More specifically, the sufficient replenishment locator module 618 can avoid duplicate generation of the travel route 216 to the same location for the replenishment locations 218.

The sufficient replenishment locator module 618 can include a ninth sufficient replenishment locator submodule 918 and is coupled to the second replenishment locator submodule 704. The ninth sufficient replenishment locator submodule 918 returns an error if the sufficient replenishment locator module 618 fails to generate the travel route 216. The ninth sufficient replenishment locator submodule 918 can execute "Return error" if it fails to generate the travel route 216.

For illustrative purposes, the navigation system 100 is described with the sufficient replenishment locator module 618 generating the travel route 216, although it is understood that the navigation system 100 can operate the sufficient replenishment locator module 618 differently. For example, the sufficient replenishment locator module 618 can generate the recovery route 207 of FIG. 2 based on the route deviation 205 of FIG. 2 for reaching at least one of the replenishment locations 218. For example, similar to the sufficient replenishment locator module 618 generating the travel route 216 from the start location 208 to one of the replenishment locations 218, the sufficient replenishment locator module 618 can generate the recovery route 207 from the route deviation 205 to one of the replenishment locations 218.

For a further example, the sufficient replenishment locator module 618 can update the sufficient number 280 of the replenishment locations 218 required for traversing the remainder 438 of FIG. 4 of the travel route 216 based on the route deviation 205. More specifically, when the traverse module 636 of FIG. 6 detects the route deviation 205 by detecting the current location 242 of FIG. 2 of the vehicle not being on the travel route 216, the sufficient replenishment locator module 618 can recalculate the sufficient number 280 originating from the route deviation 205 to ensure that the vehicle can reach the destination 206 having the sufficient number 280 of the replenishment locations 218. Subsequently, the sufficient replenishment locator module 618 can update the travel route 216 based on the recalculated value of the sufficient number 280 for ensuring a vehicle for reaching the destination 206 from the route deviation 205.

For illustrative purposes, the navigation system 100 is described with the sufficient replenishment locator module 618 generating the recovery route 207, although it is understood that the navigation system 100 can operate the sufficient replenishment locator module 618 differently. For example, the sufficient replenishment locator module 618 can generate the replenishment route 209 of FIG. 2 based on the actual resource level deviation 328 of FIG. 3, the actual fuel level deviation 334 of FIG. 3, or the combination thereof for ensuring the vehicle for reaching at least one of the replenishment locations 218. For a further example, similarly to the sufficient replenishment locator module 618 generating the travel route 216 from the start location 208 to one of the replenishment locations 218, the sufficient replenishment locator module 618 can generate the replenishment route 209 from the current location 242 where the traverse module 636 had calculated the actual fuel level deviation 334 to one of the replenishment locations 218.

It has been discovered that the present invention provides the navigation system 100 for calculating the sufficient number 280 of the replenishment locations 218 to ensure the vehicle to safely reach the destination 206. Calculating the sufficient number 280 of the replenishment locations 218 enhances the probability that the vehicle can reach the destination 206 without running out of the resource, fuel, or the combination thereof while traversing along the travel route 216. Furthermore, the navigation system 100 can generate the recovery route 207 or the replenishment route 209 can further increase the probability of the vehicle reaching the destination 206 without running out of the resource, fuel, or the combination thereof. Subsequently, the enhancement aids the user to operate the vehicle safely without the worry of resource, fuel, or the combination thereof running out prior to reaching the destination 206.

Figure 10:
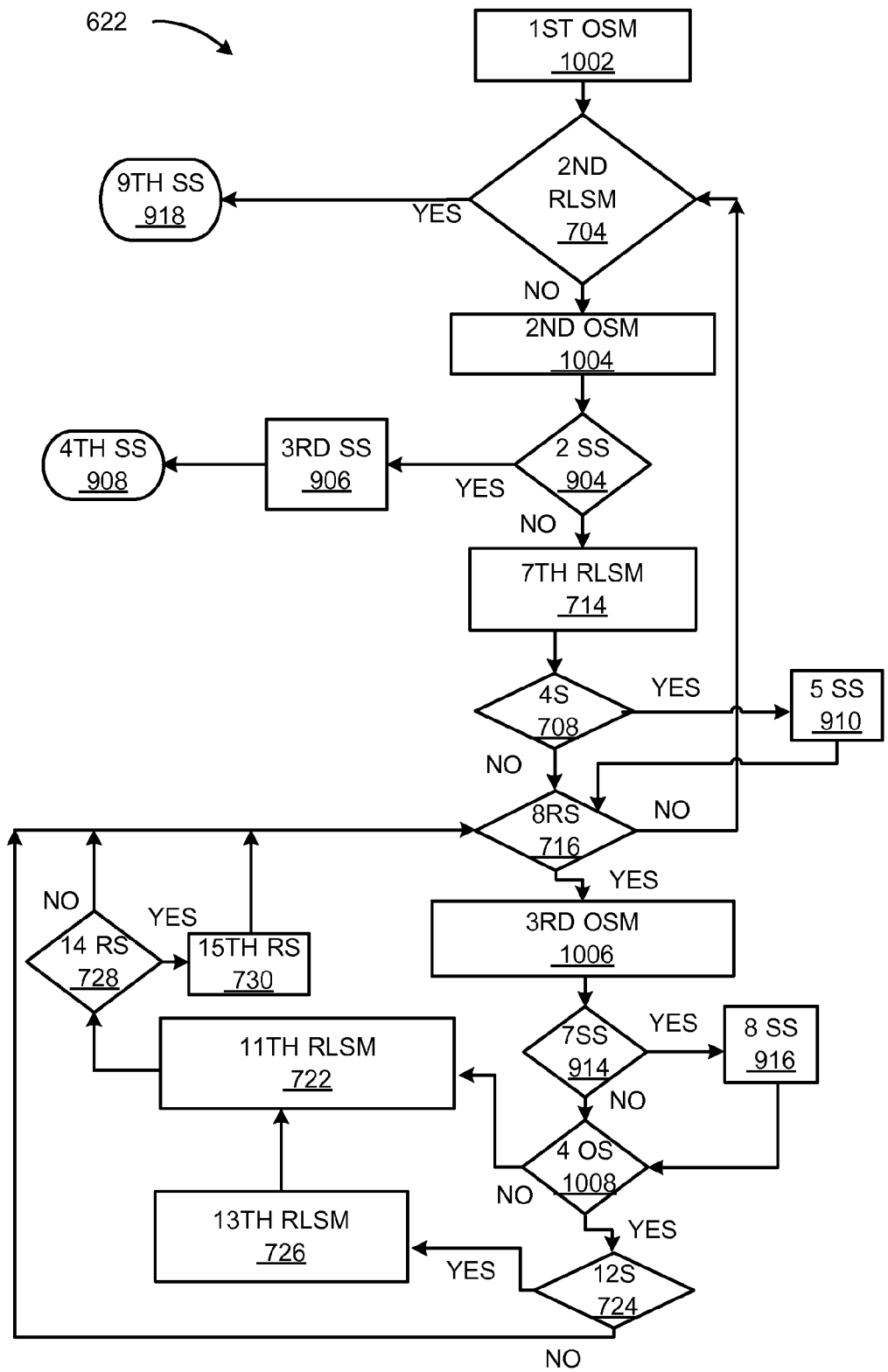
FIG. 10 is a flow of the optimizer module.

Referring now to FIG. 10, therein is shown a flow of the optimizer module 622. The optimizer module 622 identifies the sufficient number 280 of FIG. 2 of the replenishment locations 218 of FIG. 2 for reaching the destination 206 of FIG. 2. For example, the sufficient replenishment locator module 618 can identify the first replenishment location 232 of FIG. 2 and the third replenishment location 228 of FIG. 2 as two of the replenishment locations 218 to reach from the start location 208 of FIG. 2 to the destination 206.

In contrast to the sufficient replenishment locator module 618, the optimizer module 622 can reduce the computation speed by considering the "cost" and "charge" as described in FIG. 7 for identifying the replenishment locations 218. The possibility of replicating the search for the same "Node" using the approach from the sufficient replenishment locator module 618 can exist.

For example, the optimizer module 622 can select one or more of the travel sections 297 based on comparing each of the estimated resource level 310, the estimated fuel level 312, or the combination thereof for minimizing the travel cost for reaching the destination 206. For another example, the optimizer module 622 can select one or more of the travel sections 297 based on comparing each of the estimated travel time 352, the estimated financial cost 370, or the combination thereof for minimizing the travel cost for reaching the destination 206.

For a specific example, the user's vehicle can reach the third replenishment location 228 traversing different paths from the first replenishment location 232. The user's vehicle can reach the third replenishment location 228 by traversing either the third travel section 224 of FIG. 2 or the sixth travel section 292 of FIG. 2 and the seventh travel section 294 of FIG. 2. The vehicle can have a greater amount of the estimated fuel level 312 of FIG. 3 arriving at the third replenishment location 228 and can incur lesser amount of the estimated travel time 352, the estimated financial cost 370, or the combination thereof by selecting the third travel section 224.

The optimizer module 622 can eliminate the path to reach the third replenishment location 228 representing the sixth travel section 292 and the seventh travel section 294 to reduce computation speed for searching the path to reach the third replenishment location 228. The optimizer module 622 can be shown in pseudo code format as in the following pseudo code 4:

```
Function Route1Replenishment(Graph, OriginId, initialCharge, minimumSafeCharge)
    // initialize data structures
    PriorityQueue.clear( )
    NodeSet.clear( )
    Origin = NodeSet.getNode(Graph, OriginId, initialCharge, 0)
    Origin.cost = 0
Origin.previous = NULL   // signifies beginning of route, i.e., there is no previous
node on the route
PriorityQueue.insert(Origin) // sets Origin.inQueue = true
// search nodes in order of cost
While ( PriorityQueue.isEmpty( ) is false)
    Repeat
        Node = PriorityQueue.top( )
    Until Node.notUseful is false
    Node.settled = true // getNode sets settled to false when node is first
    encountered
    If ( Node.id equals DestinationId )
        Reconstruct Route by following linked list starting at Node.previous
        Return route
    Links = Graph.getLinks(Node.id)
    If ( Node.replenishment is true)
        // add a waiting link for recharging
        Link.nextId = Node.id
        Link.cost = Graph.rechargeCost(Node.id, fullCharge, Node.charge) //
        waiting time or monetary cost
        Link.consumed = Node.charge – fullCharge // a negative value means
        charge is increased
        Links.add(Link) // adds a link to the array of links
    For ( i = 0; i < Links.count( ); i = i+1 )
        id = Links[i].nextId
        NextNode = NodeSet.getNode(Graph, id, Node.charge–
        Links[i].consumed, Links[i].cost+Node.cost)
        If ( Node.replenishment is true and Node.id equals id )
            NextNode. replenishment = false // second node at replenishment
            location
        If ( NextNode.inQueue is true and NextNode.notUseful is false)
            If ( NextNode.cost > Links[i].cost + Node.cost )
                PriorityQueue.remove(NextNode)
                NextNode.previous = pointer to Node // links nodes on route
                back to origin
                NextNode.cost = Links[i].cost + Node.cost
                If (NextNode.charge > minimumSafeCharge)
                    PriorityQueue.insert(NextNode) // sets NextNode.inQueue
=
                    true
        Else if ( NextNode.settled is false and NextNode.notUseful is false)
```

```
NextNode.previous = pointer to Node // links nodes on route
    back to origin
NextNode.cost = Links[i].cost + Node.cost
If (NextNode.charge > minimumSafeCharge)
    PriorityQueue.insert(NextNode)
// no feasible route exists to destination with the given amount of charge and charge
capacity
Return error
```

Table 4 maps between the pseudo code and the specific elements:

| Pseudo Code Parameters | Specification Elements |
|---|---|
| Node.notUseful | No equivalence |

The optimizer module 622 can include the second replenishment locator submodule 704, the fourth replenishment locator submodule 708, and the seventh replenishment locator submodule 714 with each having the same function, establishing the same condition, or the combination thereof as described in FIG. 7. The optimizer module 622 can include the eighth replenishment locator submodule 716, the eleventh replenishment locator submodule 722, the thirteenth replenishment locator submodule 726, the fourteenth replenishment locator submodule 728, and the fifteenth replenishment locator submodule 730 with each having the same function, establishing the same condition, or the combination thereof as described in FIG. 7.

The optimizer module 622 can include the second sufficient replenishment locator submodule 904, the third sufficient replenishment locator submodule 906, the fourth sufficient replenishment locator submodule 908, and the fifth sufficient replenishment locator submodule 910 with each having the same function, establishing the same condition, or the combination thereof as described in FIG. 9. The optimizer module 622 can include the seventh sufficient replenishment locator submodule 914, the eighth sufficient replenishment locator submodule 916, and the ninth sufficient replenishment locator submodule 918 with each having the same function, establishing the same condition, or the combination thereof as described in FIG. 9.

The optimizer module 622 can include a first optimizer submodule 1002 and is coupled to the second replenishment locator submodule 704. The first optimizer submodule 1002 can include the same functions as the first sufficient replenishment locator submodule 902 of FIG. 9 with the following addition of input to initialize the data structures used in the pseudo code:

Origin=NodeSet.getNode(Graph,OriginId, initialCharge, 0)

The fourth input "0" is defined as the "cost" as described in FIG. 7 for reaching the "Node." Since the "NodeSet.getNode( )" here is returning the "Node" representing the "Origin," the "cost" is set to "0," because the vehicle has yet to travel. For example, "NodeSet.getNode(Graph,OriginId, initialCharge, 0)" can return the start location 208 having the estimated travel time 352 of FIG. 3, the estimated financial cost 370 of FIG. 3, or the combination thereof with the value of "0."

The optimizer module 622 can include a second optimizer submodule 1004 and is coupled to the second replenishment locator submodule 704. The second optimizer submodule 1004 searches for the "Node" with a field "notUseful" with a value of "false." For example, the second optimizer submodule 1004 can include the following functions to search for the "Node."

```
Repeat
    Node = PriorityQueue.top( )
    Until Node.notUseful is false
    Node.settled = true
```

"Node=PriorityQueue.top( )" and "Node.settled=true" are the same as the functions described in the third replenishment locator submodule 706 of FIG. 7. "PriorityQueue.top( )" can return a "Node" having the field "notUseful."

"notUseful" is defined as a field to allow the optimizer submodule to distinguish a "Node" that can be useful for generating the travel route 216 from a "Node" that can be not useful for generating the travel route 216. If the "notUseful" is set to "true," the "Node" is not useful. In contrast, if the "notUseful" is set to "false," the "Node" is useful.

For example, a "Node" can be not useful if a "Node" does not have any advantages over other "Nodes." More specifically, if the "cost" for one "Node" is no less than the "cost" for the other "Node" and if the "charge" for one "Node" is no greater than the "charge" for the other "Node," that one "Node" provides no advantage for the vehicle to save "cost,' "charge," or the combination thereof for reaching that one "Node." Therefore, that one "Node" is not useful for the optimizer module 622 for generating the travel route 216.

As discussed previously, the third replenishment location 228 can represent the "Node." For a further example, the third replenishment location 228 having the "charge" and the "cost" for traveling through the sixth travel section 292 and the seventh travel section 294 can have no advantages over the third replenishment location 228 having the "charge" and the "cost" for traveling through the third travel section 224, because the estimated fuel level 312 will be greater and the estimated travel time 352 can be less for traveling the third travel section 224. Subsequently, the third replenishment location 228 having the "charge" and the "cost" for traveling through the sixth travel section 292 and the seventh travel section 294 can be not useful for generating the travel route 216. Therefore, "notUseful" can be set as "true" for the third replenishment location 228 having the "charge" and the "cost" for traveling through the sixth travel section 292 and the seventh travel section 294.

The functions "Repeat" and "Until Node.notUseful is false" allows the second optimizer submodule 1004 to continue searching for the "Node" until "PriorityQueue.top( )" returns a "Node" having "notUseful" as "false." More specifically, the second optimizer submodule 1004 can determine the vehicle performance combination 376 to exclude the combination of resource or fuel with the travel cost that is "notUseful." As a result, the navigation system 100 can exclude from considering the combination of resource or fuel with the travel cost that does not maximize the balance performance of the vehicle to reach the location. For example, "PriorityQueue.top( )" can return a "Node" representing the "Origin." "NodeSet.getNode( )" can set the "notUseful" as "true" or "false." Since the "PriorityQueue" contains no other "Node" at the very first invocation, "NodeSet.getNode( )" will not set the "notUseful" field for the "Origin" as "true." Therefore, the functions "Repeat" and "Until Node.notUseful is false" can exit after returning "Origin." The details regarding the "Nodeset.getNode( )" setting the value for "notUseful" will be discussed later.

The optimizer module 622 can include a third optimizer submodule 1006 and is coupled to the eighth replenishment locator submodule 716. The third optimizer submodule 1006 identifies the candidate for the next stopping point based on the estimated resource level 310, the estimated fuel level 312, or the combination thereof if the vehicle arrives at the next stopping point. The third optimizer submodule 1006 can include the same functions as described in the sixth sufficient replenishment locator submodule 912 of FIG. 9 with one additional input for "Node.Set.getNode( )":

```
NextNode = NodeSet.getNode(Graph, id, Node.charge −
Links[i].consumed, Links[i].cost + Node.cost)
```

The one additional input, "Links[i].cost+Node.cost," is as described in the twelfth replenishment locator submodule 724 of FIG. 7. Continuing with the example from FIG. 7, the third optimizer submodule 1006 can return the "Node" having the value calculated from "Links[i].cost+Node.cost." For a further example, "Links[0].cost+Node.cost" can represent the aggregation of the estimated travel time 352, the estimated financial cost 370, or the combination thereof for traveling the first travel section 220, the second travel section 222, and the third travel section 224. The third optimizer submodule 1006 can execute NodeSet.getNode(Graph, id, Node.charge−Links[i].consumed, Links[i].cost+Node.cost) to return the third replenishment location 228. The third replenishment location 228 can be the "NextNode."

The third optimizer submodule 1006 can execute "NodeSet.getNode(Graph, id, Node.charge−Links[i].consumed, Links[i].cost+Node.cost)" as the following. For example, the third optimizer submodule 1006 can search for the "Node" having the greatest value for "charge" less than "Node.charge−Links[i].consumed" by executing "Node Set.getNode( )." Once the first "Node" is found, the third optimizer submodule 1006 can search for other "Node" having lesser "charge" until one of lesser "cost" is found. And each "Node" found with neither greater "charge" nor less "cost," the third optimizer submodule 1006 can remove the "Node" from the "NodeSet" and set the "notUseful" for that "Node" as "true."

For another example, the third optimizer submodule 1006 can search for the "Node" having the least "charge" not less than "Node.charge−Links[i].consumed" by executing "NodeSet.getNode( )." If no "Node" is found, the third optimizer submodule 1006 can create a new "Node" with the given "Graph" and "id" from the input of "NodeSet.getNode( )."

If a "Node" is found, and "cost" for the "Node" has a "cost equal to or less than "Links[i].cost+Node.cost," and if the "charge" for that "Node" equal to "Node.charge−Links[i].consumed," "NodeSet.getNode( )" returns that "Node." Otherwise, the third optimizer submodule 1006 can set "notUseful" for that "Node" as "true," and that "Node" will not be added to "NodeSet."

For example, if the third optimizer submodule 1006 discovers a "Node" having neither greater "charge" nor less "cost, the optimizer module 622 can remove such "Node" from the "NodeSet" and set the "notUseful" to "true" for that "Node." For a more specific example, "notUseful" for the third replenishment location 228 having the vehicle travel through the sixth travel section 292 and the seventh travel section 294 from the first replenishment location 232 can be set as "true."

The optimizer module 622 can include a fourth optimizer submodule 1008 and is coupled to the seventh sufficient replenishment locator submodule 914. The fourth optimizer submodule 1008 identifies whether the condition that the "NextNode" is in the "PriorityQueue" has been met or not. For example, the fourth optimizer submodule 1008 can include the same functions as the functions for the tenth replenishment locator submodule 720 with one additional input.

```
If ( NextNode.inQueue is true and NextNode.notUseful is false )
Else if ( NextNode.settled is false and NextNode.notUseful is false )
```

Both conditions require "notUseful" for the "NextNode" to be "false" in order for the optimizer module 622 to invoke either the eleventh replenishment locator submodule 722 or the twelfth replenishment locator submodule 724. The details for the eleventh replenishment locator submodule 722 and the twelfth replenishment locator submodule 724 are detailed in FIG. 7.

It has been discovered that the present invention provides the navigation system 100 for identifying the sufficient number 280 of the replenishment locations 218 most suitable for the vehicle to replenish prior to reaching the destination 206. The comparison of the estimated travel time 352, the estimated financial cost 370, or the combination thereof that the vehicle can incur from traversing each of the travel sections 297 can eliminate the travel sections 297 that are not useful. The elimination can aid the user to safely operate the vehicle to avoid incurring unnecessary "cost" for reaching the destination 206.

Figure 11:
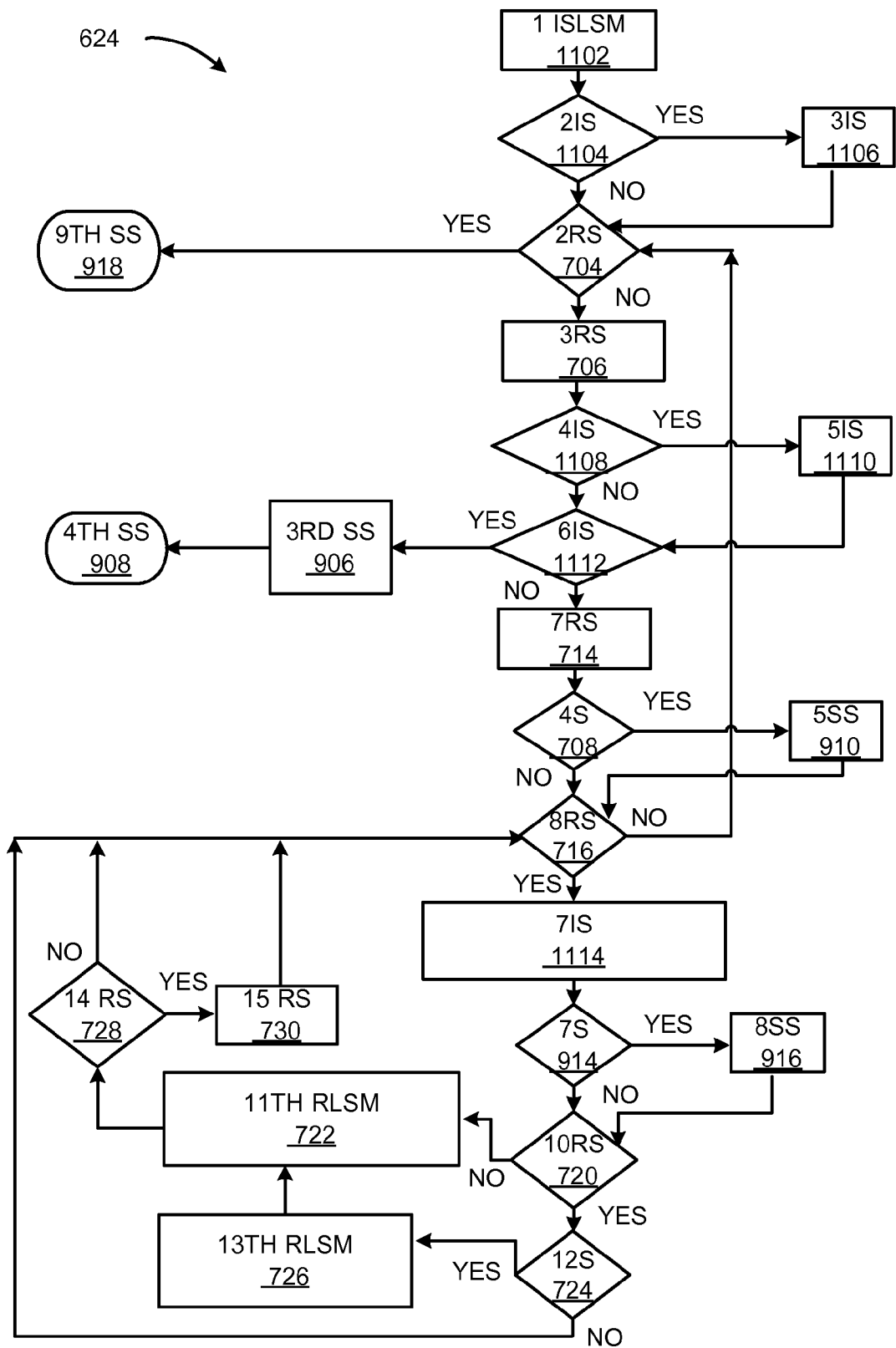
FIG. 11 is a flow of the intermediate stop locator module.

Referring now to FIG. 11, therein is shown a flow of the intermediate stop locator module 624. The intermediate stop locator module 624 generates a path that travels through one or more of the intermediate stopping points prior to reaching the target destination. For example, the intermediate stop locator module 624 can identify the replenishment locations 218 of FIG. 2 along the travel route 216 of FIG. 2 from the start location 208 of FIG. 2 through one or more of the intermediate stops 210 of FIG. 2 prior to reaching the destination 206 of FIG. 2. For a further example, the intermediate stop locator module 624 can generate the travel route 216 through the sufficient number 280 of one or more of the replenishment locations 218 required for reaching one or more of the intermediate stops 210.

More specifically, the intermediate stop locator module 624 can identify the first intermediate stop 212 of FIG. 2, the second intermediate stop 214 of FIG. 2, or the combination thereof. The intermediate stop locator module 624 can be shown in pseudo code format as in the following pseudo code 6:

```
Function Route1Replenishment(Graph, OriginId, initialCharge, maxDestNumber,
minimumSafeCharge)
    // initialize data structures
    PriorityQueue.clear( )
    NodeSet.clear( )
    Origin = NodeSet.getNode(Graph, OriginId, initialCharge, 0)
    If (Origin.destNumber equals 1)
        Origin.destVisited = 1;
    Origin.cost = 0
    Origin.previous = NULL     // signifies beginning of route, i.e., there is no previous
    node on the route
    PriorityQueue.insert(Origin) // sets Origin.inQueue = true
    // search nodes in order of cost
    While ( PriorityQueue.isEmpty( ) is false)
            Node = PriorityQueue.top( )
            Node.settled = true // getNode sets settled to false when node is first
            encountered
            If (Node.destNumber equals Node.destVisited+1)
                Node.destVisited = destNumber;
            If (Node.destVisited equals maxDestNumber)
                    Reconstruct Route by following linked list starting at Node.previous
                    Return route
            Links = Graph.getLinks(Node.id)
            If ( Node.replenishment is true)
                // add a waiting link for recharging
                Link.nextId = Node.id
                Link.cost = Graph.rechargeCost(Node.id, fullCharge, Node.charge) //
                waiting time or monetary cost
                Link.consumed = Node.charge − fullCharge // a negative value means
                charge is increased
                Links.add(Link) // adds a link to the array of links
            For ( i = 0; i < Links.count( ); i = i+1 )
                    id = Links[i].nextId
                    NextNode = NodeSet.getNode(Graph, id, Node.charge −
                    Links[i].consumed, Node.destVisited)
                    If ( Node.replenishment is true and Node.id equals id )
                        NextNode. replenishment = false     // second node at replenish-
ment
                                location
                    If ( NextNode.inQueue is true )
                            If ( NextNode.cost > Links[i].cost + Node.cost )
                                PriorityQueue.remove(NextNode)
                                NextNode.previous = pointer to Node // links nodes on
                                route back to origin
                                NextNode.cost = Links[i].cost + Node.cost
                                If (NextNode.charge > minimumSafeCharge)
                                    PriorityQueue.insert(NextNode) // sets
                                    NextNode.inQueue = true
                    Else if ( NextNode.settled is false )
                            NextNode.previous = pointer to Node // links nodes on route
                            back to origin
                            NextNode.cost = Links[i].cost + Node.cost
                            If (NextNode.charge > minimumSafeCharge)
                                PriorityQueue.insert(NextNode)
```

Table 4 maps between the pseudo code and the specification elements:

| Pseudo Code Parameters | Specification Elements |
| --- | --- |
| destNumber | The intermediate stops 210; destination 206 |
| maxDestNumber | The aggregation of total numbers for the intermediate stops 210 and the destination 206. E.g., the first intermediate stop 212, the second intermediate stop 214, and the destination 206 can equal maxDestNumber of 3 |

The intermediate stop locator module 624 can include the second replenishment locator submodule 704, the third replenishment locator submodule 706, the fourth replenishment locator submodule 708, and the seventh replenishment locator submodule 714 with each having the same function, establishing the same condition, or the combination thereof as described in FIG. 7. The intermediate stop locator module 624 can include the eighth replenishment locator submodule 716, the tenth replenishment locator submodule 720, the eleventh replenishment locator submodule 722, and the twelfth replenishment locator submodule 724 with each having the same function, establishing the same condition, or the combination thereof as described in FIG. 7. The intermediate stop locator module 624 can include the thirteenth replenishment locator submodule 726, the fourteenth replenishment locator submodule 728, and the fifteenth replenishment locator submodule 730 with each having the same function, establishing the same condition, or the combination thereof as described in FIG. 7.

The intermediate stop locator module 624 can include the third sufficient replenishment locator submodule 906, the fourth sufficient replenishment locator submodule 908, and the fifth sufficient replenishment locator submodule 910 with each having the same function, establishing the same condition, or the combination thereof as described in FIG. 9. The intermediate stop locator module 624 can include the seventh sufficient replenishment locator submodule 914, the eighth sufficient replenishment locator submodule 916, and the ninth sufficient replenishment locator submodule 918 with each having the same function, establishing the same condition, or the combination thereof as described in FIG. 9.

The intermediate stop locator module 624 can include a first intermediate stop locator submodule 1102. The first intermediate stop locator submodule 1102 can include the same functions as the first sufficient replenishment locator submodule 902 of FIG. 9 with the following difference for an input to initialize the data structures used in the pseudo code:

Origin=NodeSet.getNode(Graph,OriginId, initialCharge, 0)

The fourth input "0" is defined as the value of the desired "Node." More specifically, "0" represents the value for the "destVisited."

The "destVisited" is defined as a field for the "Node" representing the highest number of any target destination visited on the path found to that "Node." For example, the "Node" representing the first intermediate stop 212 can have a value of "1" for "destVisited" once the user visits the first intermediate stop 212 after traversing the first travel section 220 of FIG. 2 from the start location 208. For a further example, the destination 206 can have the value of "2" for "destVisited" after the user stopped by the first intermediate stop 212.

For a further definition, two "Node" with different values for "destVisited" can be considered to be a different "Node" even if they represent the same "Graph.Node" and have the same "charge" after arriving at that "Node." For example, the destination 206 can have values for "destVisited" of "2" and "3." The destination 206 can have the value of "2" for "destVisited" if the user arrives at the destination 206 after stopping by at the first intermediate stop 212. In contrast, the destination 206 can have the value of "3" for "destVisited" if the user arrives at the destination 206 after stopping by at the first intermediate stop 212 and the second intermediate stop 214.

"NodeSet.getNode( )" can set the value for "destVisited" for any "Node" returned by the function. For example, "NodeSet.getNode( )" can set "0" for the "Origin," because the start location 208 can be neither one of the intermediate stops 210 nor the destination 206. Two "Node" with different value for "destVisted" are considered to be different "Node" even if they represent the same "Graph.Node" and "charge" level." Therefore, "NodeSet.getNode" will create a new "Node" if no existing "Node" in the "Graph" matches all three values for "id," "charge," and "destVisited." The details regarding the "NodeSet.getNode( )" will be discussed later.

The intermediate stop locator module 624 can include a second intermediate stop locator submodule 1104 and is coupled to the first intermediate stop locator submodule 1102. The second intermediate stop locator submodule 1104 identifies whether the condition that the "Origin" was one of the intermediate stopping point was met or not. For example, the second intermediate stop locator submodule 1104 can establish the following condition:

If (Origin.destNumber equals 1)

"destNumber" is defined as a field for the "Node" representing as an identifier to denote that the "Node" is one of the intermediate stops 210 or the destination 206. If the "Node" is not one of the intermediate stops 210 or the destination 206, the value for "destNumber" will be "0."

"destNumber" can be an ordinal identifier. For example, the vehicle can stop by the first intermediate stop 212 and the destination 206 in sequence. For this example, the "destNumber" for the first intermediate stop 212 can be "1" and the "destNumber" for the destination 206 can be "2" to signify that the user will stop by the first intermediate stop 212 prior to reaching the destination 206.

"destNumber" can also be an identifier for the type of the intermediate stops 210 or the destination 206. The type can represent the category of the intermediate stops 210 or the destination 206. For example, one or more "Node" having "destNumber" of "1" as the value can represent an automatic teller machine (ATM). In contrast, one or more "Node" having "destNumber" of "2" as the value can represent a baseball stadium. For example, the first intermediate stop 212 having the "destNumber" of "1" can be an ATM while the destination 206 having the "destNumber" of "2" can be baseball stadium. More specifically, the user can stop by the ATM prior to reaching the baseball stadium.

It's possible for several locations to have the same "destNumber". However, the travel route 216 is expected to include exactly one of the intermediate stops 210 or the destination 206 for each value of "destNumber." This provision is useful when a user has several alternatives for one type of destinations, such as having multiple ATM locations. For example, the first intermediate stop 212 and the second intermediate stop 214 can both be ATMs. Subsequently, the first intermediate stop 212 and the second intermediate stop 214 can both have the "destNumber" of "1."

Here, "If (Origin.destNumber equals 1)" can identify whether the condition that the "Origin" is one of the intermediate stops 210 or the destination 206. For example, if the value for "Origin.destNumber" is "1," the "Origin" can be one of the intermediate stops 210 or the destination 206 having an ATM.

If the condition is met, the intermediate stop locator module 624 can invoke a third intermediate stop locator submodule 1106. In contrast, if the condition is not met, the second replenishment locator submodule 704 can be invoked.

The intermediate stop locator module 624 can include the third intermediate stop locator submodule 1106 and is coupled to the second intermediate stop locator submodule 1104. The third intermediate stop locator submodule 1106 sets the value for "Origin.destVisited" if the "Origin" was the one of the stopping points that the user desired to stop by. For example, the third intermediate stop locator submodule 1106 can include the following function to set the value"

Origin.destVisited=1

For example, "Origin" or the start location 208 can have an ATM. The user desired to stop by an ATM. The user can access the ATM to withdrawal money at the start location 208. Therefore, the third intermediate stop locator submodule 1106 can set the value for "Origin.destVisited" as "1" to indicate that the user stopped by the ATM at the start location 208.

The intermediate stop locator module 624 can include a fourth intermediate stop locator submodule 1108 and is coupled to the third replenishment locator submodule 706. The fourth intermediate stop locator submodule 1108 identifies whether the condition that the current intermediate stop can also represent the next intermediate stop has been met or not. For example, the fourth intermediate stop locator submodule 1108 can include the following function to identify the condition:

If (Node.destNumber equals Node.destVisited+1)

For example, "1" as the value for "destNumber" can represent an ATM and "2" as the value for "destNumber" can represent a baseball stadium. The user can stop by the ATM at the first intermediate stop 212. The value for "destVisited" for the first intermediate stop 212 can be "1," because the user stopped by the ATM. The user can stop by the baseball stadium as the next stopping point. The ATM can be at the baseball stadium. The value for "destVisited" for the first intermediate stop 212 can be "2" now that the user stopped by the baseball stadium. In this scenario, the "destNumber" having the value of "2" can equal the value of "2" for the "destVisited" for the first intermediate stop 212.

If the condition is met, the intermediate stop locator module 624 can invoke a fifth intermediate stop locator submodule 1110. In contrast, if the condition is not met, a sixth intermediate stop locator submodule 1112 can be invoked.

The intermediate stop locator module 624 can include the fifth intermediate stop locator submodule 1110. The fifth intermediate stop locator submodule 1110 sets the correct value for the number of times visited for a particular stopping point if that particular stopping point can represent multiple intermediate stops. For example, the fifth intermediate stop locator submodule 1110 can include the following function to set the value:

Node.destVisited=destNumber

Continuing from the previous example, the first intermediate stop 212 can have the ATM and can be the baseball stadium. The "destNumber" for baseball stadium can have a value of "2." The value for "destVisited" for the first intermediate stop 212 can be "2" to signify that the user not only stopped by at the ATM, but also the baseball stadium.

The intermediate stop locator module 624 can include the sixth intermediate stop locator submodule 1112 and is coupled to the fourth intermediate stop locator submodule 1108. The sixth intermediate stop locator submodule 1112 identifies whether the condition that the user had visited all the desired target destinations had been met or not. For example, the sixth intermediate stop locator submodule 1112 can include the following function to identify the condition:

If (Node.destVisited equals maxDestNumber)

"maxDestNumber" is defined as the total number of target destinations that the user desires to stop by. For example, the "maxDestNumber" can represent "2." The user desires to stop by the first intermediate stop 212 and the destination 206. The value for "destVisited" can be "2" if the user were to stop by the first intermediate stop 212 and the destination 206. Therefore, in this scenario, the condition for "If (Node.destVisited equals maxDestNumber)" can be met. The intermediate stop locator module 624 can invoke the third sufficient replenishment locator submodule 906 to generate the travel route 216 stopping by the first intermediate stop 212 and reaching the destination 206.

The intermediate stop locator module 624 can include a seventh intermediate stop locator submodule 1114 and is coupled to the eighth replenishment locator submodule 716. The seventh intermediate stop locator submodule 1114 identifies the candidate for the next intermediate stop with the same function as described in the sixth sufficient replenishment locator submodule 912 of FIG. 9 with one additional input for "NodeSet.getNode( )."

```
NextNode = NodeSet.getNode(Graph, id, Node.charge −
Links[i].consumed, Node.destVisited)
```

"NodeSet.getNode(Graph, id, Node.charge−Links[i].consumed, Node.destVisited) returns the next "Node" having the "destVisted." For example, "Node" can represent the first intermediate stop 212. The value for the "destVisited" for the first intermediate stop 212 can be "1." "NextNode" can be the destination 206. "NodeSet.getNode( )" can set the value for the "destVisited" for "NextNode" to "2" to account for the previous intermediate stopping point that the user could stop by prior to reaching the destination 206.

It has been discovered that the present invention provides the navigation system 100 for generating the travel route 216 that allows the vehicle to safely reach the intermediate stops 210 prior to reaching the destination 206. The safety of reaching the intermediate stops 210 is provided by ensuring the vehicle to stop by the sufficient number 280 of the replenishment locations 218 for replenishment. The vehicle can traverse along the travel route 216 without the worry of running out of resource, fuel, or the combination thereof from stopping by the intermediate stops 210 prior to ending the travel at the destination 206.

Figure 12:
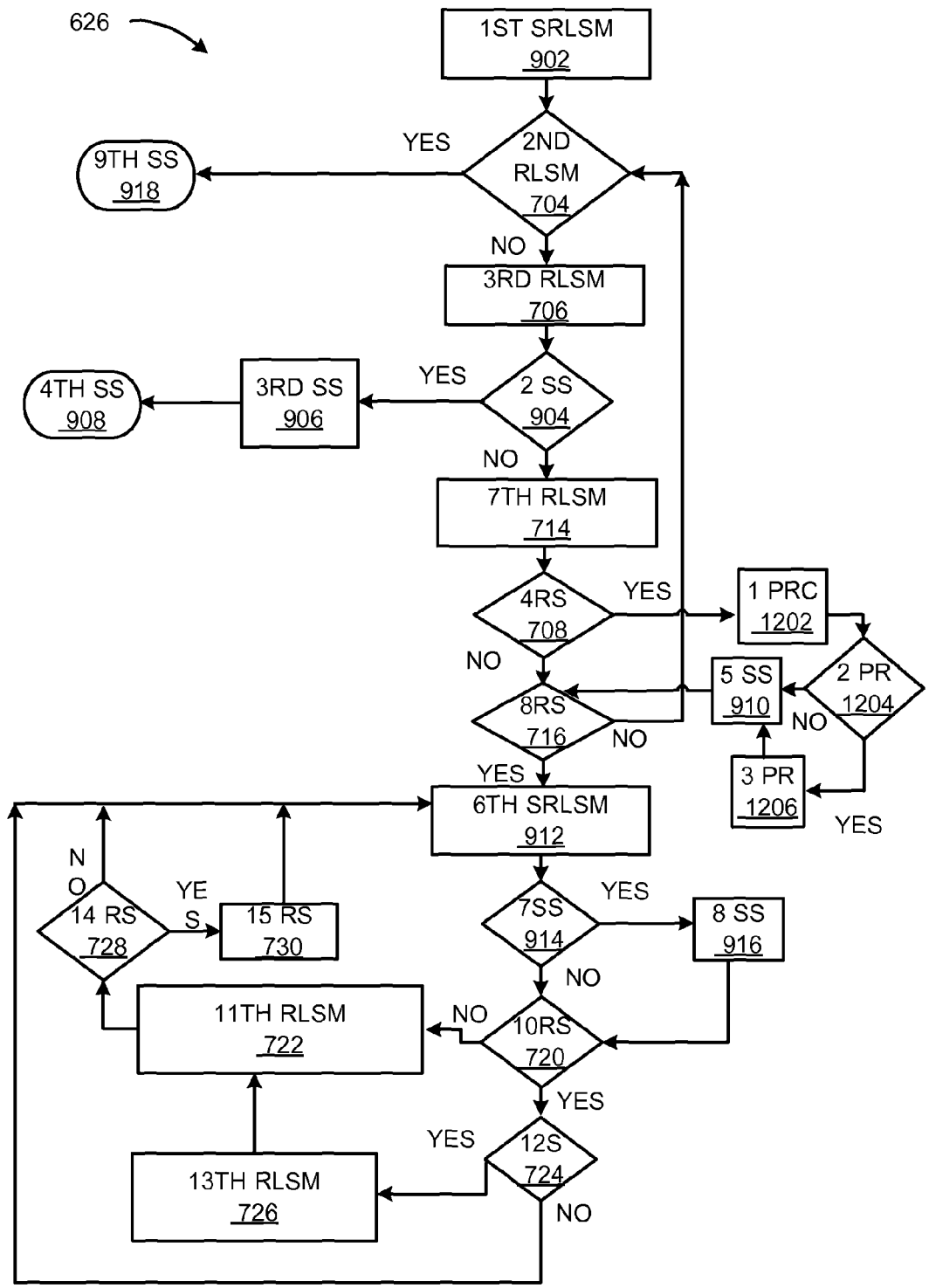
FIG. 12 is a flow of the partial replenishment calculator module.

Referring now to FIG. 12, therein is shown a flow of the partial replenishment calculator module 626. The partial replenishment calculator module 626 generates a path that accounts for when the user replenishes the vehicle partially prior to reaching the target destination.

For example, the partial replenishment calculator module 626 can generate the travel route 216 having only partial replenishment. More specifically, the partial replenishment calculator module 626 can generate the travel route 216 based on the estimated replenishment level 314 of FIG. 3 for ensuring a sufficient replenishment for reaching at least one of the replenishment locations 218. The partial replenishment calculator module 626 can be show in pseudo code format as in the following pseudo code 6:

```
Function Route1Replenishment(Graph, OriginId, initialCharge, minimumSafeCharge)
    PriorityQueue.clear( )
    NodeSet.clear( )
    Origin = NodeSet.getNode(Graph, OriginId, initialCharge)
    Origin.cost = 0
    Origin.previous = NULL   // signifies beginning of route, i.e., there is no previous
    node on the route
    PriorityQueue.insert(Origin) // sets Origin.inQueue = true
    // search nodes in order of cost
    While ( PriorityQueue.isEmpty( ) is false)
        Node = PriorityQueue.top( )
        Node.settled = true // getNode sets settled to false when node is first
        encountered
        If ( Node.id equals DestinationId )
            Reconstruct Route by following linked list starting at Node.previ-
ous
            Return route
        Links = Graph.getLinks(Node.id)
        If ( Node.replenishment is true)
            // add waiting links for recharging different amounts
            costIncrease = costIncrement
            while ( Graph.rechargeAmount(Node.id, costIncrease, Node.charge) <
            fullCharge )
```

```
            Link.nextId = Node.id
            Link.cost = costIncrease // waiting time or monetary cost
            Link.consumed = –
            Graph.rechargeAmount(Node.id,costIncrease,Node.charge) // negative
            value means charge increase
            Links.add(Link) // adds a link to the array of links
            costIncrease = costIncrease + costIncrement )
    // add a waiting link for recharging to full
        Link.nextId = Node.id
        Link.cost = Graph.rechargeCost(Node.id, fullCharge, Node.charge) //
        waiting time or monetary cost
        Link.consumed = Node.charge – fullCharge // a negative value means
        charge is increased
        Links.add(Link) // adds a link to the array of links
    For ( i = 0; i < Links.count( ); i = i+1 )
        id = Links[i].nextId
        NextNode = NodeSet.getNode(Graph, id, Node.charge –
        Links[i].consumed)
        If ( Node.replenishment is true and Node.id equals id )
            NextNode. replenishment = false // second node at replenishment
            location
        If ( NextNode.inQueue is true )
            If ( NextNode.cost > Links[i].cost + Node.cost )
                PriorityQueue.remove(NextNode)
                NextNode.previous = pointer to Node // links nodes on
                route back to origin
                NextNode.cost = Links[i].cost + Node.cost
                If (NextNode.charge > minimumSafeCharge)
                    PriorityQueue.insert(NextNode) // sets
                    NextNode.inQueue = true
        Else if ( NextNode.settled is false )
            NextNode.previous = pointer to Node // links nodes on route
            back to origin
            NextNode.cost = Links[i].cost + Node.cost
            If (NextNode.charge > minimumSafeCharge)
                PriorityQueue.insert(NextNode)
// no feasible route exists to destination with the given amount of charge and charge
capacity
Return error
```

Table 5 maps between the pseudo code and the specification elements:

| Pseudo Code Parameters | Specification Elements |
|---|---|
| costIncrease | The first replenishment time 430 of FIG. 4; |
| | The second replenishment time 432 of FIG. 4; |
| | The third replenishment time 434 of FIG. 4; or |
| | The fourth replenishment time 436 of FIG. 4. |
| rechargeAmount(Node.id, costIncrease, Node.charge) < fullCharge) | The first partial replenishment level 418 of FIG. 4; |
| | The second partial replenishment level 420 of FIG. 4; |
| | The third partial replenishment level 422 of FIG. 4; or |
| | The maximum replenishment level 424 of FIG. 4. |

The partial replenishment calculator module 626 can include the second replenishment locator submodule 704, the third replenishment locator submodule 706, the fourth replenishment locator submodule 708, and the seventh replenishment locator submodule 714 with each having the same function, establishing the same condition, or the combination thereof as described in FIG. 7. The partial replenishment calculator module 626 can include the eighth replenishment locator submodule 716, the tenth replenishment locator submodule 720, the eleventh replenishment locator submodule 722, and the twelfth replenishment locator submodule 724 with each having the same function, establishing the same condition, or the combination thereof as described in FIG. 7. The partial replenishment calculator module 626 can include the thirteenth replenishment locator submodule 726, the fourteenth replenishment locator submodule 728, and the fifteenth replenishment locator submodule 730 with each having the same function, establishing the same condition, or the combination thereof as described in FIG. 7.

The partial replenishment calculator module 626 can include the first sufficient replenishment locator submodule 902, the second sufficient replenishment locator submodule 904, the third sufficient replenishment locator submodule 906, the fourth sufficient replenishment locator submodule 908, and the fifth sufficient replenishment locator submodule 910 with each having the same function, establishing the same condition, or the combination thereof as described in FIG. 9. The partial replenishment calculator module 626 can include the sixth sufficient replenishment locator submodule 912, the seventh sufficient replenishment locator submodule 914, the eighth sufficient replenishment locator submodule 916, and the ninth sufficient replenishment locator submodule 918 with each having the same function, establishing the same condition, or the combination thereof as described in FIG. 9.

The partial replenishment calculator module 626 can include a first partial replenishment calculator submodule 1202 and is coupled to the fourth replenishment locator submodule 708. The first partial replenishment calculator submodule 1202 sets the incremental value of the time, money, or the combination thereof the user can spend for replenishing the vehicle at each replenishment opportunity.

For example, the first partial replenishment calculator submodule 1202 can calculate the estimated replenishment time 354, the estimated replenishment cost 372, and the combination thereof for each of the replenishment timeline 426 of FIG. 4. For a more specific example, the first partial replenishment calculator submodule 1202 can calculate the estimated replenishment time 354, the estimated replenishment cost 372, and the combination thereof for the first replenishment time 430. The first partial replenishment calculator submodule 1202 can include the following function to set the incremental value:

costIncrease=costIncrement

"costIncrement" is defined as the increments of value for time, money, or the combination thereof the user can spend. For example, the "costIncrement" can be 30 minutes. 120 minutes can represent the amount of time required to fully replenish the vehicle. More specifically, accumulating four of the "costIncrement" or "4 30 minutes=120 minutes" can equal to amount of time required for full replenishment.

"costIncrease" is defined as the time cost, the monetary cost, or the combination thereof the user can incur for that "costIncrement." For example, the "costIncrement" can represent 30 minutes. The "costIncrease" can represent the first replenishment time 430. "costIncrease=costIncrement" can set the "30 minutes" for the first replenishment time 430.

The partial replenishment calculator module 626 can include a second partial replenishment calculator submodule 1204 and is coupled to the first partial replenishment calculator submodule 1202. The second partial replenishment calculator submodule 1204 establishes a condition that replenishment of the vehicle is a partial replenishment and not a full replenishment. For example, the second partial replenishment calculator submodule 1204 can include the following function to establish the condition:

While (Graph.rechargeAmount(Node.id, costIncrease, Node.charge)<fullCharge)

"Graph.rechargeAmount(Node.id, costIncrease, Node.charge)" is defined as a function that returns the amount of "charge" increase achieved at the given "cost" starting at the "initialCharge" at the one of the replenishment locations 218. "charge," "cost," and "initalCharge" are as discussed in FIG. 7. For a further example, the returned amount of "charge" by "Graph.rechargeAmount( )" at the first replenishment location 232 for the duration of the first replenishment time 430 can be the first partial replenishment level 418.

While "Graph.rechargeAmount( )" returns an amount of "charge" less than "fullCharge," the partial replenishment calculator module 626 can invoke a third partial replenishment calculator submodule 1206. "fullCharge" is as described in FIG. 9.

The partial replenishment calculator module 626 can include the third partial replenishment calculator submodule 1206 and is coupled to the second partial replenishment calculator submodule 1204. The third partial replenishment calculator submodule 1206 calculates the partial replenishment of resource, fuel, or the combination thereof. For example, the third partial replenishment calculator submodule 1206 can calculate the estimated replenishment level 314 for each of the replenishment locations 218.

The third partial replenishment calculator submodule 1206 can include the following functions to for calculating the partial replenishment:

Link.nextId = Node.id
Link.cost = costIncrease

Link.consumed = −Graph.rechargeAmount(Node.id, costIncrease, Node.charge)
Links.add(Link)
costIncrease = costIncrease + costIncrement "Link.nextId=Node.id," "Link.cost," "Link.consumed," and "Links.add(Link)" are as described in FIG. 9. For partial replenishment, "Link.cost" can be set by the "costIncrease" to signify partial replenishment. From the previous example, the "costIncrease" can represent the first replenishment time 430 or 30 minutes. By setting "Link.cost" equal to "costIncrease," the time cost the user can incur for replenishing the vehicle can be 30 minutes.

As described earlier, "Graph.rechargeAmount( )" can return the amount for partial replenishment for the "charge." For example, if the replenishment is for the duration of the first replenishment time 430 of 30 minutes, "Link.consumed" can be the amount of the first partial replenishment level 418.

As described earlier, the second partial replenishment calculator submodule 1204 establishes the condition for the partial replenishment calculator module 626 to continue invoking the third partial replenishment calculator submodule 1206. Furthermore, the partial replenishment calculator module 626 can continue invoking the third partial replenishment calculator submodule 1206 until the partial replenishment becomes a full replenishment.

For example, "costIncrease=costIncrease+costIncrement" sets the value of the "costIncrease" to increase by the value of the "costIncrement" linearly. Continuing from the previous example, "costIncrease" can be 30 minutes. "costIncrease=costIncrease+costIncrement" can equal 60 minutes. The partial replenishment calculator module 626 can continue invoking the third partial replenishment calculator submodule 1206 until "Graph.rechargeAmount(Node.id, costIncrease, Node.charge)" or the amount of partial replenishment the "charge" is less than "fullCharge" even after incrementing the "costIncrease."

For a specific example, "costIncrease" representing 90 minutes for the input for "Graph.rechargeAmount( )" can generate a return for partial replenishment for "charge" that exceeds the "fullCharge." In this scenario, since the "costIncrement" is 30 minutes, the "Link.cost" for partially replenishment for "charge" that is less than the "fullCharge" can be 60 minutes. Furthermore, "Graph.rechargeAmount( )" can return a partial replenishment for the "charge" that was replenished for 60 minutes.

It has been discovered that the present invention provides the navigation system 100 for generating the travel route 216 that allows the vehicle to safely reach the replenishment locations 218, the intermediate stops 210 and the destination 206 with a partial replenishment of resource, fuel, or the combination thereof for the vehicle at the replenishment locations 218. By permitting the partial replenishment, the vehicle can reduce the estimated replenishment time 354 for replenishing the vehicle at the replenishment locations 218. Furthermore, the navigation system 100 can generate the travel route 216 that can ensure the vehicle to have sufficient replenishment of resource, fuel, or the combination thereof for reaching the destination 206 even if the vehicle is not fully replenished.

Figure 13:
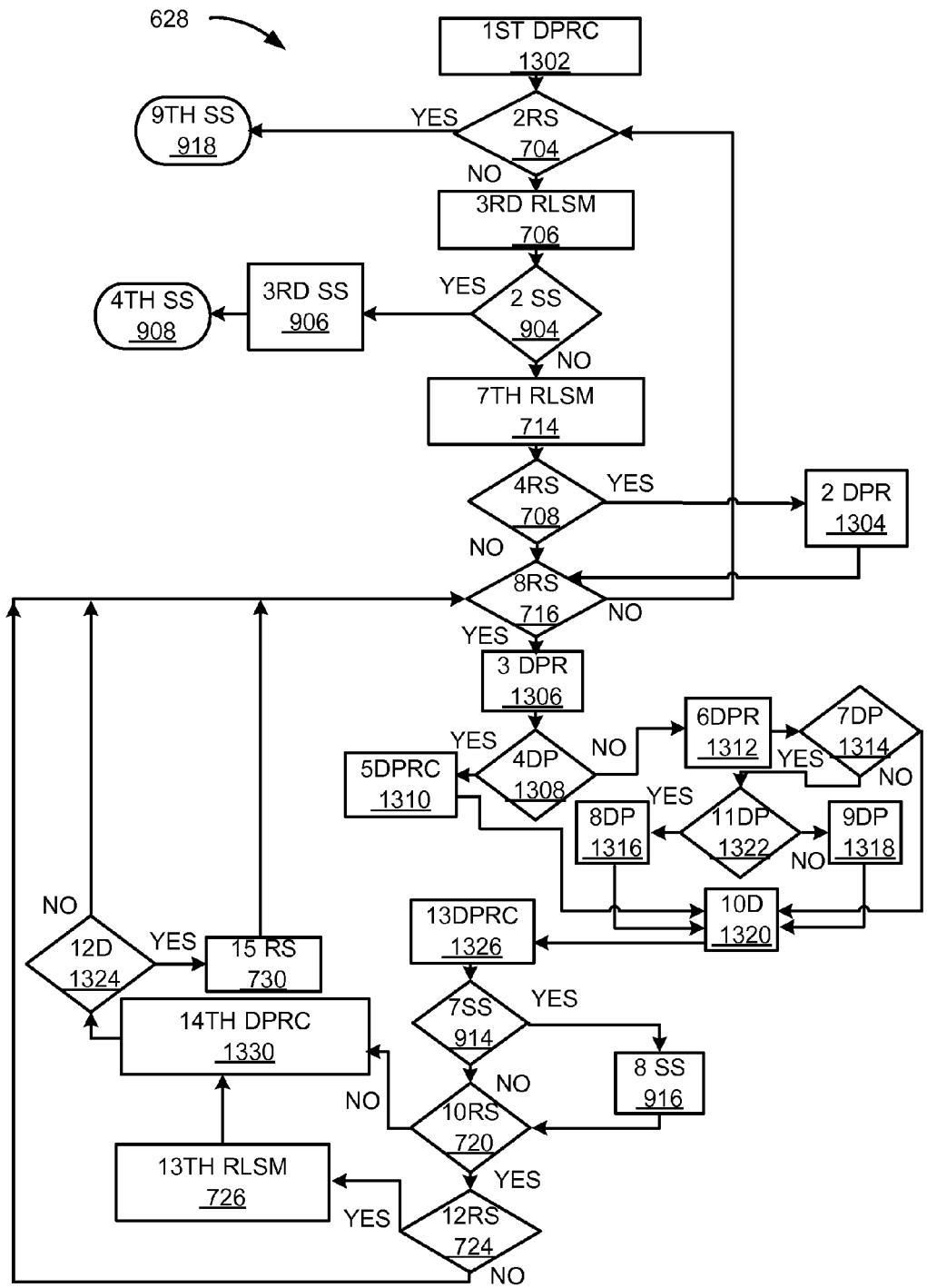
FIG. 13 is a flow of the dynamic partial replenishment calculator module.

Referring now to FIG. 13, therein is shown a flow of the dynamic partial replenishment calculator module 628. The dynamic partial replenishment calculator module 628 generates a path that accounts for when the user replenishes the vehicle based on as needed basis prior to reaching the target destination. Furthermore, the dynamic partial replenishment calculator module 628 can generate path that accounts for heterogeneity of replenishment. More specifically, heterogeneity of replenishment can have different "costs" per unit of "charge" at different locations.

For example, the "cost" replenishment per unit of "charge" at a battery changing station for the transportation type 346 of FIG. 3 representing an electric vehicle can be zero after paying a fixed "cost". Additionally, the "cost" for "initialCharge" can also be zero, because the "cost" can already be absorbed when the computation occurs. The details regarding the fixed cost and the "cost" for "initialCharge" will be discussed later. "charge," "cost," and "initialCharge" are as described in FIG. 7.

The dynamic partial replenishment calculator module 628 can account for multiple kinds of "cost" for replenishing the vehicle. For example, multiple kinds of "cost" can include a fixed cost, linear cost, and a non-linear cost.

A fixed cost is defined as a "cost" that is fixed regardless of the amount of "charge" increase. For example, swapping a battery for a full battery at a battery changing station, a fixed cost source, can represent an example for fixed cost, because the swapping of a battery requires a fixed amount of time. Additionally, "initialCharge" is considered a fixed cost, because the "initialCharge" in the vehicle has already been paid for. Therefore, unlike linear cost or non-linear cost, where the "cost" can increase based on, for example, the amount of the estimated replenishment level 314, the fixed cost do not change.

In contrast, linear cost can increase proportionally to the amount of the "charge" increase. For example, linear cost can increase based on the value of "costIncrement" as discussed in FIG. 12. Furthermore, the calculation of linear cost can increase incrementally regardless of the "initialCharge." The reasons will be discussed later.

The pseudo code 7 below assumes that each of the replenishment locations 218 will have the same calculation for the linear cost. For example, "costIncrement" for each of the replenishment locations 218 can be 30 minute increments.

For further contrast, non-linear cost can increase non-proportionally to the amount of the "charge" increase. Furthermore, the calculation for the non-linear cost can depend on the "initialCharge" for the following reasons. For example, if the "cost" of replenishing is a monotonically increasing function of the "charge" level, then it can be approximated by a number of linear cost functions each represented as a different charging type. For a further example, if a battery has 10% of fully capacity as the "initialCharge," 50% of full capacity can be charged in 60 minutes. However, a battery can require six more hours to become 90% of full capacity. The difference between the two "cost" for charging the first 40% as oppose to the next 40% for the same battery can represent an example of a non-linear cost increase.

Continuing with the example, the dynamic partial replenishment calculator module 628 can calculate the non-linear cost by approximating as multiple linear "charge" rates. For example, the "charge" rate for the first 40% can be calculated to be 1.5 minute per 1% "charge" while the second 40% can be calculated to be 9 minute per 1%. The details regarding the dynamic partial replenishment calculator module 628 for calculating the fixed cost, linear cost, and non-linear cost will be discussed later.

For example, the dynamic partial replenishment calculator module 628 can generate the travel route 216 based on the availability 282 of FIG. 2 for ensuring a sufficient replenishment for reaching at least one of the replenishment locations 218. For another example, the dynamic partial replenishment calculator module 628 can generate the travel route 216 based on the feasibility 374 of FIG. 3 for ensuring a vehicle for reaching at least one of the replenishment locations 218.

For further example, the dynamic partial replenishment calculator module 628 can select the cost model 338 of FIG. 3 based on the feasibility 374 for ensuring a vehicle for reaching at least one of the replenishment locations 218. The dynamic partial replenishment calculator module 628 can be show in pseudo code format as in the following pseudo code 7:

```
PriorityQueue.clear( )
NodeSet.clear( )
Conversion[0] = 0
Conversion[1] = costConversion
available[0] = initialCharge
available[1] = 0
Origin = NodeSet.getNode(Graph, OriginId, available)
Origin.cost = 0
Origin.previous = NULL // signifies beginning of route, i.e., there is no previous
node on the route
PriorityQueue.insert(Origin) // sets Origin.inQueue = true
// search nodes in order of cost
While ( PriorityQueue.isEmpty( ) is false)
        Node = PriorityQueue.top( )
        Node.settled = true // getNode sets settled to false when node is first
        encountered
        If ( Node.id equals DestinationId )
                Reconstruct Route by following linked list starting at Node.previous
                Return route
        Links = Graph.getLinks(Node.id)
        If ( Node.replenishment is true)
            // add a waiting link for recharging
            Link.nextId = Node.id
            Link.cost = Graph.rechargeCost(Node.id) // only the fixed costs not
            dependent on the amount of charging
            Link.consumed = 0 // no charge added or subtracted until it is needed
            Links.add(Link) // adds a link to the array of links
        For ( i = 0; i < Links.count( ); i = i+1 )
            cost = Links[i].cost + Node.cost
            If ( Node.replenishment is true and Node.id equals id )
                // restore available charge for this type of replenishment location
                available[0] = Node.available[0]
```

-continued

```
            available[1] = Node.available[1]
            j = Graph.rechargeType(id)
            available[j] = fullCharge
        Else
            // add costs of additional charging needed
            // and compute remaining available charge
            needed = Links[i].consumed;
            available[0] = Node.available[0]
            available[1] = Node.available[1]
            For ( j = 0; j < 2; j = j+1 )
                If ( needed < available[j] )
                    cost = cost + Conversion[j] × needed
                    available[j] = available[j] – needed;
                    needed = 0
                else
                    cost = cost + Conversion[j] × available[j]
                    available[j] = 0
                    needed = needed – available[j])
        totalAvailable = available[0] + available[1]
        id = Links[i].nextId
        NextNode = NodeSet.getNode(Graph, id, available)
        If ( Node.replenishment is true and Node.id equals id )
            NextNode. replenishment = false // second node at replenishment
            location
        If ( NextNode.inQueue is true )
            If ( NextNode.cost > cost )
                PriorityQueue.remove(NextNode)
                NextNode.previous = pointer to Node // links nodes on
                route back to origin
                NextNode.cost = cost
                If (totalAvailable > minimumSafeCharge)
                    PriorityQueue.insert(NextNode) // sets
                    NextNode.inQueue = true
        Else if ( NextNode.settled is false )
            NextNode.previous = pointer to Node // links nodes on route
            back to origin
            NextNode.cost = cost
            If (totalAvailable > minimumSafeCharge)
                PriorityQueue.insert(NextNode)
// no feasible route exists to destination with the given amount of charge and charge
capacity
Return error
```

Table 6 maps between the pseudo code and the specification elements:

| Pseudo Code Parameters | Specification Elements |
| --- | --- |
| available[0] | The estimated replenishment level 314 of the start location 208 for fixed cost resource, fuel, or the combination thereof; For example, swapping battery for an electric vehicle is a fixed cost, because the amount of time to swap a battery is fixed amount of time. |
| available[1] | The estimated replenishment level 314 of the start location 208 for non-fixed cost resource, fuel, or the combination thereof; For example, replenishing the battery for an electric car is not fixed cost, because the amount of time to replenish depends on the amount of fuel left in the battery. |
| Graph.rechargeCost(id) | The estimated replenishment time 354, the estimated replenishment cost 372 for fixed cost resource, fuel, or the combination thereof. |
| Graph.rechargeType(id) | The availability 282 of the replenishment type 344 at the replenishment locations 218 |
| needed = Link.consumed | resource consumed = the estimated resource level 310 – full resource; or fuel consumed = the estimated fuel level 312 – full fuel |

The dynamic partial replenishment calculator module 628 can include the second replenishment locator submodule 704, the third replenishment locator submodule 706, the fourth replenishment locator submodule 708, and the seventh replenishment locator submodule 714 with each having the same function, establishing the same condition, or the combination thereof as described in FIG. 7. The dynamic partial replenishment calculator module 628 can include the eighth replenishment locator submodule 716, the tenth replenishment locator submodule 720, the twelfth replenishment locator submodule 724, the thirteenth replenishment locator submodule 726, and the fifteenth replenishment locator submodule 730 with each having the same function, establishing the same condition, or the combination thereof as described in FIG. 7.

The dynamic partial replenishment calculator module 628 can include the second sufficient replenishment locator submodule 904, the third sufficient replenishment locator submodule 906, and the fourth sufficient replenishment locator submodule 908 with each having the same function, establishing the same condition, or the combination thereof as described in FIG. 9. The dynamic partial replenishment calculator module 628 can include the seventh sufficient replenishment locator submodule 914, the eighth sufficient replenishment locator submodule 916, and the ninth sufficient replenishment locator submodule 918 with each having the same function, establishing the same condition, or the combination thereof as described in FIG. 9.

The dynamic partial replenishment calculator module 628 can include a first dynamic partial replenishment calculator submodule 1302. The dynamic partial replenishment calculator module 628 can include the following same functions as described in FIG. 7 to initialize the data structure used in the pseudo code with additional functions and a modification:

```
PriorityQueue.clear( )
NodeSet.clear( )
Conversion[0] = 0
Conversion[1] = costConversion
available[0] = initialCharge
available[1] = 0
Origin = NodeSet.getNode(Graph, OriginId, available)
Origin.cost = 0
Origin.previous = NULL
PriorityQueue.insert(Origin)
```

"costConversion" is defined as the amount of "cost" per unit of "charge" for each of the replenishment locations 218 except for the replenishment locations 218 that can only provide replenishment that can only be calculated by fixed cost. For further definition, "costConversion" applies to a linear cost, non-linear cost, and not fixed cost.

For example, the first replenishment location 232 of FIG. 2 can be a battery changing station only. To replenish the vehicle, the user will only incur fixed cost related to the swapping of a battery and not for the amount of "cost" per unit of "charge." In contrast, the third replenishment location 228 can provide replenishment for the vehicle other than by swapping batteries. For a specific example, the "costConversion" at the third replenishment location 228 can be represented as the first replenishment time 430 of FIG. 4 per the first partial replenishment level 418 of FIG. 4.

"Conversion" is defined as a data structure representing an array that represents multiple kinds of "costConversion" that the dynamic partial replenishment calculator module 628 can factor in for replenishing the vehicle at each of the replenishment locations 218. For example, "Conversion[0]" can represent the "costConversion" for the fixed cost, and "Conversion[1]" can represent "costConversion" for the linear cost.

For further example, "Conversion" can be expanded to add other kinds of "costConversion." For a specific example, "Conversion[2]" can represent "costConversion" for another linear cost. The combination of "Conversion[1]" and "Conversion[2]" can represent the non-linear cost as discussed earlier. For example, "Conversion[1]" can represent 1.5 minute per 1% and "Conversion[2]" can represent 9 minute per 1%. For a more specific example, replenishing 1% of full fuel capacity can take the estimated replenishment time 354 of 1.5 minutes. "Graph" can contain the information for each of the replenishment locations 218 for each of the "Conversion."

"available" is defined as a data structure representing an array that represents the "charge" status that the vehicle can obtain from replenishment at a previous replenishment opportunity. For example, "available" can represent the estimated resource level 310 of FIG. 3, the estimated fuel level 312 of FIG. 3, or the combination thereof at the first replenishment location 232.

"available" can represent the estimated resource level 310 of FIG. 3, the estimated fuel level 312 of FIG. 3, or the combination thereof for multiple kinds of the replenishment type 344 of FIG. 3 for the transportation type 346 of FIG. 3. For example, the replenishment type 344 can include an electric charge, hydrogen fuel cell refueling, gasoline refueling, or the combination thereof.

For a specific example, "available[0]" can represent the "charge" status after replenishing the vehicle from a fixed cost source. An example of fixed cost source can include the swapping of the battery as described earlier. For pseudo code 7, "available[0]" can be set to "initialCharge" to represent that the "charge" had already been paid for and the dynamic partial replenishment calculator module 628 need not to consider the incremental "cost" derived from that "initialCharge."

For another example, "available[1]" can represent the "charge" status for the replenishment type 344 representing an electric charge. For further example, "available[ ]" can be expanded to accommodate other kinds of the replenishment type 344. For a specific example, "available[2]" can represent the "charge" status for the replenishment type 344 representing a gasoline. If the transportation type 346 can be a plug-in hybrid vehicle, the transportation type 346 can be replenished by both an electric charge and gasoline fuel. In this case, "available[1]" can represent the "charge" status for the electric charge and "available[2]" can represent the "charge" status for the gasoline for the transportation type 346 representing a plug-in hybrid vehicle.

"NodeSet.getNode( )" as described in FIG. 7 for returning the "Node" representing the "Origin" can also return the "Node" having the information for the availability 282 of FIG. 2 of the replenishment type 344 with the additional input of "available." For example, "available" can include "available[0]," "available[1]," and "available[2]." "NodeSet.getNode( )" can return the "Origin" or the start location 208 having the availability 282 for the replenishment type 344 for swapping batteries, electric charge, and gasoline refueling opportunity.

The dynamic partial replenishment calculator module 628 can include a second dynamic partial replenishment calculator submodule 1304 and is coupled to the fourth replenishment locator submodule 708. The second dynamic partial replenishment calculator submodule 1304 calculates the "cost" representing the time cost, monetary cost, or the combination thereof for replenishing the vehicle from a fixed cost source. For example, the second dynamic partial replenishment calculator submodule 1304 can calculate the estimated replenishment time 354 of FIG. 3, the estimated replenishment cost 372, or the combination thereof for the replenishment type 344 representing a battery swap. The second dynamic partial replenishment calculator submodule 1304 can include the same functions as the fifth sufficient replenishment locator submodule 910 with the following modification to calculate the "cost" for replenishing the vehicle from a fixed cost source:

```
Link.cost = Graph.rechargeCost(Node.id)
Link.consumed = 0
```

"Graph.rechargeCost(Node.id)" receives the "Node.id" as an input for returning the "cost" for that particular "Node." More specifically, "Graph.rechargeCost(Node.id)" returns the fixed cost for replenishing the vehicle. "Link.cost" is as described in FIG. 9. For example, "Graph.rechargeCost(Node.id)" can return the estimated replenishment time 354 of 6 minutes for swapping the battery of an electric car. Therefore, "Link.cost" can be set to 6 minutes.

Since the second dynamic partial replenishment calculator submodule 1304 calculates the "cost" for replenishing from a fixed cost source, "Link.consumed" can be set to "0." "Link.consumed" is as described in FIG. 9.

The dynamic partial replenishment calculator module 628 can include a third dynamic partial replenishment calculator submodule 1306 and is coupled to the eighth replenishment locator submodule 716. The third dynamic partial replenishment calculator submodule 1306 calculates the "cost" that a vehicle can require for reaching the next stopping point. For example, the current stopping point can be the first replenishment location 232 of FIG. 2. The next stopping point can be the third replenishment location 228. The third dynamic partial replenishment calculator submodule 1306 can include the following functions to calculate the "cost":

```
id = Links[i].nextId
cost = Links[i].cost + Node.cost
```

"id=Links[i].nextId" is as described in FIG. 7. "cost=Links[i].cost+Node.cost" is as described for calculating the "NextNode.cost=Links[i].cost+Node.cost" for the eleventh replenishment locator submodule 722. For example, "cost" can represent the aggregation of the estimated travel time 352, the estimated financial cost, or the combination thereof for the first travel section 220 of FIG. 2, the second travel section 222 of FIG. 2, and the third travel section 224 of FIG. 2.

The dynamic partial replenishment calculator module 628 can include a fourth dynamic partial replenishment calculator submodule 1308 and is coupled to the third dynamic partial replenishment calculator submodule 1306. The fourth dynamic partial replenishment calculator submodule 1308 identifies whether the condition that a "Node" is one of the replenishment locations 218 and that "Node" can be the same "Node" representing the following stopping point. For example, the fourth dynamic partial replenishment calculator submodule 1308 can include the following functions to establish the condition:

```
If ( Node.replenishment is true and Node.id equals id )
Else
```

If the condition is met, the dynamic partial replenishment calculator module 628 can invoke a fifth dynamic partial replenishment calculator submodule 1310. If the condition is not met, the dynamic partial replenishment calculator module 628 can invoke a sixth dynamic partial replenishment calculator submodule 1312.

The dynamic partial replenishment calculator module 628 can include the fifth dynamic partial replenishment calculator submodule 1310. The fifth dynamic partial replenishment calculator submodule 1310 identifies the replenishment type 344 available at the replenishment locations 218 for replenishing the vehicle to full capacity. For example, the fifth dynamic partial replenishment calculator submodule 1310 can identify the availability 282 of the replenishment type 344 for each of the replenishment locations 218. The fifth dynamic partial replenishment calculator submodule 1310 can identify the replenishment type 344 with the following functions:

```
available[0] = Node.available[0]
available[1] = Node.available[1]
j = Graph.rechargeType(id)
available[j] = fullCharge
```

"available[0]" and "available[1]" is as discussed earlier. "Node.available[0]" is defined as the vehicle's amount of available "charge" remaining from reaching the previous "Node" representing a fixed cost source. For example, the next "Node" can represent the third replenishment location 228. The "Node" can represent the first replenishment location 232. "Node.available[0]" can represent the estimated fuel level 312 for the replenishment type 344 representing a battery swapping at the first replenishment location 232, a battery changing station.

"Node.available[0]" is defined as the vehicle's amount of available "charge" remaining from reaching the previous "Node" representing a non-fixed cost source. For example, "Node.available[1]" can represent the estimated fuel level 312 for the replenishment type 344 representing an electric charge when reaching the first replenishment location 232, an electric plug-in station as well.

"Graph.rechargeType(id)" is defined as a function that returns a value that signifies the type of replenishment available for replenishment opportunity. For example, "Graph.rechargeType(id)" can return the value that signifies the availability 282 of the replenishment type 344 at each of the replenishment locations 218. For further example, the value can be "0" for where the availability 282 for the replenishment locations 218 can be limited to replenishment from fixed cost sources. In contrast, the value can be "1" for where the availability 282 for the replenishment locations 218 can be not limited to just replenishment from fixed cost sources.

"available[j]=fullCharge" sets the particular type of the replenishment type 344 to "fullCharge." For example, the return value for "Graph.rechargeType(id)" can be "0." "available[j]=fullCharge" can signify the swapping of the battery for a brand new battery that is fully charged. For another example, if the return value for "Graph.rechargeType(id)" can be "1," "available[j]=fullCharge" can signify the full replenishment of the electric charge for the electric vehicle.

The dynamic partial replenishment calculator module 628 can include the sixth dynamic partial replenishment calculator submodule 1312. The sixth dynamic partial replenishment calculator submodule 1312 calculates the amount of partial replenishment required by the vehicle. For example, the sixth dynamic partial replenishment calculator submodule 1312 can calculate the estimated replenishment level 314 based on the estimated consumption level 316 for ensuring a sufficient replenishment for reaching at least one of the replenishment locations 218. The sixth dynamic partial replenishment calculator submodule 1312 can include the following functions to calculate the amount of partial replenishment:

```
needed = Links[i].consumed;
available[0] = Node.available[0]
available[1] = Node.available[1]
```

"Links[i].consumed" is as described in FIG. 7. "needed" is defined as the estimated amount of partial replenishment required by the vehicle. More specifically, "needed" can equal to the amount of "Links[i].consumed." For example, "Links[i].consumed" for traveling the third travel section 224 can be 62.5% of the full capacity of the fuel. "needed" can also be 62.5%. "available[0]=Node.available[0]" and "available[1]=Node.available[1]" are as discussed earlier.

The dynamic partial replenishment calculator module 628 can include a seventh dynamic partial replenishment calculator submodule 1314 and is coupled to the sixth dynamic partial replenishment calculator submodule 1312. The seventh dynamic partial replenishment calculator submodule 1314 establishes a condition for the dynamic partial replenishment calculator module 628 to calculate for the "cost" for as needed basis for each of the replenishment type 344. For example, the seventh dynamic partial replenishment calculator submodule 1314 can include the following function to establish the condition:

For (j=0; j<2; j=j+1)

"j" represents the position within the array representing the "available." For example, the first position of the array is signified as "0." "j=0" signifies that "j" is positioned at the first position of the array. For this example, "j=0" signifies that "j" is positioned at the first position of the "available." "j++" represents a function to move the position of "j" to the next position along the array. For example, "available" can have the replenishment type 344 representing battery swap and an electric charge. For a more specific example, "j=0" can have the battery swap for the first position of the "available." "j++" can move "j" to "j=1." "j=1" can represent the electric charge for the second position of the "available."

"j<2" establish the condition for the dynamic partial replenishment calculator module 628 to calculate for the "cost." For this example, the pseudo code 7 assumes that there are two types of "cost" as signified by the "2." Under this condition, the dynamic partial replenishment calculator module 628 can move the position of the array up to "available [1]." If there are more than two types of the replenishment type 344, "j<2" can be changed to, for example, "j<3" to signify at least three types of the replenishment type 344 for the dynamic partial replenishment calculator module 628 to calculate the "cost."

The dynamic partial replenishment calculator module 628 can include an eleventh dynamic partial replenishment calculator submodule 1322 and is coupled to the seventh dynamic partial replenishment calculator submodule 1314. The eleventh dynamic partial replenishment calculator submodule 1322 identifies whether the condition that the estimated amount of partial replenishment required by the vehicle is less than the "charge" status of the vehicle after replenishing at a previous replenishment opportunity. For example, the eleventh dynamic partial replenishment calculator submodule 1322 can include the following function to identify the condition:

---
If ( needed < available[j])
Else
---

"needed" and "available[j]" are as described previously. For example, the estimated fuel level 312 arriving at the first replenishment location 232 can be 75% of the full fuel capacity. The amount for the "needed" after traveling the third travel section 224 for reaching the third replenishment location 228 can be 60%. In this scenario, the condition for "If (needed<available[j])" can be met.

If the condition that "needed" is less than "available[j]" is met, the dynamic partial replenishment calculator module 628 can invoke an eighth dynamic partial replenishment calculator submodule 1316. If the condition "needed" is less than "available[j]" is not met, the dynamic partial replenishment calculator module 628 can invoke a ninth dynamic partial replenishment calculator submodule 1318.

The dynamic partial replenishment calculator module 628 can include the eighth dynamic partial replenishment calculator submodule 1316 and is coupled to the eleventh dynamic partial replenishment calculator submodule 1322. The eighth dynamic partial replenishment calculator submodule 1316 calculates the "cost" for partially replenishing each of the replenishment type 344 when the amount of that particular type of the replenishment type 344 is more than the amount consumed by the vehicle for traveling the path. For example, "available[1]" can represent the estimated amount of an electric charge when replenished at the first replenishment location 232. "available[1]" can be 100% after replenishing at the first replenishment location 232 and the "needed" can be 62.5% after traveling the third travel section 224.

The eighth dynamic partial replenishment calculator submodule 1316 also updates the "available" for each of the replenishment type 344 for the vehicle after accounting the "charge" the vehicle can consume for traveling the path. The eighth dynamic partial replenishment calculator submodule 1316 can calculate the estimated replenishment time 354, the estimated replenishment cost 372, or the combination thereof for replenishment type 344 at each of the replenishment locations 218.

The eighth dynamic partial replenishment calculator submodule 1316 can include the following function to calculate the "cost" and update the "available."

---
cost = cost + Conversion[j] × needed
available[j] = available[j] − needed;
needed = 0
---

The eighth dynamic partial replenishment calculator submodule 1316 can execute "cost+Conversion[i]×needed" to calculate the "cost." The "cost" for "cost+Conversion[i]×needed" represents the "cost" from "cost=Link[i].cost+Node.cost" calculated by the third dynamic partial replenishment calculator submodule 1306. "Conversion[i]×needed" represents the "cost" replenishing the amount for "needed." For example, "Conversion[1]" can represent the linear cost represented by "costConversion." More specifically, "Conversion[1]" or "costConversion" can represent 1.5 minute per 1%. If the "needed" represents 62.5%, the "cost" for the "needed" based on "Conversion[i]×needed" can be 93.75 minutes. If "Link[i].cost+Node.cost" can be 45 minutes, "cost+Conversion[i]×needed" can be 138.75 minutes.

For example, 138.75 minutes can represent the estimated travel time 352 of FIG. 3. For a more specific example, the estimated travel time 352 can represent the "cost" for traveling along the first travel section 220 of FIG. 2 and the second travel section 222 of FIG. 2 to reach the first replenishment location 232. The estimated travel time 352 can also include the estimated replenishment time 354 for replenishing the fuel consumed for traveling the first travel section 220 and the second travel section 222.

The eighth dynamic partial replenishment calculator submodule 1316 can calculate the estimated replenishment level 314 for the replenishment type 344 at each of the replenishment locations 218. The eighth dynamic partial replenishment calculator submodule 1316 can execute "available [j]=available[j]−needed" to update the amount of "charge" for each of the replenishment type 344 remaining after traveling the path. For example, "available[1]" can represent the battery capacity after replenishing from an electric charge at the first replenishment location 232. "available[1]" can represent 100%. After traveling along the third travel section 224 to reach the third replenishment location 228, "needed" can represent 62.5%. The updated amount of battery after recharging at the first replenishment location 232 after traveling the third travel section 224 can be "available[1]−needed" or 37.5%. "needed" is set to "0" to reinitialize the "needed."

The dynamic partial replenishment calculator module 628 can include the ninth dynamic partial replenishment calculator submodule 1318 and is coupled to the eleventh dynamic partial replenishment calculator submodule 1322. The ninth dynamic partial replenishment calculator submodule 1318 calculates the "cost" for partially replenishing each of the replenishment type 344 when the amount of that particular type of the replenishment type 344 is less than the amount consumed by the vehicle for traveling the path. For example, "available[2]" can represent the estimated amount when gasoline is replenished at the first replenishment location 232. A full tank of gasoline can be 10 gallons. "available[2]" can be 50% or 5 gallons after replenishing at the first replenishment location 232 and the "needed" can be 75% or 7.5 gallon after traveling the third travel section 224.

The ninth dynamic partial replenishment calculator submodule 1318 updates the "needed" for each of the replenishment type 344 for the vehicle after accounting the "available" after replenishing at prior replenishment opportunity. For example, the ninth dynamic partial replenishment calculator submodule 1318 can include the following function to calculate the "cost" and calculate the "needed."

$$\text{cost} = \text{cost} + \text{Conversion}[j] \times \text{available}[j]$$
$$\text{available}[j] = 0$$
$$\text{needed} = \text{needed} - \text{available}[j]$$

The ninth dynamic partial replenishment calculator submodule 1318 can execute "cost+Conversion[j]×available[j]" to calculate the "cost." The "cost" for "cost+Conversion[j]×available[j]" represents the "cost" from "cost=Link[i].cost+Node.cost" calculated by the third dynamic partial replenishment calculator submodule 1306. "Conversion[j]×available[j]" represents the "cost" replenishing the amount for "available[j]."

For example, "Conversion[2]" can represent the linear cost represented by "costConversion" for replenishing a gasoline fuel More specifically, "Conversion[2]" or "costConversion" can represent 1 minute per 1 gallon. Continuing from the previous example, if the "available[2]" represents 5 gallons, the "cost" for the "available[2]" based on "Conversion[2]×available[2]" can be 5 minutes. If "Link[i].cost+Node.cost" can be 45 minutes, "cost+Conversion[2]×available[2]" can be 50 minutes. "available[2]" is set to "0" to reinitialize the "available[2]."

The ninth dynamic partial replenishment calculator submodule 1318 can verify the feasibility 374 for each of the travel sections 297. The ninth dynamic partial replenishment calculator submodule 1318 can execute "needed=needed−available[j]" to update the amount of "needed" for traveling along the "Links[i]." For example, "Links[1]" can represent the third travel section 224. The amount of "Links[1].consumed" required to travel the third travel section 224 can represent 7.5 gallons out of 10 gallon gasoline tank of the vehicle. If the gasoline tank is 50% full at the first replenishment location 232, the vehicle can require additional 2.5 gallons of gasoline. The feasibility 374 of traveling the third travel section 224 can be calculated by the ninth dynamic partial replenishment calculator submodule 1318 executing "needed=needed−available[j]" to determine the amount of fuel required to complete the travel.

The dynamic partial replenishment calculator module 628 can include a tenth dynamic partial replenishment calculator submodule 1320 and is coupled to the ninth dynamic partial replenishment calculator submodule 1318. The tenth dynamic partial replenishment calculator submodule 1320 calculates the total amount of resource, fuel, or the combination thereof for each type of resource, fuel, or the combination thereof at a particular replenishment stop. For example, the tenth dynamic partial replenishment calculator submodule 1320 can calculate the aggregation of the estimated resource level 310 of FIG. 3, the estimated fuel level 312 of FIG. 3, or the combination thereof for each type of the replenishment type 344 at the first replenishment location 232. The tenth dynamic partial replenishment calculator submodule 1320 can calculate the aggregation with the following function:

totalAvailable=available[0]+available[1]

"available[0]" and "available[1]" are as described previously. "totalAvailable" is defined as the total amount of resource, fuel, or the combination thereof for each type of resource, fuel, or the combination thereof at a particular replenishment stop. For example, "available[0]" can represent the "initalCharge." "available[1]" can represent the "charge" after replenishing the vehicle with an electric charge. "totalAvailable" can represent the aggregation of the "available[0]" and "available[1]." "totalAvailable" can represent the aggregation of the estimated fuel level 312 level for the replenishment type 344 representing an electric charge at the first replenishment location 232.

The dynamic partial replenishment calculator module 628 can include a thirteenth dynamic partial replenishment calculator submodule 1326 and is coupled to the tenth dynamic partial replenishment calculator submodule 1320. The thirteenth dynamic partial replenishment calculator submodule 1326 identifies the candidate for the next stopping point having the information for "available." For example, the thirteenth dynamic partial replenishment calculator submodule 1326 can include the following function to identify the candidate for the next stopping point:

NextNode=NodeSet.getNode(Graph,id, available)

"NodeSet.getNode(Graph,id, available)" is as described in FIG. 7 with one additional input, "available." For example, "NodeSet.getNode(Graph,id, available)" can return a "Node" representing the third replenishment location 228 as the "NextNode." The "NextNode" can include the information for the "available" when the vehicle replenishes at the third replenishment location 228.

The dynamic partial replenishment calculator module 628 can include a fourteenth dynamic partial replenishment calculator submodule 1330 and is coupled to the tenth replenishment locator submodule 720. The fourteenth dynamic partial replenishment calculator submodule 1330 calculates the "cost" to for traveling to the next stopping point. For example, the fourteenth dynamic partial replenishment calculator submodule 1330 can include the following function calculate the "cost":

NextNode.cost=cost

"NextNode.cost" as described in FIG. 7. The fourteenth dynamic partial replenishment calculator submodule 1330 can calculate the "NextNode.cost" by setting the "cost" from "cost=Link[i].cost+Node.cost" calculated by the third dynamic partial replenishment calculator submodule 1306. For example, the "cost" can be the aggregation of the estimated travel time 352, the estimated financial cost, or the combination thereof for the first travel section 220, the second travel section 222, and the third travel section 224.

The dynamic partial replenishment calculator module 628 can include a twelfth dynamic partial replenishment calculator submodule 1324 and is coupled to the fourteenth dynamic partial replenishment calculator submodule 1330. The twelfth dynamic partial replenishment calculator submodule 1324 identifies whether the condition that the vehicle will have a sufficient amount of resource, fuel, or the combination thereof replenished at prior stopping point before reaching the next stopping point. For example, the twelfth dynamic partial replenishment calculator submodule 1324 can include the following function identify the condition:

If (totalAvailable>minimumSafeCharge)

"minimumSafeCharge" is as described in FIG. 7. "totalAvailable" is as described previously. For example, "totalAvailable" can represent the estimated fuel level 312 at the first replenishment location 232 and the "minimumSafeCharge" can represent the minimum fuel level 304 of FIG. 3 of the third replenishment location 228. For further example, if the "totalAvailable" can be 10% and the "minimumSafeCharge" can be 5%, the condition for If (totalAvailable>minimumSafeCharge) can be met. The fifteenth replenishment locator submodule 730 can be invoked to add the third replenishment location 228 can be included as one of the candidate for the vehicle to stop by for the next stopping point.

It has been discovered that the present invention provides the navigation system 100 for safely reaching the replenishment locations 218 for as needed replenishment of resource, fuel, or the combination thereof based on the estimated consumption level 316. By allowing as needed replenishment, the user can avoid incurring unnecessary amount for the estimated financial cost 370, the estimated replenishment cost 372, or the combination thereof for replenishing the vehicle. Furthermore, by replenishing the vehicle as needed, the user can gain more flexibility for choosing when to replenish the vehicle. The greater flexibility permits the user to avoid unnecessary burden to seek replenishment when the replenishment is not necessarily desired. Subsequently, the alleviation from the burden can lead to safer operation of the vehicle to reach the destination 206.

Figure 14:
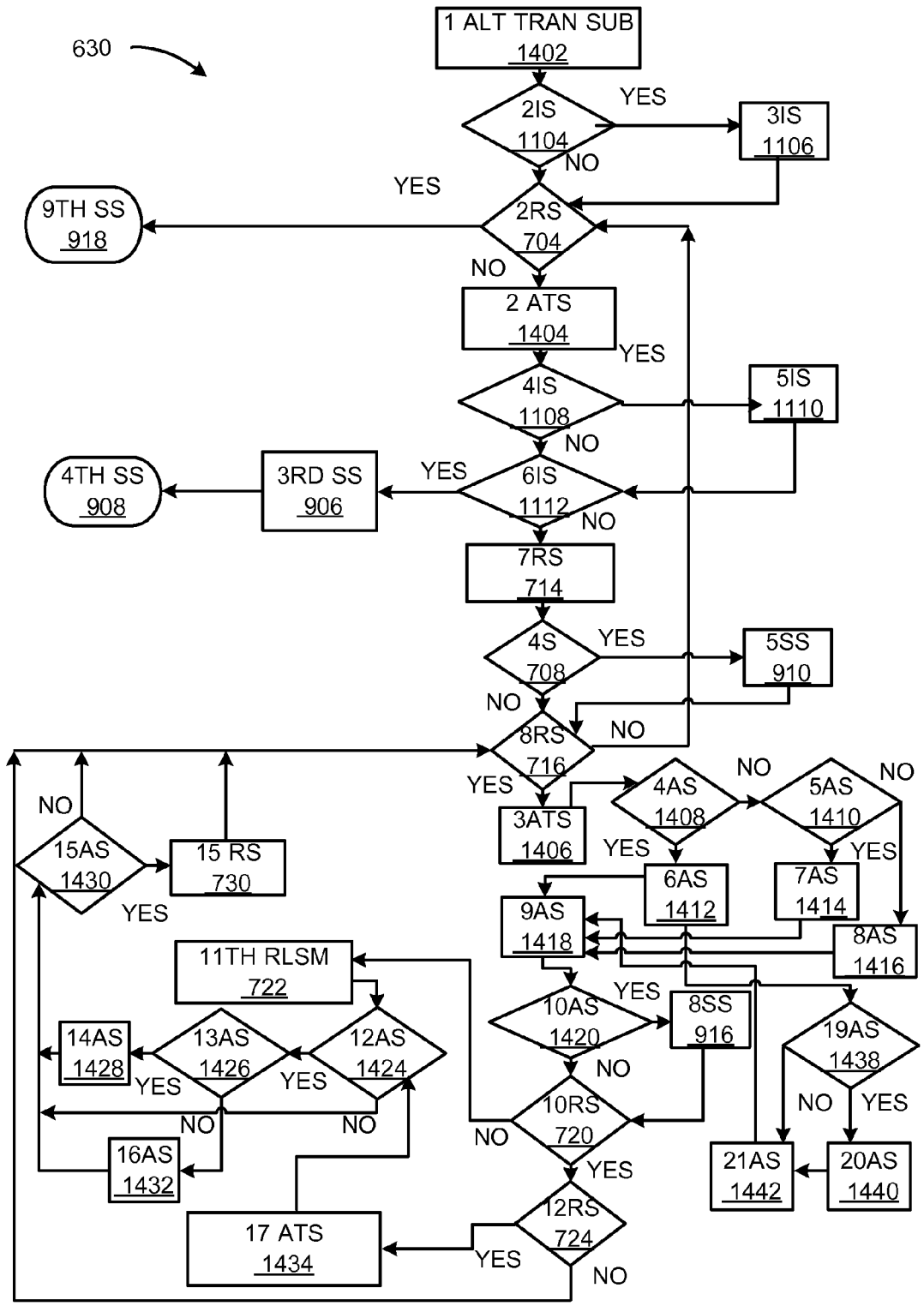
FIG. 14 is a flow of the alternate transportation module.

Referring now to FIG. 14, therein is shown a flow of the alternate transportation module 630. The alternate transportation module 630 generates a path that considers the use of a mechanism other than the user's vehicle to reach the target destination.

For example, the alternate transportation module 630 can generate the alternate mechanism route 203 of FIG. 2 based on the alternate transportation 201 of FIG. 2 for ensuring a travel option for reaching the replenishment locations 218 of FIG. 2, the intermediate stops 210 of FIG. 2, the destination 206 of FIG. 2, or the combination thereof. For a more specific example, the alternate transportation module 630 can generate the travel route 216 of FIG. 2 having the alternate mechanism route 203. The alternate transportation module 630 can be shown in pseudo code format as the following pseudo code 8:

```
PriorityQueue.clear( )
NodeSet.clear( )
Origin = NodeSet.getNode(Graph, OriginId,, initialCharge, 0, -1)
If (Origin.destNumber equals 1)
    Origin.destVisited = 1;
Origin.cost = 0
Origin.previous = NULL    // signifies beginning of route, i.e., there is no
previous node on the route
PriorityQueue.insert(Origin) // sets Origin.inQueue = true
// search nodes in order of cost
While ( PriorityQueue.isEmpty( ) is false)
    Node = PriorityQueue.top( )
    Node.settled = true // getNode sets settled to false when node is first
    encountered
    Node.altTime =0
    If (Node.destNumber equals Node.destVisited+1)
        Node.destVisited = destNumber;
    If (Node.destVisited equals maxDestNumber)
        Reconstruct Route by following linked list starting at
        Node.previous
        Return route
    Links = Graph.getLinks(Node.id)
    If ( Node.replenishment is true)
        // add a waiting link for recharging
        Link.nextId = Node.id
        Link.cost = Graph.rechargeCost(Node.id, fullCharge,
        Node.charge) // waiting time or monetary cost
        Link.consumed = Node.charge - fullCharge // a negative value
        means charge is increased
        Links.add(Link) // adds a link to the array of links
    For ( i = 0; i < Links.count( ); i = i+1 )
        id = Links[i].nextId
        If ( Links[i].alternate equals true and id equals
        Node.replenishmentId )
            // search has returned to replenishment node, adjust link cost
            suitably to allow for charging to complete
            altTime = Node.altTime + Links[i].time;
            timeCost = Graph.rechargeTime(id, fullCharge,
            Node.charge) –
            altTime // represents remaining time to wait
            if (timeCost < 0)
                timeCost = altTime // full recharge is complete, there is no
                waiting
            Links[i].cost = convertTimeToCost(timeCost) //
            replenishmentId = -1
        Else If ( Links[i].alternate equals true and
        Node.replenishmentId equals -1)
            replenishmentId = Node.id
        Else
            replenishmentId = Node.replenishmentId
        NextNode = NodeSet.getNode(Graph, id, Node.charge-
        Links[i].consumed, Node.destVisited, replenishmentId)
        If ( Node.replenishment is true and (Node.id equals id or
        Links[i].alternate equals true) )
            NextNode. replenishment = false    // second node at
            replenishment location or on alternate network
        If ( NextNode.inQueue is true )
            If ( NextNode.cost > Links[i].cost + Node.cost )
                PriorityQueue.remove(NextNode)
                NextNode.previous = pointer to Node // links nodes on
                route back to origin
                NextNode.cost = Links[i].cost + Node.cost
                NextNode.altTime =0
                If ( Links[i].alternate is true )
                    If ( Node.id equals replenishmentId )
                        NextNode.altTime = Links[i].time // start tracking time
                        from replenishment location
                    Else
                        NextNode.altTime = Node.altTime + Links[i].time
                    If (NextNode.charge > minimumSafeCharge and
                    NextNode.altTime is no greater than maxAltTime)
                        PriorityQueue.insert(NextNode) // sets NextNode.inQueue
                        = true
        Else if ( NextNode.settled is false )
            NextNode.previous = pointer to Node // links nodes on route
            back to origin
            NextNode.cost = Links[i].cost + Node.cost
            If ( Links[i].alternate is true )
                If ( Node.id equals replenishmentId )
                    NextNode.altTime = Links[i].time // start tracking time
                    from replenishment location
                Else
                    NextNode.altTime = Node.altTime + Links[i].time
                If (NextNode.charge > minimumSafeCharge and
                NextNode.altTime is no greater than maxAltTime)
                    PriorityQueue.insert(NextNode)
// no feasible route exists through all destinations in the given order with
the given amount of charge and charge capacity
Return error
```

Table 7 maps between the pseudo code and the specification elements:

| Pseudo Code Parameters | Specification Elements |
| --- | --- |
| Links.alternate | The alternate mechanism route 203 of FIG. 2 |
| altTime | The estimated concurrent user activity time 356 of FIG. 3 |
| timeCost | The estimated replenishment time 354 of FIG. 3 |

The alternate transportation module 630 can include the second replenishment locator submodule 704, the fourth replenishment locator submodule 708, the seventh replenishment locator submodule 714, and the eighth replenishment locator submodule 716 with each having the same function, establishing the same condition, or the combination thereof as described in FIG. 7. The alternate transportation module 630 can include the tenth replenishment locator submodule 720, the eleventh replenishment locator submodule 722, the twelfth replenishment locator submodule 724, and the fifteenth replenishment locator submodule 730 with each having the same function, establishing the same condition, or the combination thereof as described in FIG. 7.

The alternate transportation module 630 can include the third sufficient replenishment locator submodule 906 and the fourth sufficient replenishment locator submodule 908 with each having the same function, establishing the same condition, or the combination thereof as described in FIG. 9. The alternate transportation module 630 can include the fifth sufficient replenishment locator submodule 910, the eighth sufficient replenishment locator submodule 916, and the ninth sufficient replenishment locator submodule 918 with each having the same function, establishing the same condition, or the combination thereof as described in FIG. 9.

The alternate transportation module 630 can include the second intermediate stop locator submodule 1104, the third intermediate stop locator submodule 1106, and the fourth intermediate stop locator submodule 1108 with each having the same function, establishing the same condition, or the combination thereof as described in FIG. 11. The alternate transportation module 630 can include the fifth intermediate stop locator submodule 1110 and the sixth intermediate stop locator submodule 1112 with each having the same function, establishing the same condition, or the combination thereof as described in FIG. 11.

The alternate transportation module 630 can include a first alternate transportation submodule 1402. The first alternate transportation submodule 1402 can include the same functions as the first intermediate stop locator submodule 1102 of FIG. 11 with the following difference for an input to initialize the data structures used in the pseudo code.

Origin=NodeSet.getNode(Graph,OriginId, initialCharge, 0, −1)

The fifth input "−1" is defined as the default value for the "replenishmentId." The "replenishmentId" is defined as the ID of the most recent replenishment "Node" on the alternate mechanism route 203 that the vehicle can stop by prior to reaching the next "Node." For a further definition, if the next "Node" is not entirely on the alternate mechanism route 203 from the most recent replenishment "Node," the value of the "replenishmentId" for the most recent replenishment "Node" is set to "−1."

For example, the third replenishment location 228 of FIG. 2 can represent the "Node.replenishmentId" that is not equal to "4," because the third replenishment location 228 can be on the alternate mechanism route 203. In contrast, the first replenishment location 232 of FIG. 2 can represent the "Node.replenishmentId" that is equal to "4," because the first replenishment location 232 is not on the alternate mechanism route 203.

"NodeSet.getNode( )" returns the "Node" having the value of the "replenishmentId." Two "Node" with different value for "replenishmentId" are considered to be different "Node" even if they represent the same "Graph.Node" and "charge" level." Therefore, "NodeSet.getNode" will create a new "Node" if no existing "Node" in the "Graph" matches all four values for "id," "charge," "destVisited," and "replenishmentId."

For example, "NodeSet.getNode( )" can return the start location 208 of FIG. 2. If the start location 208 is not entirely on the alternate mechanism route 203, the value for the "replenishmentId" for the start location 208 can be "−1."

The alternate transportation module 630 can include a second alternate transportation submodule 1404 and is coupled to the second replenishment locator submodule 704 of FIG. 7. The second alternate transportation submodule 1404 can include the same functions as the third replenishment locator submodule 706 of FIG. 7 with a following additional function:

Node.altTime=0

"altTime" is defined as a field for the "Node" that represents the time accumulated for traveling on the route by a mechanism other than operating the user's vehicle. For example, "altTime" can represent the estimated concurrent user activity time 356 for traveling along the alternate mechanism route 203. The second alternate transportation submodule 1404 can execute "Node.altTime=0" to initialize the "altTime."

The alternate transportation module 630 can include a third alternate transportation submodule 1406 and is coupled to the eighth replenishment locator submodule 716. The third alternate transportation submodule 1406 identifies the ID for the next candidate "Node." For example, the third alternate transportation submodule 1406 can include the following functions to identify the ID:

id=Links[i].nextId

"id=Links[i].nextId" is as described in the ninth replenishment locator submodule 718 of FIG. 7. For example, the third alternate transportation submodule 1406 can execute "id=Links[i].nextId" to set the "id" for the third replenishment location 228.

The alternate transportation module 630 can include a fourth alternate transportation submodule 1408 and is coupled to the third alternate transportation submodule 1406. The fourth alternate transportation submodule 1408 identifies whether the condition that a path is a path that uses a mechanism other than the user's vehicle for travel has been met or not. Additionally, the fourth alternate transportation submodule 1408 identifies whether the condition that the next candidate "Node" is one of the replenishment locations 218 of FIG. 2 that is on the alternate mechanism route 203 has been met or not. For example, the fourth alternate transportation submodule 1408 can include the following function to identify the condition:

If (Links[i].alternate equals true and id equals Node.replenishmentId)

"alternate" is defined as a field for the "Links" that represents the existence of the alternate mechanism route 203. For example, if "Links[i].alternate" is "true," the alternate mechanism route 203 can exist.

For further example, "id" can represent the ID for the first replenishment location 232 of FIG. 2. The "Node.replenishmentId" can also represent the ID for the first replenishment location 232. "Links[1]" can represent the sixth travel section 292 of FIG. 2 starting from the first replenishment location 232 to the fourth replenishment location 236 of FIG. 2. "Links.[1].alternate" can be "true," because the sixth travel section 292 can be the alternate mechanism route 203. The value for the "replenishmentId" for the first replenishment location 232 can be not "4," because the fourth replenishment location 236 is entirely on the sixth travel section 292, which can represent the alternate mechanism route 203.

If the condition for "If (Links[i].alternate equals true and id equals Node.replenishmentId)" is met, the alternate transportation module 630 can invoke a sixth alternate transportation submodule 1412. If the condition for "If (Links[i].alternate equals true and id equals Node.replenishmentId)" is not met, the alternate transportation module 630 can invoke a fifth alternate transportation submodule 1410.

The alternate transportation module 630 can include the fifth alternate transportation submodule 1410 and is coupled to the fourth alternate transportation submodule 1408. The fifth alternate transportation submodule 1410 identifies whether the condition that a path is a path that uses a mechanism other than the user's vehicle for travel has been met or not. For example, the fifth alternate transportation submodule 1410 can identify the alternate transportation 201. Additionally, the fifth alternate transportation submodule 1410 identifies whether the condition that the next candidate "Node" is not one of the replenishment locations 218 that is not entirely on the alternate mechanism route 203 has been met or not. For example, the fifth alternate transportation submodule 1410 can include the following function to identify the condition:

Else If (Links[i].alternate equals true and Node.replenishmentId equals −1)

"Links[i].alternate equals true" is as described previously. "Node.replenishmentId equals −1" is as described previously. For example, the alternate mechanism route 203 can start from the third replenishment location 228. For a further example, "Links[0].alternate" can be "true," because "Links [0]" can represent the alternate mechanism route 203. However, "Node.replenishmentId" for the third replenishment location 228 can be set to "4," because the destination 206 of FIG. 2 is not entirely on the alternate mechanism route 203. The vehicle can reach the destination 206 traveling on the fourth travel section 226 of FIG. 2 from the third replenishment location 228 to the destination 206.

If the condition for "Else If (Links[i].alternate equals true and Node.replenishmentId equals −1)" is met, the alternate transportation module 630 can invoke a seventh alternate transportation submodule 1414. If the condition for "Else If (Links[i].alternate equals true and Node.replenishmentId equals −1)" is not met, the alternate transportation module 630 can invoke an eighth alternate transportation submodule 1416.

The alternate transportation module 630 can include the sixth alternate transportation submodule 1412 and is coupled to the fourth alternate transportation submodule 1408. The sixth alternate transportation submodule 1412 calculates the estimated time for traveling along the alternate mechanism route 203 and the estimated time for the user waiting for the vehicle to finish replenishing.

For example, the sixth alternate transportation submodule 1412 can calculate the estimated concurrent user activity time 356 for traversing along the alternate mechanism route 203 for reaching the destination 206 from one of the replenishment locations 218 of FIG. 2. For another example, the sixth alternate transportation submodule 1412 can calculate the estimated replenishment time 354 of FIG. 3 for factoring the estimated concurrent user activity time 356. The sixth alternate transportation submodule 1412 can include the following functions to calculate the estimated time and the monetary cost associated with the estimated time:

altTime = Node.altTime + Links[i].time;
timeCost = Graph.rechargeTime(id, fullCharge, Node.charge) − altTime "altTime" is defined as a field for the "Node" representing the estimation of the time that the user can accumulate on the alternate mechanism route 203. For example, "altTime" can represent the aggregation of the estimated concurrent user activity time 356 for traveling along the alternate mechanism route 203.

"time" is defined as a filed for the "Links" representing the estimation of the time that the user can take to travel the length of the path. For further definition, "time" can be the same as the "cost." For example, "time" can represent the estimated travel time 352 of FIG. 3. "cost" can also represent the estimated travel time 352.

The sixth alternate transportation submodule 1412 can execute "Node.altTime+Links[i].time" to calculate the "altTime." For example, the sixth travel section 292 and the seventh travel section 294 of FIG. 2 can represent the alternate mechanism route 203 for reaching the third replenishment location 228. The aggregation of the estimated concurrent user activity time 356 for traveling the sixth travel section 292 and the seventh travel section 294 can be 120 minutes. "Links.[1]" can represent the fourth travel section 226. "Links.[1].time" can be 45 minutes to travel the fourth travel section 226. "Node.altTime+Links[i].time" can be the sum of 120 minutes plus 45 minutes or 165 minutes.

"timeCost" is defined as the estimation of the time the user can wait while the vehicle is being replenished fully. For example, the "timeCost" can represent the estimated replenishment time 354 with the estimated concurrent user activity time 356 factored in.

"Graph.rechargeTime( )" is defined as a function that computes for the time for replenishing the vehicle. For further definition, "Graph.rechargeTime" accepts three inputs: "id," "fullCharge," and "Node.charge." "id," "fullCharge," and "Node.charge" are as described previously. For example, "Graph.rechargeTime" can return the estimated time the user can wait until the charging of the electric vehicle at the third replenishment location 228 to its full capacity can complete. For example, the estimated time returned by "Graph.rechargeTime" can represent the estimated replenishment time 354.

For a more specific example, the user can travel along the alternate mechanism route 203 on the train while the user's vehicle is being replenished at the third replenishment location 228. When the user is traveling on the alternate mechanism route 203, the user is not necessarily waiting for the vehicle to finish replenishing. Hence, "timeCost" subtracts "altTime" from the estimated time computed by the "Graph.rechargeTime( )."

For example, "altTime" or the aggregation of the estimated concurrent user activity time 356 can be 45 minutes. The estimated time or the estimated replenishment time 354 for the full capacity returned by "Graph.rechargeTime( )" can be 60 minutes at the third replenishment location 228. Subsequently, "timeCost" or the estimated replenishment time 354 with the estimated concurrent user activity time 356 factored in can be 15 minutes at the third replenishment location 228.

The alternate transportation module 630 can include a nineteenth alternate transportation submodule 1438 and is coupled to the sixth alternate transportation submodule 1412. The nineteenth alternate transportation submodule 1438 identifies whether the condition that estimated time for traveling along the alternate mechanism route 203 exceeds the estimated time for replenishing the vehicle. The nineteenth alternate transportation submodule 1438 can include the following function to identify the condition:

If (timeCost<0)

"timeCost" is as described previously. For example, if the estimated concurrent user activity time 356 exceeds the estimated replenishment time 354, the estimated replenishment time 354 can be less than "0." If the condition for "If (timeCost<0)" is met, the nineteenth alternate transportation submodule 1438 can invoke a twentieth alternate transportation submodule 1440. If the condition for "If (timeCost<0)" is not met, the nineteenth alternate transportation submodule 1438 can invoke a twenty first alternate transportation submodule 1442.

The alternate transportation module 630 can include the twentieth alternate transportation submodule 1440 and is coupled to the nineteenth alternate transportation submodule 1438. The twentieth alternate transportation submodule 1440 sets the value of "timeCost" with "altTime with the following function:

timeCost=altTime

"timeCost" and "altTime" is as described previously. "altTime" equaling "timeCost" signifies that the user need not wait for the vehicle to finish replenishing.

The alternate transportation module 630 can include the twenty first alternate transportation submodule 1442 and is coupled to the twentieth alternate transportation submodule 1440. The twenty first alternate transportation submodule 1442 calculates the monetary cost associated with the time user spent waiting for the vehicle to finish replenishing with the time traveling along the alternate mechanism route 203 factored in.

For example, the sixth alternate transportation submodule 1412 can calculate the estimated replenishment cost 372 of FIG. 3 for factoring the estimated concurrent user activity time 356 for traveling along the alternate mechanism route 203 for reaching the destination 206 from one of the replenishment locations 218. The twenty first alternate transportation submodule 1442 can include the following function to calculate the monetary cost:

---
Links[i].cost = convertTimeToCost(timeCost)
replenishmentId = −1
---

"Links[i].cost" is as described previously. For example, "Links[i]" can represent the fourth travel section 226.

"convertTimeToCost(timeCost)" is defined as a function that converts time to "cost" as perceived by the user so that the difference between time on the alternate mechanism route 203 and the time for replenishment can be converted to "cost." For example, "convertTimeToCost(timeCost)" can return the time cost, monetary cost, or the combination thereof for traveling along "Links[i]." For a specific example, "convertTimeToCost(timeCost)" can return the estimated travel time 352, the estimated financial cost, or the combination thereof for traveling along the fourth travel section 226. For further example, the estimated travel time 352 can factor in the "timeCost" at the third replenishment location 228. By factoring the "timeCost," the estimated travel time 352 can be reduced, because the time user can wait for the vehicle to complete replenishing can be reduced by factoring the estimated concurrent user activity time 356. "replenishmentId" can be reinitialized by setting it to "−1."

The alternate transportation module 630 can include the seventh alternate transportation submodule 1414 and is coupled to the fifth alternate transportation submodule 1410. The seventh alternate transportation submodule 1414 sets the value for the "replenishmentId" with the "Node.id" using the following function:

replenishmentId=Node.id

"replenishmentId" and "Node.id" is as described previously. Continuing from the previous example, the value for the "replenishmentId" for the third replenishment location 228 can be "−1." The seventh alternate transportation submodule 1414 can invoke "replenishmentId=Node.id" to set the "Node.id" for the third replenishment location 228 as the "replenishmentId."

The alternate transportation module 630 can include the eighth alternate transportation submodule 1416 and is coupled to the fifth alternate transportation submodule 1410. The eighth alternate transportation submodule 1416 sets the value for the "replenishmentId" with the "Node.replenishmentId" using the following function:

replenishmentId=Node.replenishmentId replenishmentId" and "Node.replenishmentId" is as described previously. For example, the "Node" can represent the fourth replenishment location 236. For further example, since the fourth replenishment location 236 does not have the alternate mechanism route 203 starting from the fourth replenishment location 236 to neither the third replenishment location 228 nor the destination 206, the value for the "Node.replenishmentId" for the fourth replenishment location 236 can be "−1."

The alternate transportation module 630 can include a ninth alternate transportation submodule 1418 and is coupled to the eighth alternate transportation submodule 1416. The ninth alternate transportation submodule 1418 identifies the candidate of the next stopping point with the same function as described in the seventh intermediate stop locator submodule 1114 of FIG. 11 with one additional input for "NodeSet.getNode( )."

---
NextNode = NodeSet.getNode(Graph, id, Node.charge −
Links[i].consumed, Node.destVisited, replenishmentId)
---

"NextNode=NodeSet.getNode(Graph, id, Node.charge−Links[i].consumed, Node.destVisited, replenishmentId)" returns the next "node" having the "replenishmentId." For example, "Node" can represent the first replenishment location 232. The "NextNode" can represent the third replenishment location 228. Since the third replenishment location 228 can be not entirely on the alternate mechanism route 203, the value of "replenishmentId" can be "−1" for the third replenishment location 228. In contrast, if the fourth replenishment location 236 can be entirely on the alternate mechanism route 203, the value of "replenishmentId" can be other than "−1" for the fourth replenishment location 236.

The alternate transportation module 630 can include a tenth alternate transportation submodule 1420 and is coupled to the ninth alternate transportation submodule 1418. The tenth alternate transportation submodule 1420 identifies whether the condition that "NextNode" is not the same as the "Node" or whether the condition that "Links" is one of the alternate mechanism route 203 has been met or not. For an additional condition, "Node.replenishment is true" is the same condition as described in the fourth replenishment locator submodule 708 of FIG. 7. For example, the tenth alternate transportation submodule 1420 can include the following function to identify the condition:

---
If ( Node.replenishment is true and (Node.id equals id or
Links[i].alternate equals true))
---

"Node.replenishment is true" is as described in FIG. 7. "Node.id equals id" is as described in FIG. 9. "Links[i].alternate equals true" is as described previously. For example, the "Node" can represent the first replenishment location 232. "replenishment" can be "true," because the first replenishment location 232 can be one of the replenishment locations 218. "Links[1]" can represent the sixth travel section 292. The sixth travel section 292 can be the alternate mechanism route 203. Thus, "Links[1].alternate" can be "true."

If the condition for the tenth alternate transportation submodule 1420 can be met, the alternate transportation module 630 can invoke the eighth sufficient replenishment locator submodule 916. By setting the "NextNode.replenishment" as "false," the "NextNode" can be on the alternate mechanism route 203.

The alternate transportation module 630 can include a twelfth alternate transportation submodule 1424 and is coupled to the eleventh replenishment locator submodule 722. The twelfth alternate transportation submodule 1424 identifies whether the condition that the path to the next stopping point is the alternate mechanism route 203 has been met or not. For example, the twelfth alternate transportation submodule 1424 can include the following function to identify the condition:

If (Links[i].alternate equals true)

"Links[i].alternate equals true" is as described previously. For example, the "NextNode" can be the fourth replenishment location 236. "Links[1]" can represent the sixth travel section 292. The sixth travel section 292 can be the alternate mechanism route 203. Subsequently, the condition "Links[1].alternate equals true" can be met.

The alternate transportation module 630 can include a thirteenth alternate transportation submodule 1426 and is coupled to the twelfth alternate transportation submodule 1424. The thirteenth alternate transportation submodule 1426 identifies whether the condition that the current stop point is also the most recent replenishment point that the user stopped by prior to taking the alternate transportation 201 of FIG. 2 to reach the next stopping point. For example, the thirteenth alternate transportation submodule 1426 can include the following function to identify the condition:

If (Node.id equals replenishmentId)

For example, "Node" can be the first replenishment location 232. The user can take the alternate transportation 201 along the sixth travel section 292 to reach the fourth replenishment location 236. In this example, the first replenishment location 232 can have the value for the "replenishmentId" other than "−1."

If the condition for "If (Node.id equals replenishmentId)" is met, the alternate transportation module 630 can invoke a fourteenth alternate transportation submodule 1428. If the condition for "If (Node.id equals replenishmentId)" is not met, the alternate transportation module 630 can invoke a sixteenth alternate transportation submodule 1432.

The alternate transportation module 630 can include the fourteenth alternate transportation submodule 1428 and is coupled to the thirteenth alternate transportation submodule 1426. The fourteenth alternate transportation submodule 1428 calculates the estimation of time spent traveling along the alternate mechanism route 203 to reach the next stopping point. For example, the fourteenth alternate transportation submodule 1428 can include the following function to calculate the time:

NextNode.altTime=Links[i].time

"Links[i].time" is as described previously. "NextNode.altTime" is defined as the time accumulated on the alternate mechanism route 203 to reach the "NextNode." For example, "Links[1]" can represent the sixth travel section 292. The sixth travel section 292 can be the alternate mechanism route 203 for reaching the fourth replenishment location 236 or the "NextNode." "Links[1].time" can represent the time user spent on traveling the sixth travel section 292. "Links.[1].time" can be 45 minutes.

The alternate transportation module 630 can include the sixteenth alternate transportation submodule 1432 and is coupled to the thirteenth alternate transportation submodule 1426.

The alternate transportation module 630 can include a fifteenth alternate transportation submodule 1430 and is coupled to the fourteenth alternate transportation submodule 1428. The fifteenth alternate transportation submodule 1430 identifies whether the condition that the estimation for the amount of time spent traveling on the alternate mechanism route 203 is less than the amount of permitted allotted time for traveling on the alternate mechanism route 203 has been met or not. For example, the fifteenth alternate transportation submodule 1430 can include the following function to identify the condition:

If (NextNode.charge > minimumSafeCharge and NextNode.altTime is no greater than maxAltTime)

"NextNode.charge>minimumSafeCharge" is as described in FIG. 7. "maxAltTime" is defined as the maximum amount of time found to be reasonable for the user to travel on the alternate mechanism route 203 while the user waits for the vehicle to finish replenishing.

For example, "maxAltTime" can be 60 minutes. If the "NextNode.altTime" is 45 minutes, the alternate transportation module 630 can invoke the fifteenth replenishment locator submodule 730.

The alternate transportation module 630 can include a seventeenth alternate transportation submodule 1434 and is coupled to the twelfth replenishment locator submodule 724. The seventeenth alternate transportation submodule 1434 can include the same function as the thirteenth replenishment locator submodule 726 of FIG. 7. The seventeenth alternate transportation submodule 1434 can include the same functions as the eleventh replenishment locator submodule 722 of FIG. 7 except "NextNode.charge=Node.charge−Links[i].consumed." The seventeenth alternate transportation submodule 1434 can include the following function to reinitialize the "NextNode.altTime":NextNode.altTime=0.

It has been discovered that the present invention provides the navigation system 100 to generate the travel route 216 having the alternate mechanism route 203 for providing travel options to reach the replenishment locations 218, the intermediate stops 210, the destination 206, or the combination thereof traveling with other than the user's vehicle. The travel options can permit the user from avoid incurring time cost from waiting for the vehicle to finish replenishing and reach the destination 206 while vehicle is being replenished. Traveling the alternate mechanism route 203 to reach the destination 206 utilizing the alternate transportation 201 can aid the user to reach the destination 206 safely by eliminating the risk of running out of resource, fuel, or the combination thereof for traversing the travel route 216.

Figure 15:
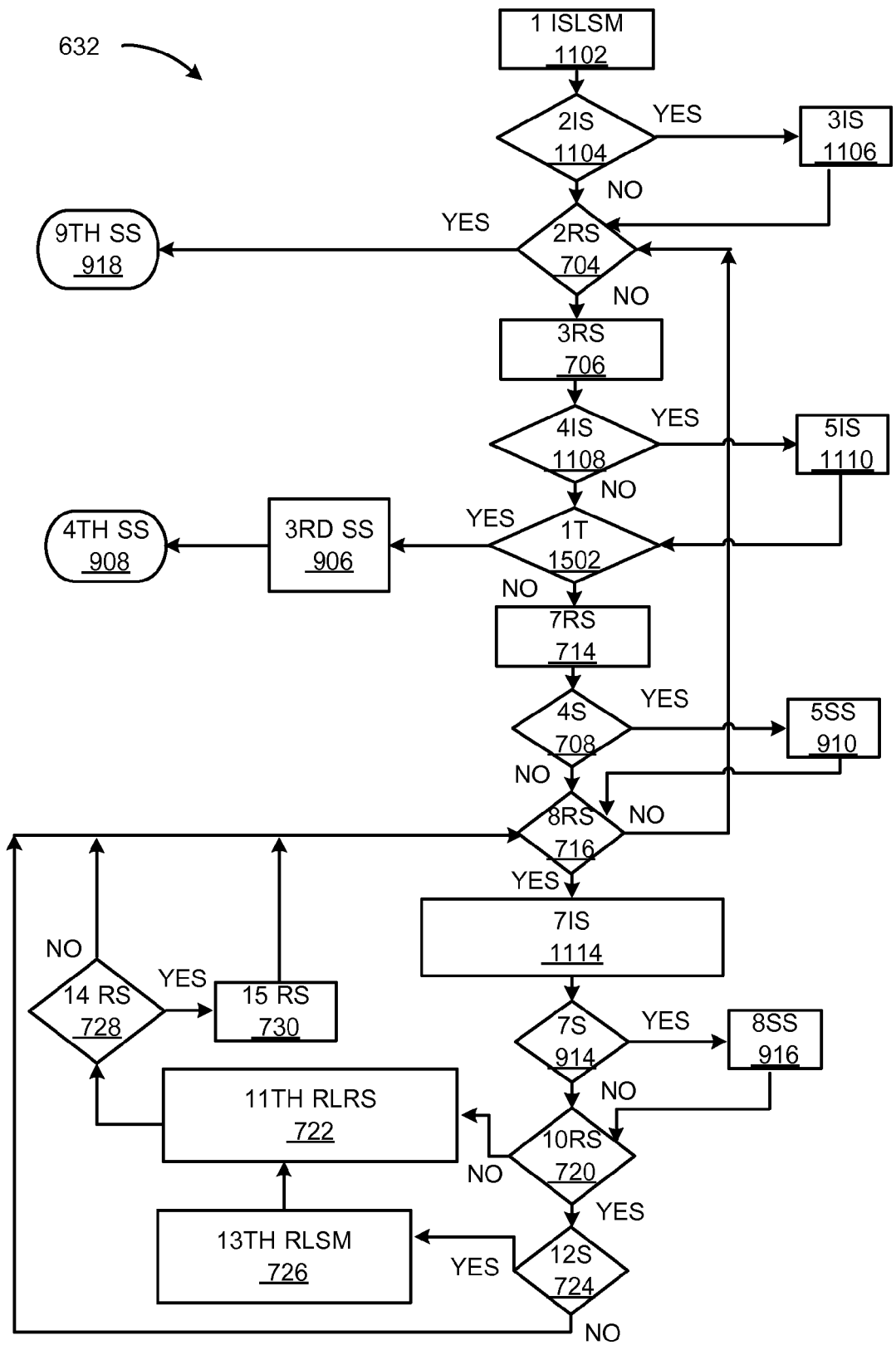
FIG. 15 is a flow of the termination module.

Referring now to FIG. 15, therein is shown a flow of the termination module 632. The termination module 632 verifies the destination 206 of FIG. 2 includes a replenishment location or has vehicle using the navigation system 100 has sufficient charge to reach a replenishment location from the destination 206.

For example, the termination module 632 can generate the travel route 216 of FIG. 2 based on the estimated resource level 310 of FIG. 3 meeting or exceeding the destination resource level 306 of FIG. 3 for ensuring a sufficient replenishment for reaching at least one of the replenishment locations 218 of FIG. 2. For another example, the termination module 632 can generate the travel route 216 based on the estimated fuel level 312 of FIG. 3 meeting or exceeding the destination fuel level 308 of FIG. 3 for ensuring a sufficient replenishment for reaching at least one of the replenishment locations 218.

A user of the navigation system 100 may select the destination 206 as the final destination and may not be a replenishment location. If not, the termination module 632 computes a route which terminates at a point where the vehicle using the navigation system 100 has some minimum level of charge.

The user can input this minimum level, somewhere between 0 and a full charge. If the user knows that this final destination can provide replenishment (e.g. his home), then the user can set the level to 0. If the user wants to be sure he finishes the trip with a full charge he can set the minimum to a full charge. In that case, the route will terminate at a replenishment location known to the navigation system 100.

The termination module 632 can be represented by the pseudo code 9 below:

```
PriorityQueue.clear( )
NodeSet.clear( )
Origin = NodeSet.getNode(Graph, OriginId, initialCharge, 0)
If (Origin.destNumber equals 1)
    Origin.destVisited = 1;
Origin.cost = 0
Origin.previous = NULL // signifies beginning of route, i.e., there is no
previous node on the route
PriorityQueue.insert(Origin) // sets Origin.inQueue = true
// search nodes in order of cost
While ( PriorityQueue.isEmpty( ) is false)
    Node = PriorityQueue.top( )
    Node.settled = true // getNode sets settled to false when node is first
    encountered
    If (Node.destNumber equals Node.destVisited+1)
        Node.destVisited = destNumber;
    If (Node.destVisited equals maxDestNumber and Node.charge is at
    least minFinalCharge)
        Reconstruct Route by following linked list starting at
        Node.previous
        Return route
    Links = Graph.getLinks(Node.id)
    If ( Node.replenishment is true)
        // add a waiting link for recharging
        Link.nextId = Node.id
        Link.cost = Graph.rechargeCost(Node.id, fullCharge,
        Node.charge) // waiting time or monetary cost
        Link.consumed = Node.charge − fullCharge // a negative value
        means charge is increased
        Links.add(Link) // adds a link to the array of links
    For ( i = 0; i < Links.count( ); i = i+1 )
        id = Links[i].nextId
        NextNode = NodeSet.getNode(Graph, id, Node.charge −
        Links[i].consumed, Node.destVisited)
        If ( Node.replenishment is true and Node.id equals id )
            NextNode. replenishment = false  // second node at
            replenishment location
        If ( NextNode.inQueue is true )
            If ( NextNode.cost > Links[i].cost + Node.cost )
                PriorityQueue.remove(NextNode)
                NextNode.previous = pointer to Node // links nodes on
                route back to origin
                NextNode.cost = Links[i].cost + Node.cost
                If (NextNode.charge > minimumSafeCharge)
                    PriorityQueue.insert(NextNode) // sets
                    NextNode.inQueue = true
        Else if ( NextNode.settled is false )
            NextNode.previous = pointer to Node // links nodes on
            route back to origin
            NextNode.cost = Links[i].cost + Node.cost
            If (NextNode.charge > minimumSafeCharge)
                PriorityQueue.insert(NextNode)
// no feasible route exists through all destinations in the given order with
the given amount of charge and charge capacity
Return error
```

The following table represents the matching of the key parameters between the pseudo code and the Specification Elements:

| Pseudo Code Parameters | Specification Elements |
| --- | --- |
| minFinalCharge | The destination fuel level 308; the destination resource level 306 of FIG. 3; or the combination thereof |

FIG. 15 represents pseudo code 9 with a flow chart. FIG. 15 depicts elements from the flow charts from FIG. 7, FIG. 9, and FIG. 11 and the elements are defined in its respective figure. The termination module 632 includes the first intermediate stop locator submodule 1102 leading to the second intermediate stop locator submodule 1104. A true condition in the second intermediate stop locator submodule 1104 leads to the third intermediate stop locator submodule 1106. The third intermediate stop locator submodule 1106 or a false condition in the second intermediate stop locator submodule 1104 leads to the second replenishment locator submodule 704.

A true condition in the second replenishment locator submodule 704 leads to the ninth sufficient replenishment locator submodule 918. A false condition in the second replenishment locator submodule 704 leads to the third replenishment locator submodule 706. The third replenishment locator submodule 706 leads to the fourth intermediate stop locator submodule 1108.

A true condition in the fourth intermediate stop locator submodule 1108 leads to the fifth intermediate stop locator submodule 1110. A false condition from the fourth intermediate stop locator submodule 1108 and the completion of the fifth intermediate stop locator submodule 1110 leads to a first termination submodule 1502 of the termination module 632. The first termination submodule 1502 tests if the destination node visited equal the maximum destination number and that charge at that destination node is least minimum final charge, as from pseudo code 9.

If (Node.destVisited equals maxDestNumber and Node.charge is at least minFinalCharge)

A true condition in the first termination submodule 1502 leads to the third sufficient replenishment locator submodule 906 which then leads to the fourth sufficient replenishment locator submodule 908. A false condition in the first termination submodule 1502 can lead to the seventh replenishment locator submodule 714.

The seventh replenishment locator submodule 714 can lead to the fourth replenishment locator submodule 708. A true condition in the fourth replenishment locator submodule 708 can lead to the fifth sufficient replenishment locator submodule 910. A false condition in the fourth replenishment locator submodule 708 and the completion of the fourth replenishment locator submodule 708 can each lead to the eighth replenishment locator submodule 716.

A true condition in the eighth replenishment locator submodule 716 can lead to the seventh intermediate stop locator submodule 1114. A false condition in the eighth replenishment locator submodule 716 can lead to the second replenishment locator submodule 704. The eighth replenishment locator submodule 716 can lead the seventh intermediate stop locator submodule 1114 which can lead to the seventh sufficient replenishment locator submodule 914.

A true condition in the seventh sufficient replenishment locator submodule 914 can lead to the eighth sufficient replenishment locator submodule 916. A false condition in the seventh sufficient replenishment locator submodule 914 and a completion to the eighth sufficient replenishment locator submodule 916 each can lead to the tenth replenishment locator submodule 720.

A true condition in the tenth replenishment locator submodule 720 can lead to the twelfth replenishment locator submodule 724. A false condition in the tenth replenishment locator submodule 720 can lead to the eleventh replenishment locator submodule 722. A false condition in the twelfth replenishment locator submodule 724 can lead to the eighth replenishment locator submodule 716. A true condition in the twelfth replenishment locator submodule 724 can lead to the thirteenth replenishment locator submodule 726.

The completion of the thirteenth replenishment locator submodule 726 can lead to the eleventh replenishment locator submodule 722. The eleventh replenishment locator submodule 722 can lead to the fourteenth replenishment locator submodule 728.

A true condition in the fourteenth replenishment locator submodule 728 can lead to the fifteenth replenishment locator submodule 730. A false condition in the fourteenth replenishment locator submodule 728 and the completion of the fifteenth replenishment locator submodule 730 can each lead to the eighth replenishment locator submodule 716.

It has been discovered that the present invention provides the navigation system 100 to generate the travel route 216 factoring the destination resource level 306, the destination fuel level 308, or the combination thereof for safer operation of the vehicle to reach the destination 206. The safer operation is provided by terminating the travel route 216 to ensure a sufficient amount of resource, fuel, or the combination thereof upon arriving at the replenishment locations 218, the intermediate stops 210, or the destination 206.

Figure 16:
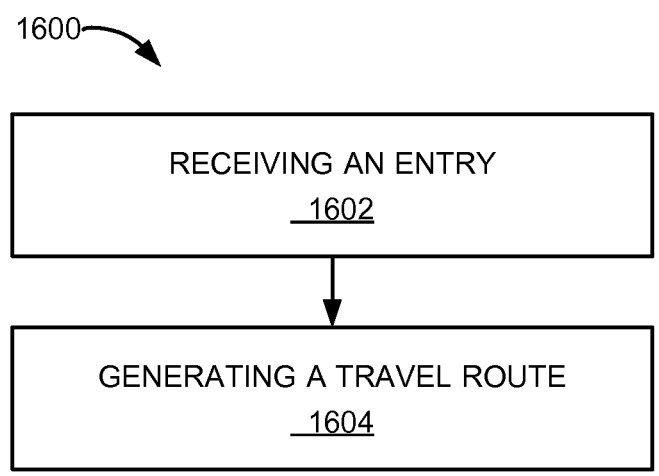
FIG. 16 is a flow chart of a method of operation of the navigation system with constrained resource route planning in a further embodiment of the present invention.

Referring now to FIG. 16, therein is shown a flow chart of a method 1600 of operation of the navigation system 100 in a further embodiment of the present invention. The method 1600 includes: receiving an entry for a destination in a block 1602; and generating a travel route to the destination through a sufficient number of one or more replenishment locations required for reaching the destination for displaying on a device in a block 1604.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    receiving an entry for a destination;
    identifying an availability of a replenishment type for one or more replenishment locations;
    generating a travel route, with a control unit, to the destination through a sufficient number of the replenishment locations required based on the availability for reaching the destination for displaying on a device; and
    calculating an actual travel time deviation based on a difference between an estimated travel time and an actual travel time for determining a route correction of the travel route.

2. The method as claimed in claim 1 wherein identifying the availability includes identifying the availability of the replenishment type for swapping a battery of a vehicle.

3. The method as claimed in claim 1 wherein identifying the availability includes identifying the availability of the replenishment type for replenishing a vehicle with an electric charge, gasoline, biofuel, hydrogen fuel, pressurized air, or a combination thereof.

4. The method as claimed in claim 1 further comprising calculating an estimated replenishment time for replenishing a vehicle with the replenishment type of a battery swap.

5. The method as claimed in claim 1 further comprising calculating an estimated replenishment time for replenishing a vehicle with the replenishment type of an electric charge, gasoline, biofuel, hydrogen fuel, pressurized air, or a combination thereof.

6. The method as claimed in claim 1 further comprising calculating a sufficient number of replenishment locations for ensuring a vehicle for reaching at least one of the replenishment locations.

7. The method as claimed in claim 1 further comprising calculating an actual replenishment time deviation based on a difference between an estimated replenishment time and an actual replenishment time for determining a route correction.

8. The method as claimed in claim 1 further comprising calculating an actual concurrent user activity time deviation based on a difference between an estimated concurrent user activity time and an actual concurrent user activity time for determining a route correction.

9. The method as claimed in claim 1 further comprising calculating a return route different from the travel route.

10. A navigation system comprising:
    a communication interface for receiving an entry for a destination; and
    a control unit, coupled to the communication interface, for:
        identifying an availability of a replenishment type for one or more replenishment locations,
        generating a travel route to the destination through a sufficient number of the replenishment locations required based on the availability for reaching the destination for displaying on a device, and
        calculating an actual travel time deviation based on a difference between an estimated travel time and an actual travel time for determining a route correction for the travel route.

11. The system as claimed in claim 10 wherein the control unit is for identifying the availability of the replenishment type for swapping a battery of a vehicle.

12. The system as claimed in claim 10 wherein the control unit is for identifying the availability of the replenishment type for replenishing a vehicle with an electric charge, gasoline, biofuel, hydrogen fuel, pressurized air, or a combination thereof.

13. The system as claimed in claim 10 wherein the control unit is for calculating an estimated replenishment time for replenishing a vehicle with the replenishment type of a battery swap.

14. The system as claimed in claim 10 wherein the control unit is for calculating an estimated replenishment time for replenishing a vehicle with the replenishment type of an electric charge, gasoline, biofuel, hydrogen fuel, pressurized air, or a combination thereof.

15. The system as claimed in claim 10 wherein the control unit is for calculating a sufficient number of the replenishment locations for ensuring a vehicle for reaching at least one of the replenishment locations.

16. The system as claimed in claim 10 wherein the control unit is for calculating an actual replenishment time deviation based on a difference between an estimated replenishment time and an actual replenishment time for determining a route correction.

17. The system as claimed in claim 10 wherein the control unit is for calculating an actual concurrent user activity time deviation based on a difference between an estimated concurrent user activity time and an actual concurrent user activity time for determining a route correction.

18. The system as claimed in claim 10 wherein the control unit is for calculating a return route different from the travel route.

* * * * *